US007412389B2

United States Patent
Yang

(10) Patent No.: US 7,412,389 B2
(45) Date of Patent: Aug. 12, 2008

(54) DOCUMENT ANIMATION SYSTEM

(76) Inventor: George L. Yang, 4628 Kings Mill Way, Owings Mills, MD (US) 21117

( * ) Notice: Subject to any disclaimer, the term of this patent is extended or adjusted under 35 U.S.C. 154(b) by 763 days.

(21) Appl. No.: 11/071,097

(22) Filed: Mar. 2, 2005

(65) Prior Publication Data

US 2006/0197764 A1    Sep. 7, 2006

(51) Int. Cl.
*G10L 21/06* (2006.01)
(52) U.S. Cl. ...................... 704/260; 345/473
(58) Field of Classification Search ................ 704/260; 345/473
See application file for complete search history.

(56) References Cited

U.S. PATENT DOCUMENTS

| 4,884,972 | A | * | 12/1989 | Gasper ...................... 434/185 |
| 5,485,600 | A | * | 1/1996 | Joseph et al. ................. 703/13 |
| 5,544,305 | A | * | 8/1996 | Ohmaye et al. ............. 715/776 |
| 5,809,269 | A | * | 9/1998 | Favot et al. .................. 712/200 |
| 6,040,842 | A | * | 3/2000 | Wavish et al. ............... 345/473 |
| 6,215,498 | B1 | * | 4/2001 | Filo et al. .................... 345/419 |
| 6,414,684 | B1 | * | 7/2002 | Mochizuki et al. .......... 345/473 |
| 6,492,990 | B1 | * | 12/2002 | Peleg et al. ................. 345/473 |
| 6,642,940 | B1 | * | 11/2003 | Dakss et al. ................. 715/723 |

* cited by examiner

*Primary Examiner*—Susan McFadden

(57) ABSTRACT

An animating system converts a text-based document into a sequence of animating pictures for helping a user to understand better and faster. First, the system provides interfaces for a user to build various object models, specify default rules for these object models, and construct the references for meanings and actions. Second, the system will analyze the document, extract desired information, identify various objects, and organize information. Then the system will create objects from corresponding object models and provide interfaces to modify default values and default rules and define specific values and specific rules. Further, the system will identify the meanings of words and phrases. Furthermore, the system will identify, interpolate, synchronize, and dispatch events. Finally, the system provides interface for the user to track events and particular objects.

20 Claims, 33 Drawing Sheets

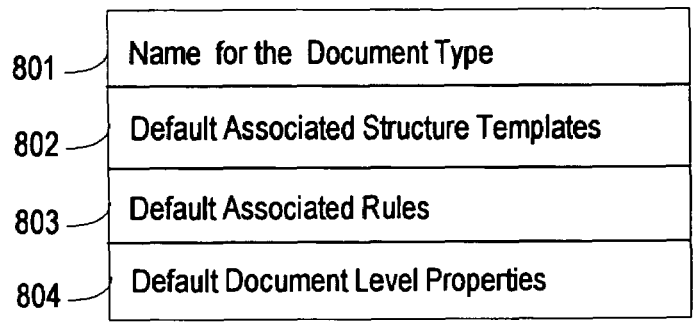
Fig. 8A
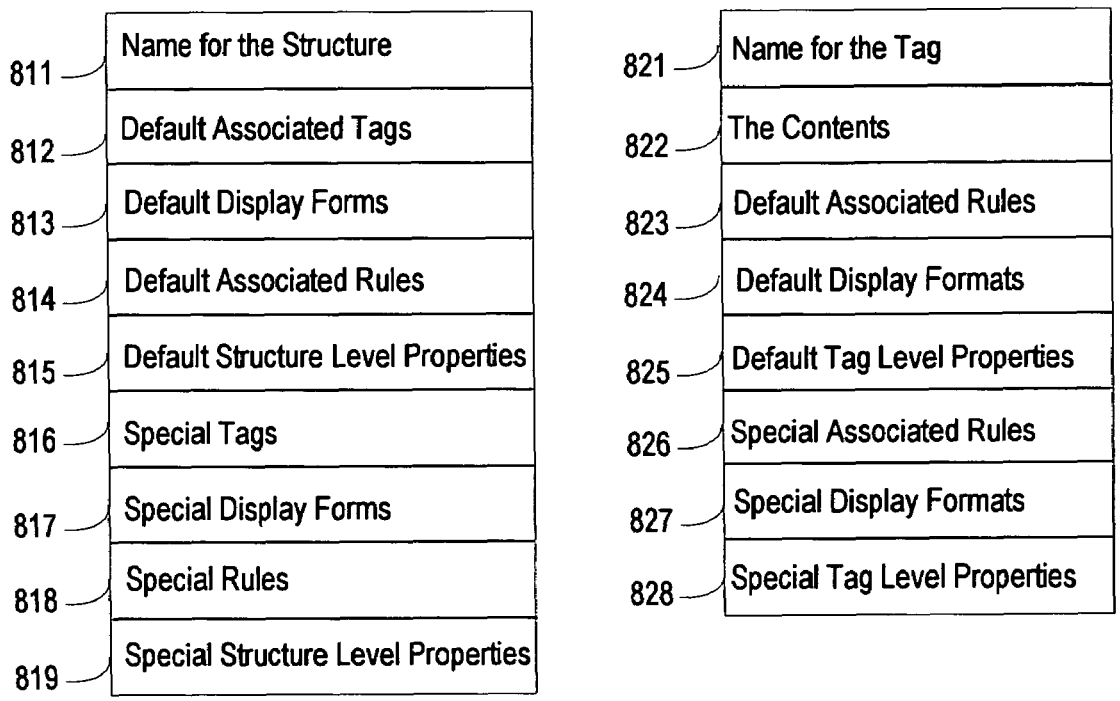
Fig. 8B
Fig. 8C

DOCUMENT ANIMATION SYSTEM

FEDERALLY SPONSORED RESEARCH

Not Applicable

SEQUENCE LISTING OR PROGRAM

Not Applicable

TECHNICAL FIELD OF THE INVENTION

The invention is generally related to converting a block of text to corresponding voice and image. More particularly, it is related to identifying the objects in a document, initializing these objects, and recognizing, representing, interpolating, synchronizing, dispatching, and tracking the events associated with these objects.

BACKGROUND OF THE INVENTION

In many situations, a person wants to convert a text-based document into a cartoon for several reasons. The first reason is to help people to understand and remember better. Before the invention of radio and television, people received a great portion of their knowledge from reading magazines, newspapers, and books. With the advance of technology, now people can access information faster by seeing a movie, watching a television, tuning to a radio station, and listening to a tape. However, reading text-based materials is still one of the major accessing methods to acquire information related to technology and science. There are some shortcomings to access information by reading a text-based document directly. While reading a text-based document, many people usually transfer written sentences into verbal sentences, and then further transfer sounds to meanings. This understanding process is not direct and therefore is not very efficient. Also by reading a text-based document to acquire information, many people use their visual organs only, ignore their other organs, and therefore waste their capabilities. A person can understand and remember better if the person can access voice, image, as well as text simultaneously.

The second reason is to help kids to learn. Many children do not like books that contain text only. Instead, they love books with pictures for important characters, they love storybooks with pictures for major events better, and they love animating cartoons even more. During watching an animating cartoon or movie with dialogue or caption displayed, children can learn how to pronounce words and sentences. However, usually it takes a lot of time, effort, and cost to make a cartoon for kids. Due to the cost of making a cartoon, many children books have no corresponding cartoons yet.

The third reason is to help people to learn language effectively, enhance vocabulary quickly, and describe event precisely. A communication process consists of an encoding process for describing an event in proper sentences and a decoding process for understanding the event from these sentences. Many people have no problem to recognize the meanings of many words in sentence, but they have difficulty to use them in their writing and have more difficulty to use them in their daily conversations. One of the possible reasons is that they have not obtained enough training on how to use these words. Usually people have received many comprehension practices by reading books, magazines, and newspapers from their school times to their social activities. Relatively people have received fewer narrative exercises particularly after they left school. Therefore, they have learned how to understand the meanings of many words in sentence but they have failed to learn how to describe an event precisely by using proper words. With text converted into voice and image, not only people can remember better, but also people can establish a connection among words, pronunciations, and meanings, and learn how to describe events effectively and naturally. Watching a cartoon generated from a document, people can describe in documents about what they observed and heard. The newly generated documents will expose people's observation capability, writing vocabulary, word-handling capability, as well as organization capability. By comparing the documents with the original document, people can learn faster on how to organize information and how to present information. Through a comparison process, people may be able to find the differences on organizations, to discover the reasons for certain approaches in the original document, and to notice what missed, what wrong, what improper, and what unnecessarily repeated in their documents. People can also understand why specific words used in the original document instead of ones used by them, aware the subtle difference of similar words, and increase the capability to select right words for describing properly.

Therefore, it is desirable to convert a text-based document into an animating cartoon so that people can use more organs to participate in learning, have more funs, enhance their vocabulary, improve their sensibility on words, and learn to describe precisely.

OBJECTIVE OF THE INVENTION

The primary objective of the invention is to provide a system to generate an animating cartoon for children from a text-based children book.

Another objective of the invention is to provide a system to convert a text-based document into a series of slides animated with voice, text, and picture.

Another objective of the invention is to provide a system to convert a text-based document into a movie-like presentation.

Another objective of the invention is to provide a system for a user to utilize multiple organs to access the information of a text based-document by converting the document into voice, image, dialogue rectangle, and caption.

Another objective of the invention is to provide a system for a user to create animating cartoon from a text-based document so that the user can create a new document, learn to use words precisely, and enhance vocabulary quickly by watching the cartoon, comparing the corresponding words, and noticing the subtle differences among words.

Another object of the invention is to provide a system to generate animation information for a user according to the familiarity, the available time, and the preferred methods of the user.

Another objective of the invention is to build a virtual teacher to lecture children, help them to review, answer their questions, monitor their feedback, adjust teaching methods according to their responses, and report their progresses to their parents.

SUMMERY OF THE INVENTION

The basic idea is to build object models with default behaviors, associate words with corresponding actions, extract object information from an input document, database, as well as Internet, create objects, find relations among the objects, identify events created by the objects, express events in a proper language, insert supplement events, dispatch events, create voice and image, and track events.

The system of the invention associates each meaning of a word with the description of corresponding action, uses various structures to hold the information extracted from an input document and organize the information properly, and builds models for different types of objects with default appearances, properties, and actions. The system also identifies objects, extracts related information about each object, finds out the relations among objects, expresses the relations, and creates objects from corresponding models with desired features inherited and undesired features overrode. Further, the system identifies events from the action related words and regenerates the events by creating a series of commands for instructing an image synthesis subsystem to generate images and a voice synthesis subsystem to generate sounds.

BRIEF DESCRIPTION OF THE DRAWINGS

The drawing figures depict preferred embodiments of the present invention by way of example, not by way of limitations. A person skilled in the art can combine two or more modules into a single module, split a module into two or more modules, and add or merge some functions in a module. In the figures, like reference numerals refer to the same or similar elements.

FIG. 8A illustrates the basic components associated with a document type.

FIG. 8B illustrates the basic components associated with a structure.

FIG. 8C illustrates the basic components associated with a tag.

DETAILED DESCRIPTION OF THE PREFFERED EMBODIMENTS

Figure 1:
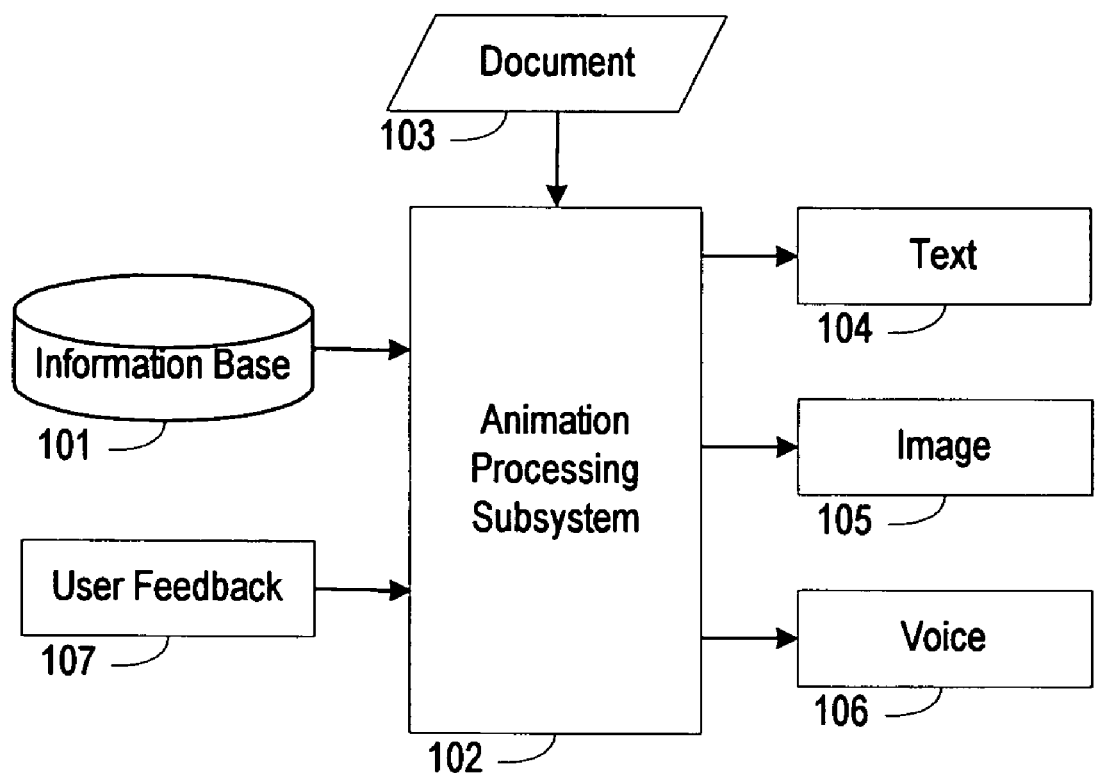
FIG. 1 illustrates the overall diagram of the invention.

FIG. 1 shows the overall diagram of the system of the invention. The system consists of the information database 101, the animation processing subsystem 102, the input document 103, the generated text 104, the generated image 105, the generated voice 106, as well as the captured feedback 107. The animation processing subsystem 102 processes the input document 103 according to various rules saved in the information base 101. These rules specify how to extract information, how to organize information, how to build objects, how to identify an event, how to express an event, how to imitate a processing conducted by a user, etc. A user can modify these rules through interfaces provided by the system. Usually a rule is in form of script, macro, function, subroutine, regular expression, formal language, example, or form. The information base 101 saves the default settings as well as the specific settings for a user and provides various techniques for searching, saving, editing, organize, and display information from a database and Internet. The animation processing subsystem 102, resorting to the saved rules in information base 101, extracts information from the input document 103, searches for related information from the information base 101, builds objects, and creates dialogue rectangles, captions, voices, and animated images. Through proper input devices, the system captures feedback 107 from a user for analyzing status and adjusting the way of presentation.

In this specification, a term called user frequently refers to the initiator of a decision or an operation conducted in the system. With proper settings, preferences, rules for performing decisions and operations, or intelligent reasoning algorithms, the system can also make a corresponding decision or start a corresponding operation automatically.

Figure 2:
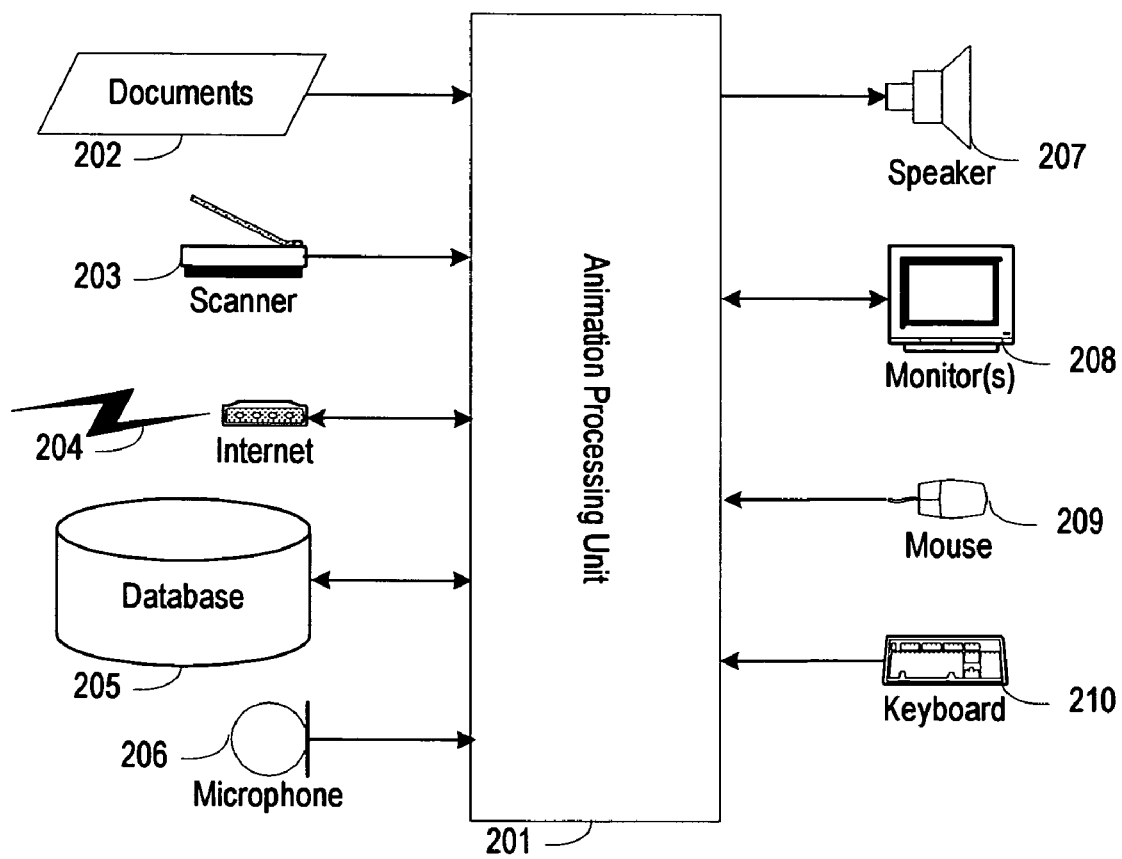
FIG. 2 illustrates the major devices used in the system.

FIG. 2 shows the typical devices used in the system. The animation processing unit 201 loads related rules from a database, arranges their execution order, generates commands for controlling each device, and supplies supplementary information for compensating the information extracted from an input document.

The document 202 can be a paper-based document, an electrical document, or a structured document with information organized already. Here a structured document is a document that contains organized information. If the input document 202 is a paper-based document, then the scanner 203 scans the document and converts it into an electrical document. Through Internet connection 204, the system can search for related information with or without user's interference:

The database 205 provides interfaces and techniques to save, search, retrieve, organize, and display information such as user's preferences, dictionary, object models, structure templates, rules, procedures, and default display forms. Here a structure is an organization to label and hold information systematically. Not only a structure can have a plurality of properties for indicating various features and holding corresponding information, but also a structure can have its associated rules to specify how to perform related tasks. A structure can have substructures called tags for further organizing information. Usually a tag has one or more closely related properties. A structure template is a structure with instance related information removed and serves as a prototype to build a new structure.

The microphone 206 captures sounds from a user and from an environment. With proper training and equipped with various voice processing algorithms, the system can interpret user's voice feedback, understand verbal instructions, and conduct corresponding actions.

The system produces sounds for offering verbal instructions to a user and for imitating various voices through the speaker 207.

The system displays captions and dialogue rectangles and creates image through the monitor 208. If the touching screen input function is available, then the monitor 206 can also serve as an input device to capture a user's feedback. Other input devices, such as mouse 208 and keyboard 209, also catch up a user's response.

Figure 3:
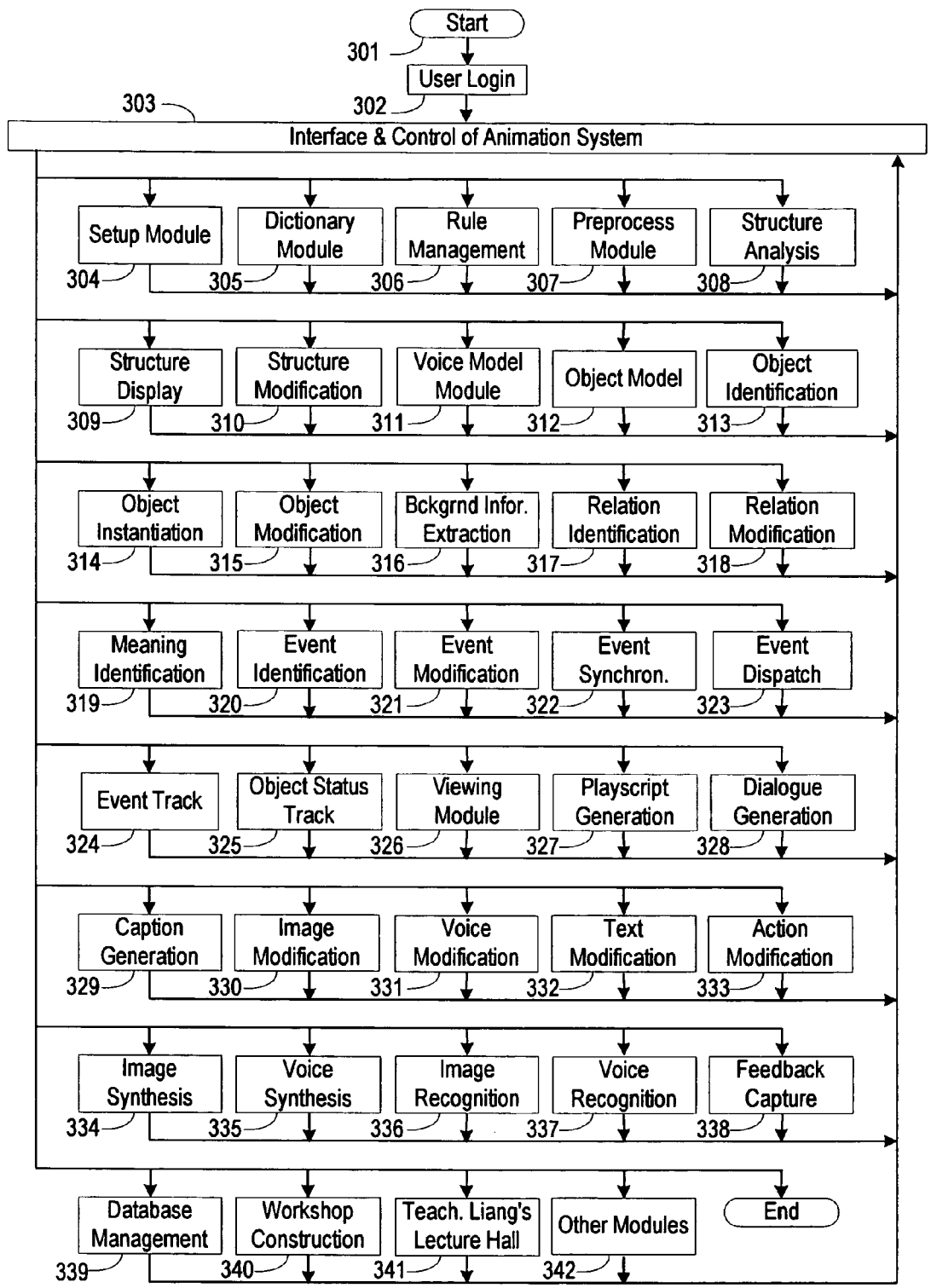
FIG. 3 illustrates the major modules employed in the system.
Figure 4:
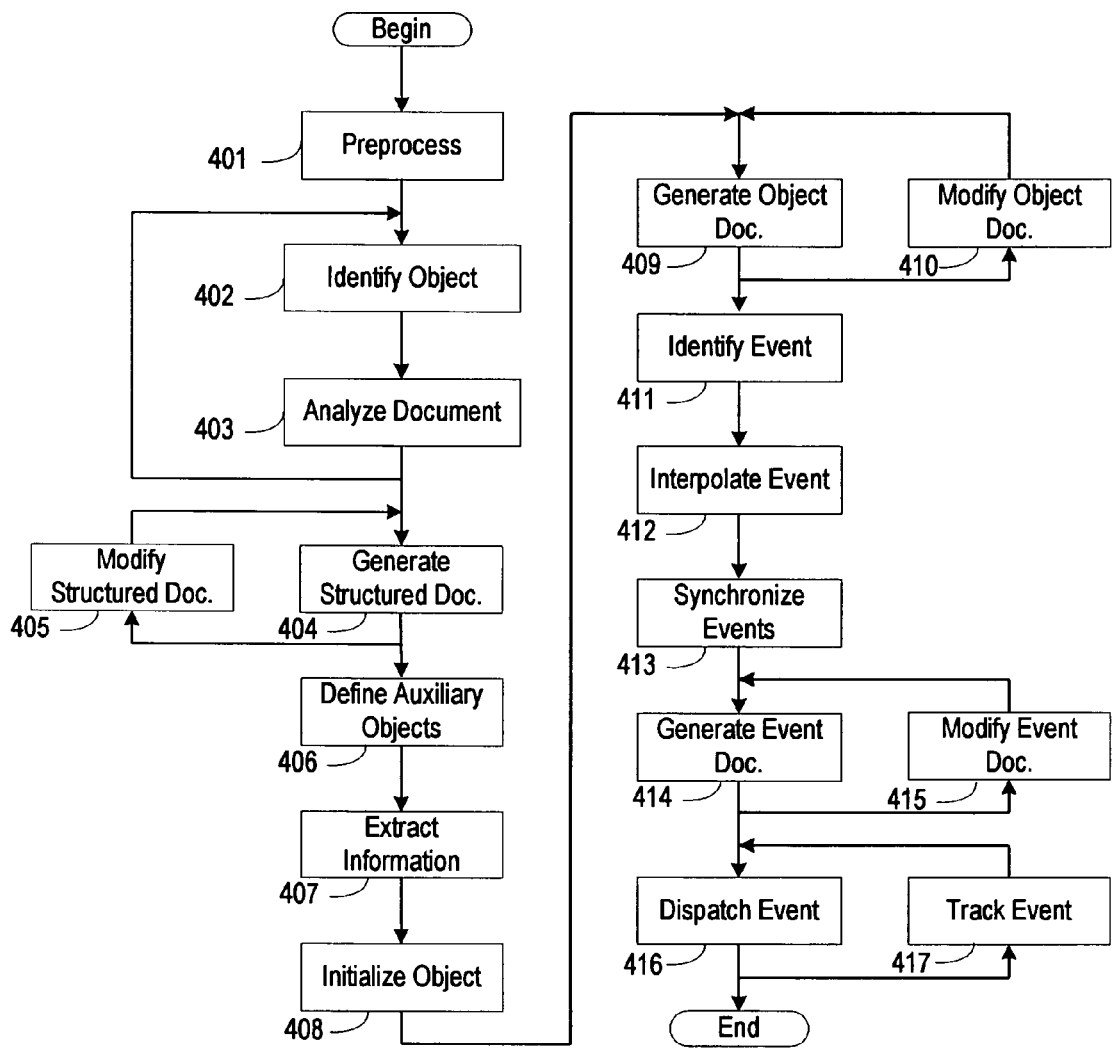
FIG. 4 illustrates an exemplary flowchart of an animating session generated by the interface and control module 303 in FIG. 3.

FIG. 3 shows the major modules used in the system. The system and its modules can have window interfaces, command line interfaces, or some sort of combination. Each module can consist of one or more closely related subroutines, procedures, utilizes, or functions. For simplicity, one can refer a subroutine, a procedure, or a function as a procedure when there is no need for distinguishing them strictly. The exemplary system is a window-based program. Through a window-based interface, a user can launch any module that is available at that particular moment. A module can have one or several relatively independent functions for performing specific tasks and can call other modules and some particular functions in other modules. According to preferences, setups, and related rules, the system will provide corresponding interfaces, utilities, and flow controls to accomplish various tasks. FIG. 4 will show an exemplary flowchart of a typical session for animating a text-based document.

Some modules can generate intermediate documents for various purposes such as passing information among different modules. Among these documents, the most important ones are structured documents, object documents, or event documents. Here a structured document is a document containing organized information and the indications for recovering the organized information; an object document is a structured document containing information about various objects mentioned in an input document; and an event document is another structured document containing information about various events described in an input document. The actual formats of these documents will depend on implementation. For example, an event document can contain simple commands or detail instructions. If the system has defined an animating human object in some language such as visual basic or some visual scripts and this human object understands "walk" command through a corresponding application, then the system can issue a "walk" command with proper parameters in an event document to specify the speed of walk and other aspects. However, if there is no such animating human object in the system, then the system may have to generate a huge set of commands understood by the operating system in an event document for the system to create image, voice, and text.

Starting at step 301, the system provides an interface for a user to login at step 302. Through the login process, the system can identify the user and load the information about the user into the memory from its database and Internet. The information about a user can include preferences, settings, background, and familiarity about particular subjects or topics. Then the system displays the interface and control module 303. Through proper interfaces, a user can launch another module or some procedures in that module. After that module completes a corresponding task, that module will return the control to the control module 303. Among all the controls performed by module 303, there is a very important control, which lets a user specify which rule will govern a task, if the user wants to debug a task, under what conditions the user wants to debug the task, etc. One can call a task under the control of a corresponding rule as a task with rule. A task can have rules associated with it directly or indirectly. Whenever the system is going to execute a task with rule, the system will call a related rule to accomplish the task. Further, a user can debug a task if the user has specified to debug the task or if any error occurs. Depending on user's preferences and settings, the module 303 generates an overall flowchart to provide general control on the execution of a task. At a particular moment, if some modules are not available, then the system will disable these modules. The system can also disable some procedures supposed not available at a particular moment. Usually the system can link a module to one or more window interface items such as menu, dialog, tool bar, shortcut, and icon.

The setup module 304 provides graphic interfaces for a user to specify preferences, to set up the default settings for document types, modules, structures, displaying forms, objects, and tasks, and to define settings for a session. An example of the default settings is the default value for a property and another example is the default rules associated with a property, an object, or a task. The settings can include how a user wants to display the background information (such as animated or static), what form a user wants the animation to take (such as cartoon or movie), what kind of background music a user wants to play, how to handle the recalled events and the imaginary events, and so on. A user can build a customized window interface by setting the appearance of menu, tool bar, icon, and key short cut. A user can also select one of the structure templates as the default structure template for a particular document type. A user can further select one of the available display forms as the default display form for a particular structure. Moreover, a user can reorder the rules associated with a structure and its tags and set up default values for some properties associated with the structure and its tags. In addition, a user can set up default properties related to particular modules. Since each module can have its own interfaces, a user can further set up the properties related to each module through a corresponding interface.

In case of conflict, the specific settings will override the general setting, the settings with high priorities will override the settings with low priorities, and the setting at module level will override the setting at system level. A user can specify the priorities of settings directly by associating their priority properties with corresponding numbers or indirectly by defining rules for determining the priorities of settings. Since these rules are specifically for determining priorities of settings, one can call them as priority setting rules.

The setup module 304 can also provide interfaces for a user to define auxiliary objects for making a presentation more clear and vivid. Though an input document does not mention these auxiliary objects, sometimes these auxiliary objects may help to make an animation session more interesting or create a new animation session from an existing animating session. For example, an auxiliary object can be a commentator or a virtual secretary. By associating related rules and information to these auxiliary objects, the system can provide a user extra information such as comments and background information about a human object.

The dictionary module 305 provides references for the system to determine the meanings of words, the actions associating with words and objects. The system can identify the meanings of words and their actions from an input document according to some patterns or rules specified in a dictionary called action dictionary. The system can also create some actions for objects according to corresponding object models in a dictionary called model dictionary. Depending on actual implementation, the system can have one or both of them. The dictionary module 305 further provides interfaces for a user to create, display, search, and modify action dictionary and model dictionary.

Figure 6:
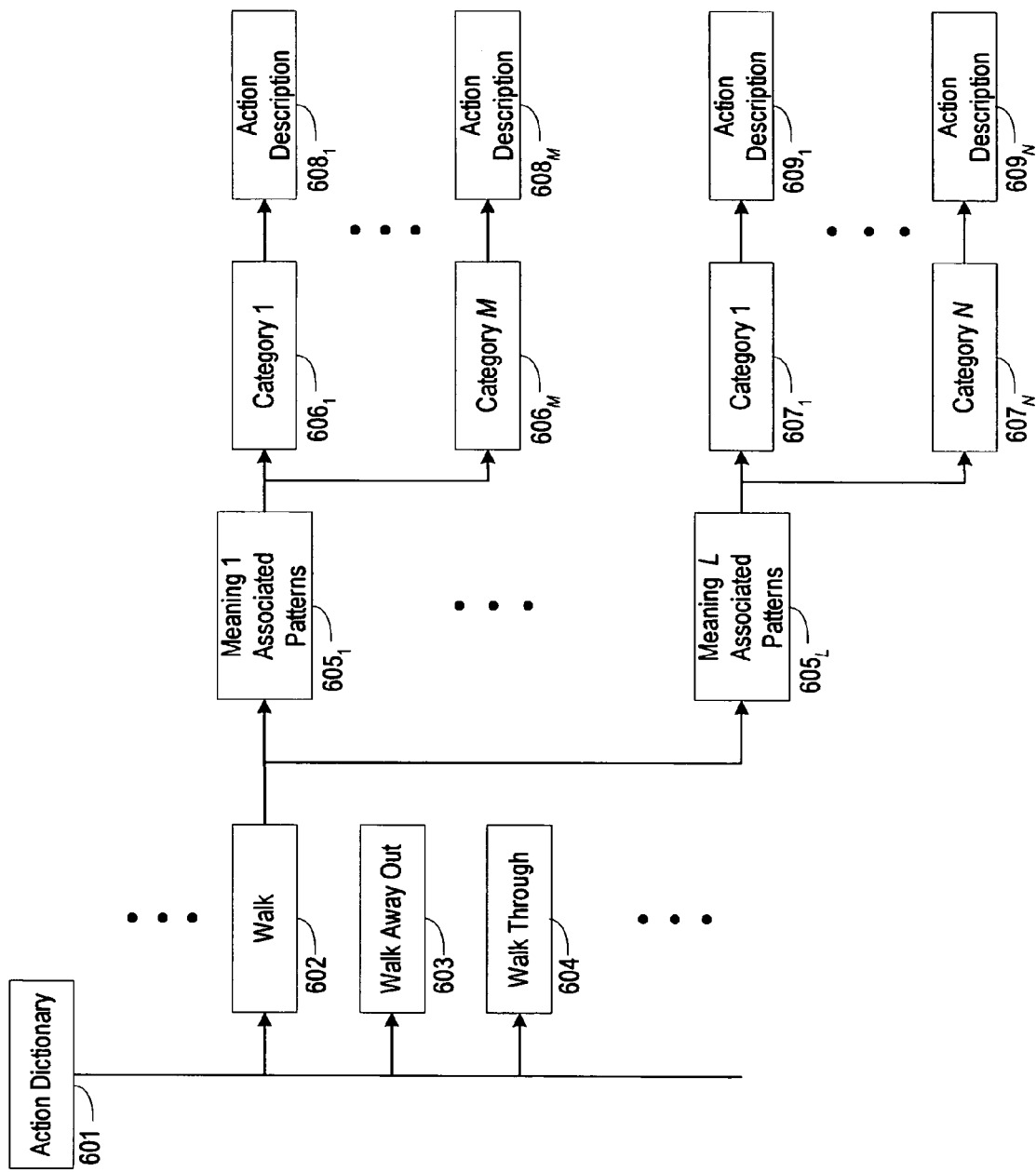
FIG. 6 illustrates the major components of an exemplary action dictionary.

Specifying the relations between a word or a phrase and its actions, an action dictionary contains words, meaning patterns, categories, and action descriptions. Here categories are features for identifying the different actions associated with a same word or a same phrase. Since different meanings have different actions and sometimes even a same meaning can have the different actions, it is necessary to define meaning patterns and categories to distinguish these different actions. A meaning pattern describes the features of the environments where a word or a phrase has a particular meaning and a category distinguishes one action description from a different action description for a word or a phrase with a same meaning. Usually one can use the subject type and the object type of an action to describe the category of the action. The action description associated with a category specifies the general action associated with that category. For example, one meaning of the word "walk" is "to go along or move about on foot at a moderate pace". A person can associate the meaning with two categories. One is a human being and another is an animal with four legs. The word "walk" in "A lady works over there" and the word "walk" in "A dog works over there" have different associated action descriptions. In the first sentence, "walk" indicates two legs moving forward by turns because a lady is a human being. In the second case, "walk" means a four-leg movement because a dog is an animal with four legs. The subject in the first sentence is a human being and the subject in the second sentence is an animal. FIG. 6 will show the general components of an action dictionary.

Figure 7:
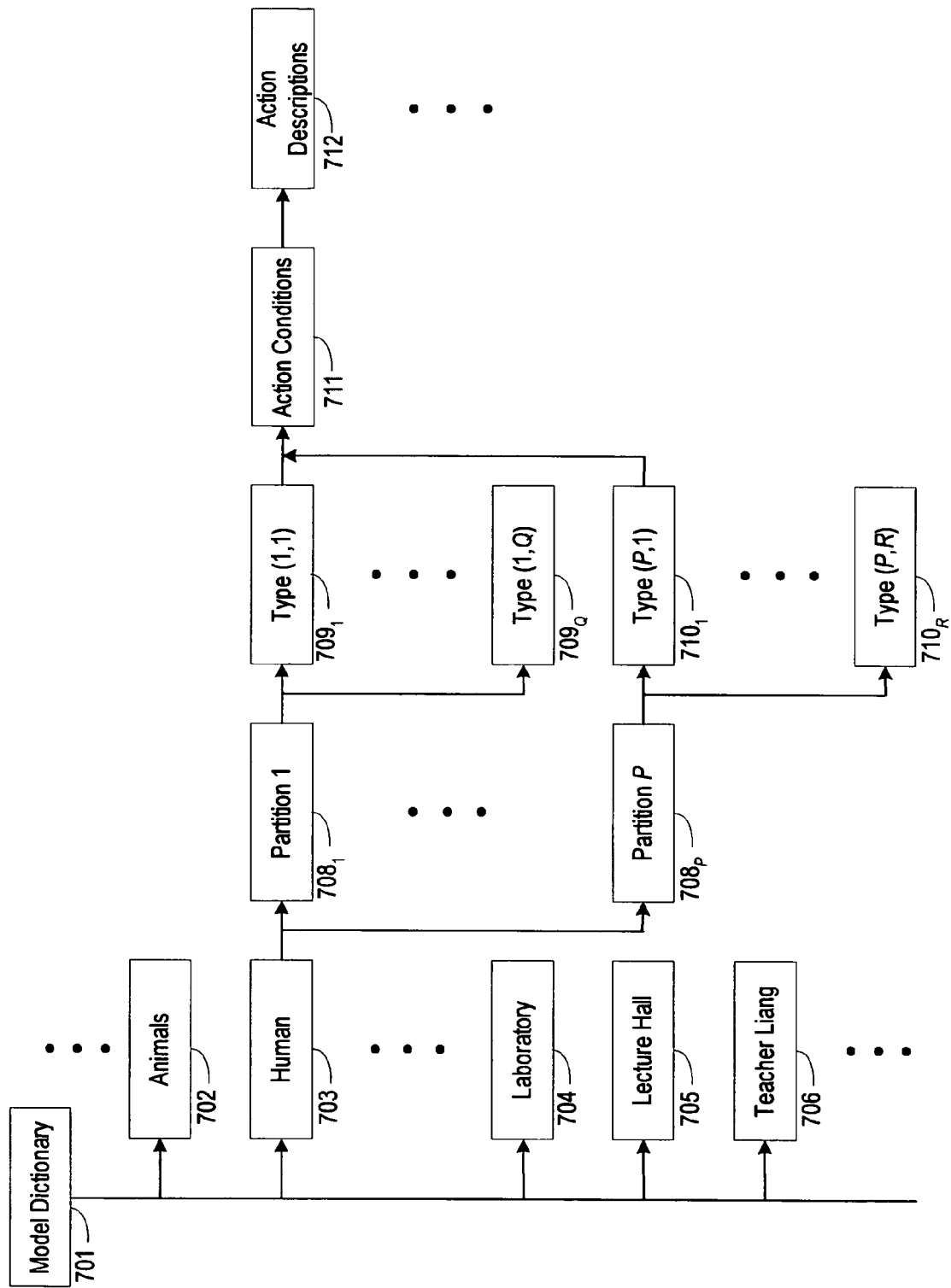
FIG. 7 illustrates the general components of an exemplary object model dictionary.

Being different form an action dictionary, a model dictionary specifies how an object might act under various conditions. For efficiency and convenience, the system can provide different ways for a user to describe the general behaviors for different types of objects. A model dictionary contains the models of many commonly used objects with each model having default behaviors. Usually a person can separate a general object into a group of possible types for each different partition. A particular object, according to its relative relation in each partition, has corresponding actions under particular conditions. The actions may associate with some fixed behaviors, vary in certain ranges, or change according to fuzzy mathematics. The time interval, speed, and repetition for displaying an action can change according to default setting, user's preference, and related rules. A model can be a derived model with other models included in its definition. A derived model will inherit properties from its base models unless the derived model has redefined these properties. FIG. 7 will show a detail description about an exemplary model directory.

On one hand, an action dictionary defines the behaviors according to the descriptions and their environments. According to the used words, the related meaning patterns, the involved subjects, and the involved objects, the system can depict an action picture correspondingly. On another hand, a model dictionary predicts possible responses for certain objects and under certain conditions. According to circumstances, status, history, and general behavior patterns of an object, the system can foretell the possible reactions for the object. Depending on implementation, the system can use an action dictionary only with many categories for different scenarios and detail action description for each category or the system can use an action dictionary just with a few major categories and use an object dictionary for providing detail action description. An action description can have parameters for determining the action generated by a virtual object. Depending on the general settings, the specific settings, the related description in an input document, the rules for judging an action description on its momentum, frequency, last period, and other issues, and the relations among objects, the system will set these parameters with proper values.

The system can also provide interfaces for a user to override the way of identifying an action and the way of describing an action.

Figure 9:
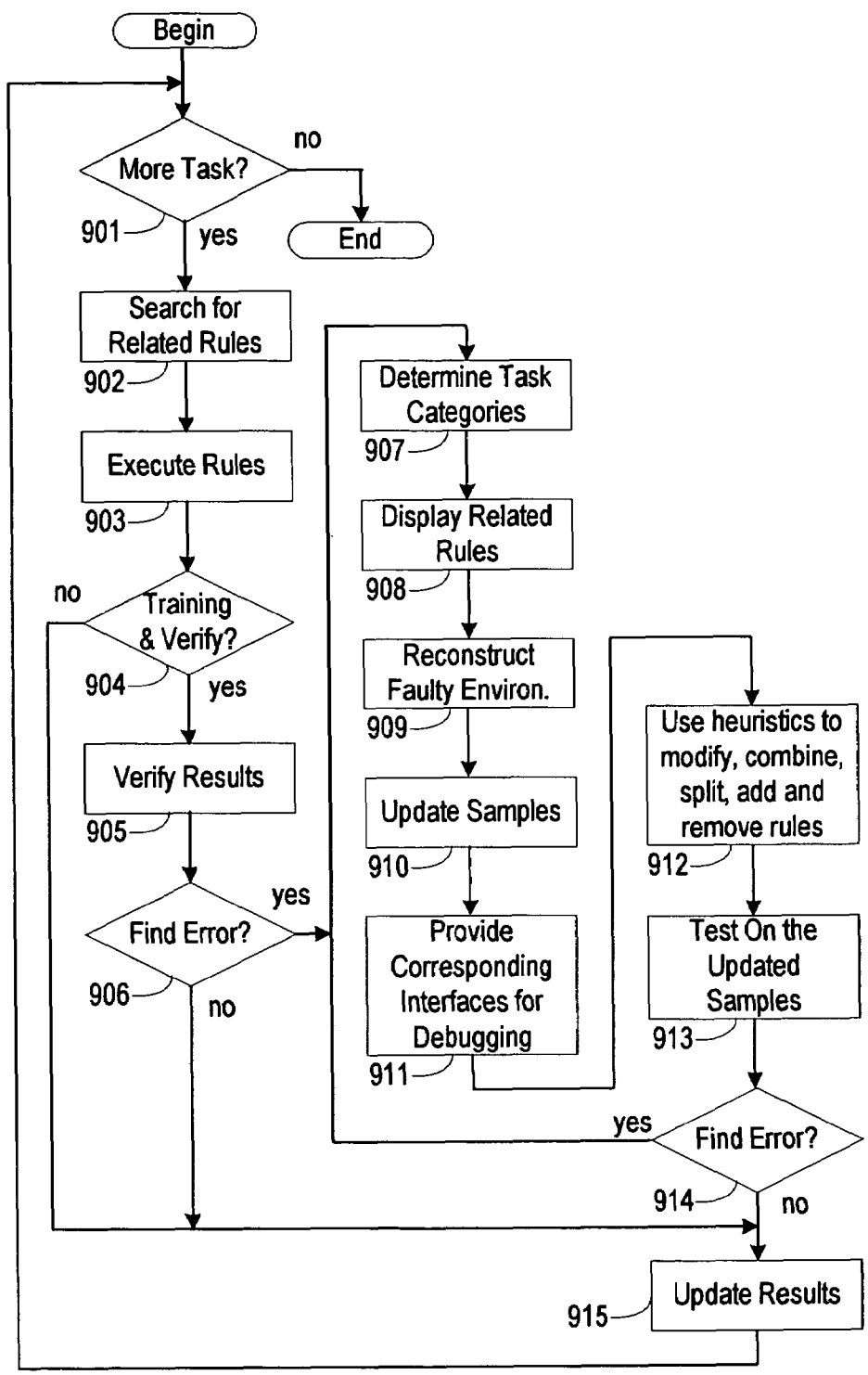
FIG. 9 illustrates an exemplary flowchart of the rule management module 306 in FIG. 3.

The rule management module 306 provides various interfaces to display, execute, debug, modify rules, verify results, and coordinate rules. FIG. 9 will show an exemplary flowchart of the rule management module 306. With proper interfaces, a user can examine the rules associated with modules, structure prototypes, tag prototypes, display form prototypes, object prototypes, event prototypes, structure instances, tag instances, display form instances, objects, events, and properties as well as property's properties. The model 306 can also provide interfaces for a user to test and debug rules and verify the results from running the rules. A user can control the execution of a task according to the default system settings, the user's preference, and the related rules. Generally, the user's preference will override the system default settings, the related rules registered for a task will override the user's preference and the system default settings, and the specific rules will override general rules. One can treat the preferences and customized settings as special rules displayed on a form.

The module 306 can further provide interfaces for a user to register the tasks and their corresponding rules either explicitly or implicitly. If according to user's settings, the system will register automatically the tasks to format the information held by any property that has an associated rule on formatting, then whenever the system is going to format a property with an associated rule for formatting its information, the system will let a corresponding rule to control the task. Through proper interfaces, a user can specify a task and its corresponding rule to accomplish the task. A rule can be in various forms such as an existing subroutine in the system, a predefined and compiled DLL function, and a macro.

One can sort rules in many different categories for different purposes. The rules of a very important category are the rules generated from imitating a user's manual processing. Whatever a user performs an operation manually through the system, the system can provide interfaces for the user to specify which operations that the system will record and how to record. The generated rules usually are in form of macros understood by the system.

Another important function of module 306 is to co-ordinate various rules. First, a task can have zero, one, or more associated rules. The module 306 decides which rule that the system will apply to a particular situation according to user's settings, preferences, and related rules for determining the choice. Second, a rule can associate with the system, a particular document, a structure, a tag, a display form, or a property. The module 306 also provides interfaces for a user to display related rules and provide mechanism to execute a rule. Third, different rules for a same task may contradict each other. The module 306 determines which rule the system will use for a task according to predefined arrangement, priorities, and related properties associated with these rules.

Figure 11:
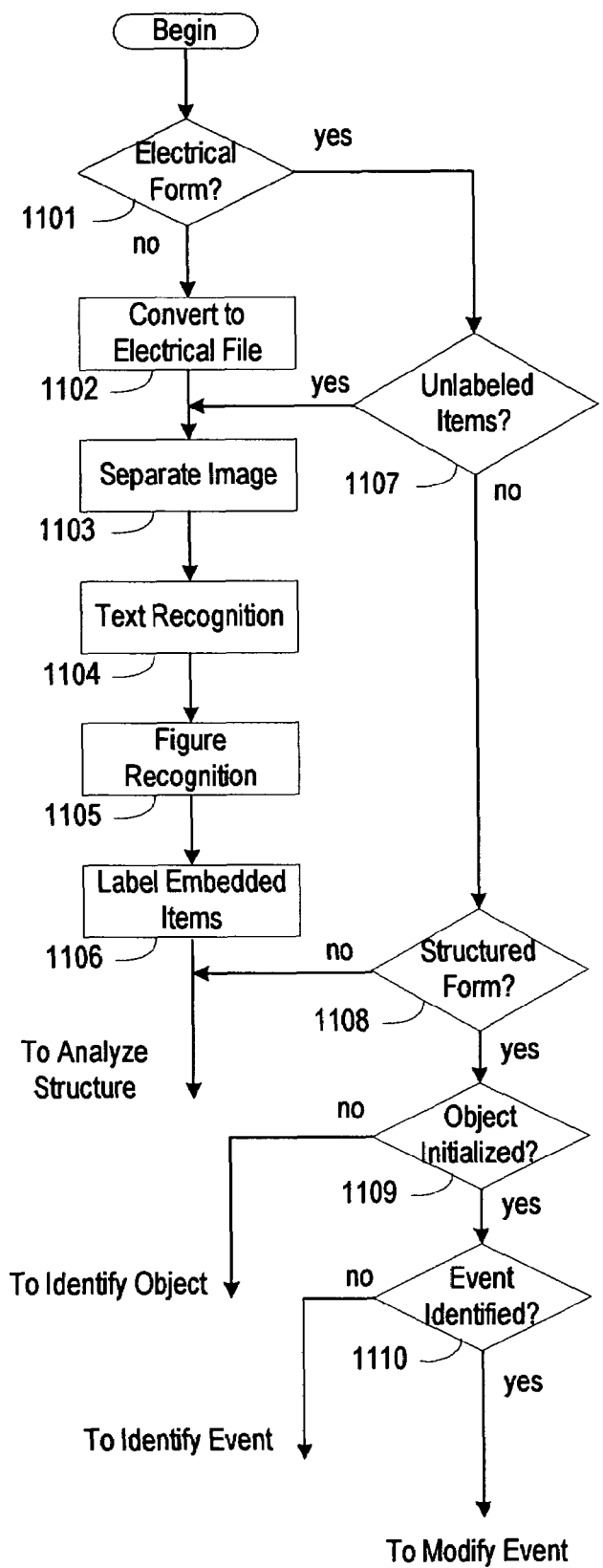
FIG. 11 illustrates an exemplary flowchart of the preprocess module 307 in FIG. 3.

The preprocess module 307 preprocesses an input document. If the input document is an image file, then the module 307 separates the text portions of the input document from the figure portions of the input document. The module 307 also decides the document type of the input document, which can be a structured document, an object document, or an event document. Making use of the features available in each document type, the module 307 can reduce unnecessary work. FIG. 11 shows an exemplary flowchart for this module.

The structure analysis module 308 is to analyze the configuration of an input document and to save the extracted information in an organization called a structure. Since grammatical information helps separating information rationally and extracting information correctly, it is desirable to include the grammar analysis in this module. The basis task for module 308 is to generate syntactical information from an input document, fill a structure, its tags, and other properties with corresponding information, and separate the input document into a set of smaller chunks mainly according to its syntactical functions and morphological features. For most input documents, the commonly used tags include title, author, source, section, and paragraph. The module 308 can use various grammar analysis methods to identify the sentence structures and speech parts and separate a sentence into smaller chunks. Through grammar analysis and information saved in database, the module 308 can mark commonly used idioms and phrases, sentence structures, and speech parts, and identify subject, verb, object, subject clause, object clause, link clause, adjective clause, adverb clause, -ing and -ed phrase, gerund structure, and other cases. The module 308 can further include procedures to find out the relations among sections, paragraphs, and sentences. In additions, the module 308 can extract other information according to related rules and user's settings. An example of such information is the important issues related to a particular topic. The module 308 can also provide interfaces for a user to define rules for identifying interesting information and to assign a property to particular information.

The structure display module 309 displays the information contained in a structure by proper forms. A user can examine results from various aspects by displaying information in various ways. For example, when a user wants to display the grammar information about an input document, a form suitable for displaying grammar will appear. Depending on the setting, the module 309 can display the speech parts of words in a sentence, display sentence structures of a sentence, and display the relation between related portions of a sentence by direct indication, by different font, and by other predefined notations. Another example, when a user wants to display the properties related to a particular object, a GUI or a text interface will appear so that the user will see and examine the properties associated to that object.

The structure modification module 310 provides interfaces for a user to modify a structure. A user can modify a structure directly or indirectly. One can modify the structure itself directly by modifying the information about a tag, adjusting the position of a tag, establishing a new link between two tags, removing undesired links, and reassigning sentence structures and speech parts. One can also modify the structure indirectly by specifying and adjusting the rules for modifying the structure and its tags. For example, a user can specify if the user wants two tags linked together, how to combine two tags, etc.

The voice model module 311 provides proper interfaces for a user to build a group of voice models. Since intonation, emphasis, pace, and volume are the major features of a voice, the system will let a user to create a voice by specifying these parameters for each feature. A more complex interface will allow a user to imitate the accents for people from different places by providing accent models and letting the user specify accent parameters. According to various voice analysis and identification techniques available, the voice model module 311 can also provide some voice analysis algorithms to find out the accent features of a particular person. For some special applications such as language learning, the module can provide interfaces for a user to specify further the mouth muscle movements for individual sounds and combination of sounds. Two of the most important mouth muscles are tongue and lip. With proper interfaces, a user can specify the initial tongue position and the initial lip shape as well as the updated tongue positions and the updated lip shapes for pronouncing a sound or a word or a sentence. Moreover, the module 311 can provide various voice comparison utilities for helping a user to compare two voices from various aspects. The most important voice comparison utilities include frequency spectrum analysis, instant voice strength analysis, pitch analysis, as well as muscle identification analysis. In addition, the module 311 can provide interfaces for a user to build complex voice models to handle unusual situations. For example, when a person feels depressed, feels embarrassed, becomes angry, or feel happy, the person can generate a sound quite different from the sound that the person produces normally. The module 311 can provide interfaces for a user to build a voice model with regular voice and irregular voices for each of the unusual situations under consideration.

The object model module 312 provides proper interfaces for a user to create, examine, and modify an object model, which is a virtual object serving as an example to build similar virtual objects. A virtual object is an article that generates an action or bears an action in an animating session. The specification will call a virtual object simply as an object when there is no confuse between a simulated object and a corresponding real object. One can define a virtual object from related virtual objects. For example, one can define a human being object, define a man object from the human being object, and define a particular male person object from the man object. An object can have some associated actions. The module 312 can provide interfaces for a user to define an action, to describe the action, and specify the conditions for the action to take place. Through proper interfaces, a user can check objects according to categories or alphabetical order, modify an object, create a new object, and associate a new function to an object. The module 312 can also provide interfaces for a user to save objects as object templates or prototypes with unnecessary information removed. In addition, the module 312 can provide interfaces for a user to create an object from scratch or build an object from an object template with overriding some default functions and filling some predefined properties with corresponding information.

The object identification module 313 identifies the objects in an input document. First, the module 313 finds the different names for each object. Even in a same document, an object may have several names due to synonym, pronoun, and abbreviation. According to a synonym dictionary and a table of abbreviations in a database as well as grammar analysis, the module 313 links different names of a same object together. Second, the module 313 provides interfaces for a user to define categories and sorts the objects into various categories. For example, according to the rules on categorization, the module 313 can categorize an object into either a human object or non-human object and further categorize a human object into a male object or a female object, an adult object or a child object, a tall object or a shot object, a young object or an old object. Third, the module 313 may extract detail information about related objects from the input document, a database, and Internet according to some predefined rules for further extracting information. By identifying an object and sorting the object into various related categories, the system can link default properties and default functions to the object when the system represents the object in a proper data structure such as in a form of class.

The object instantiation module 314 instantiates objects by setting up their properties and associated functions. First, the module 314 sets up the properties associated with the objects by corresponding default values and links the functions associated with the objects to corresponding default functions. Both the default values and the default functions do not necessarily to be immobile. For example, a default value may be a random value changing in a certain range. Then, the module 314 uses the objects specific information extracted in module 313 to fill the detail of the objects. In case of conflict, the object specific information will override default settings for a particular type of objects.

The object modification module 315 provides various interfaces for a user to modify the objects. The interfaces can be in graphic form or in text form. For example, if an object is a human object, then the module 315 can display the object in a graphic form and provides interfaces for the user to modify details such as clothing, face, height, and age. There can be many different interfaces with each one for a different type of objects. The modification can be automatic for imitating a user's manual processing. The module 315 can have rules for judging if two objects match each other and their relations. With more and more information collected, the module 315 can adjust the features of an object to meet the requirements of other objects according to their relations. There can be several iterations for modifying objects especially for those objects whose information are available only after performing some related operations. For example, when the original document mentions a glove but does not mention its size, the system may generate a glove with a default size or with a size undefined. Later, if the document mentions that the glove is for an adult, then the system should adjust or set the size of the glove accordingly. The number of iterations that the module 315 needs to adjust an object depends on how complete the rules associating with the object are. If the rules associated with a glove also specify how to find the size of the glove, then there is no need for adjusting the size of glove. The automatic modifying object is useful because the associated rules for identifying objects may not be perfect especially for newly encountered complex objects.

The background information extraction module 316 extracts the background information about an input document and about a user. The background information can include the information about an author, the titles of the papers published by the same author, the titles of related papers, and the general circumstance about the paper's background. The module 316 can search the background information from a database and Internet according to authors' names, journal name, title, and content. The module 316 can also provides interfaces to find the background about a user by asking questions, supplying multiple-choices, capturing feedback, comparing with standard results in database, and deducing from previous status. According to background information, the system can set up background scenario and decide a preferred approach for delivering information according to related rules.

The relation identification module 317 finds the relations among related objects and among related events from an input document, related structures, a database, and Internet. Grammar relation, range relation, annotation relation, family relation, job relation, spatial relation, chronological relation, and sequence relation are some examples of possible relations. Two essential relations are time relation and object associated relation. The time relation specifies how and when objects change with the time and the object-associated relation specifies the relations related to a particular object. For simplicity, one can consider the features related to an object as the relations related to the object. Some relations can be static in nature, which do not change at least for the time interval under consideration or the input document implies not to change according to plausible reasoning. Some relations can be dynamic in nature, which may change with the time and the spot. The module 317 can provide interfaces for a user to define new relations and specify rules for identifying the new relations. The system can use various data structures to represent various relations for making it easier to examine and retrieve related information. A Cartesian product can be one of the possible forms for representing a relation. The module 317 can also display the relations and the information on an original document.

The relation modification module 318 provides proper interfaces for a user to display and modify the relations. One can display relations in various forms. A particular useful form is to display relations along time axis. The horizontal axis is the time axis and the vertical axis is the different relations. One can display a static relation by a horizontal band covering the time interval under consideration and display a dynamic relation by a horizontal band starting at some point in time and end at another point in time. The module 318 can use different line patterns, filling patterns, symbols, and labels for different relations. The relations can have associated comments and related descriptions. The module 318 can also display the relations at particular moment or the relations of a particular category or the relations associated to a particular object. When a user double clicks a horizontal band, the module 318 will display detail information about the relation that the horizontal band stands for and provide interfaces for a user to modify the relation. Through these interfaces, a user can modify the relations directly. The system can provide interface for a user to define rules on how to modify relations so that the user can also modify relations indirectly. A different type of relations may require a different interface to display the relation and to modify the relation. The module 318 can display a relation by a block of text, by a figure, by a table, by a state diagram, by a mathematic formula, by a session of movie, by a session of recording, and by a computer language such as a formal language.

The meaning identification module 319 identifies the meaning of words or phrases according to the grammar environments, the associated words, the related patterns, the types of related objects, the rules for identifying meanings, and the user's settings. These rules can associate with related words and phrases in a dictionary. A rule for identifying meaning can be in a form of pattern with some key words, key speech parts, and sentence structures specified. For example, in order to identifying the meaning of "run", one can define patterns such as "Noun Structure for A Human Object+A Verb Structure of Run" for identifying "run" with the meaning to move two legs rapidly, faster than in walking and define "Noun Structure for A Mechanic Object+A Verb Structure of Run" for identifying "run" with the meaning to move rapidly and swiftly. Suppose that the system has identified that "Jimmy" is as a young boy, then according to the related meaning patterns, the module will link "Jimmy is running happily" to the description of moving legs rapidly and faster in such a way that for an instant both legs are off the ground. If the system has identified that "Ocean" is the name of a ship, then the system will link "The Ocean runs before wind" to a picture of a rapid movement of a ship. The module 319 can also provide interfaces for a user to modify the rules for identifying meaning. The module 319 can further provide interfaces for a user to modify the meaning of a word or a phrase by linking the word or the phrase to a corresponding item that associates with the word in an action dictionary.

The event identification module 320 identifies, organizes, and generates all the events. One can consider events as special relations for describing the actions generated by related objects. These actions usually associate with verb and verbal such as gerund, present participle, past participle, and infinitive. However, a verb or a verbal may not create an action every time. For example, in the sentence "John thinks Mary is coming", "is coming" will not generate an action unless a user wants to open a window in the picture to show the imagination of John. Another example is "Judy says, 'Gary tells me that he is working on that project.'" There is no action for the sentence inside the single quotations unless a user wants to emphasize by opening a second window to display the image for the sentence inside the single quotation. The actions can also associate with the linking verbs under some situations. For example, a user may want to express "The wind is terrible" by generating an event to make a tree shaking strongly or make a flag wave with loud noise. The module 320 will use rules for identifying events to decide if to generate an action for a verb or a verb related structure. A convenient form for this type of rules is in form of sentence patterns or structure patterns. The module 320 can also provide interfaces for a user to define and modify the rules for identifying events.

Having decided to generate an action, the module 320 generates the description of the action according to the rules for generating actions, the action descriptions in a reference dictionary, and related actions templates or predefined basic action parts saved in the system. The module 320 describes an event with corresponding action description, related texts in the original document, and time resolution.

Figure 27:
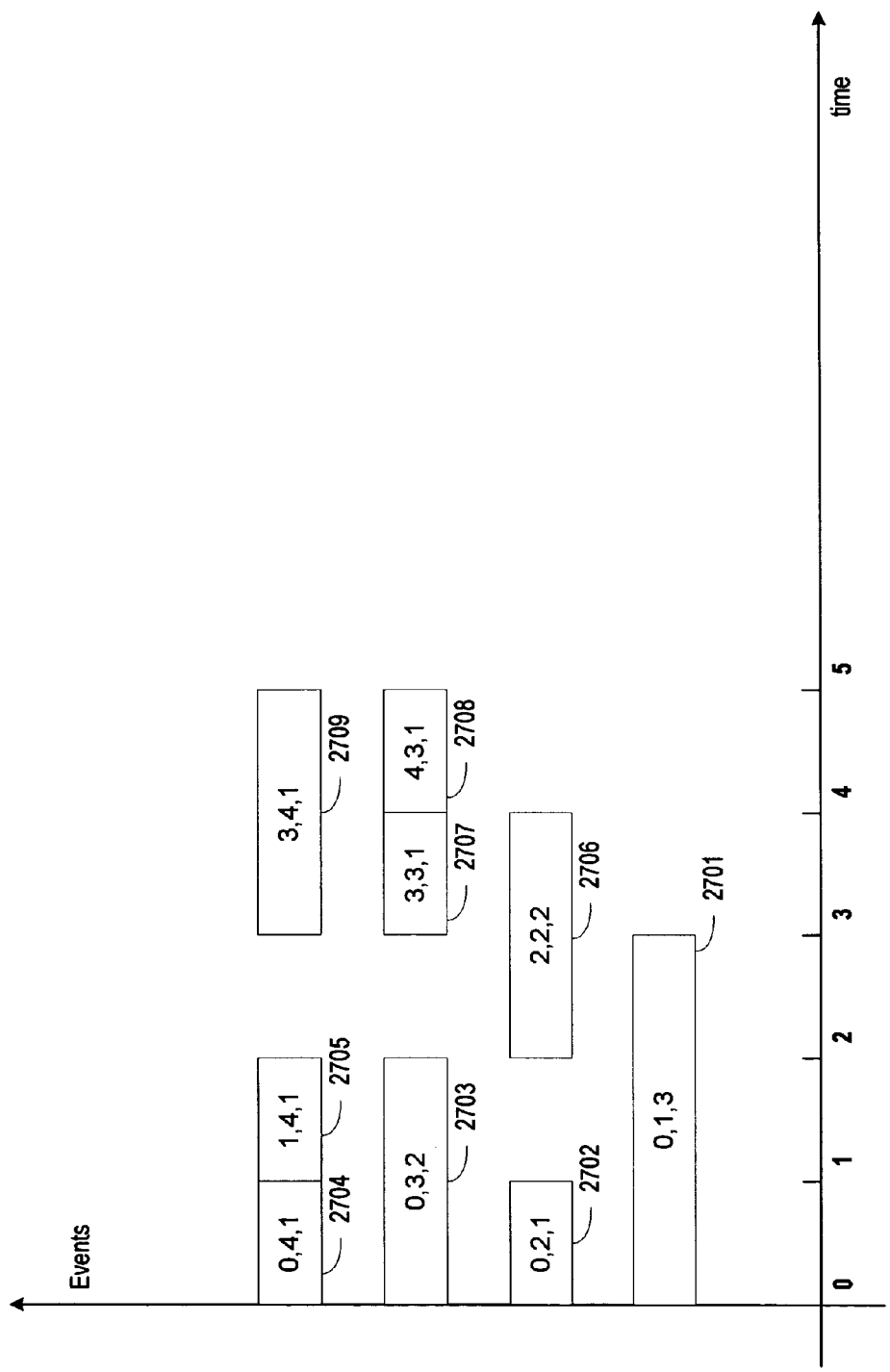
FIG. 27 illustrates an exemplary interface of the event modification module 321 in FIG. 3.

The event modification module 321 provides various interfaces for a user to display information and to modify related events. The interfaces allow a user to examine the events from various aspects and with a specific order. For example, a user may wants to examine the events by the chronological order and examine the simultaneous events by a spatial order. FIG. 27 will show an exemplary form to display events. Different events may need different interfaces for effective editing, depending on preferences, settings, and event's nature as well as related rules for determining interfaces. Through proper interfaces, a user can modify the images and voices associated with an event, the program for generating images and voice, and the parameters passed to related library functions. The module 321 can also provide interfaces for a user to specify the rules to modify events automatically. Sometimes, a user may want to insert some events not mentioned by the input document but important for animating, the module will insert these events for achieving more smooth transition, more natural in images or voice automatically according to related rules for inserting extra events. For example, if an input document describes the behaviors of a person and does not mention the response of around people, then it is more natural for the module 321 to create events to reflect other people's reactions corresponding to each person's specific situation.

The event synchronization module 322 organizes a series of events in a specific order. One can create an event schedule according to the chronological order and spatial order of events. Some events may happen before or after other events, and some events may happen simultaneously with other events. The generated events may contain results explicitly from the action expressed by an input document and implicitly from event interpolation. The module 322 can also provide interfaces for a user to specify rules on how to synchronize events, to change the display the order of events, to adjust the parameters associated with related events, and to sort events. The module 322 further provides interfaces to display events in various forms according to their categories. One especially important form is to display events according to their chronological order and provides interfaces for a user to examine events from various aspects, to modify events, and to adjust their sequences. FIG. 27 will show an example for arranging events according to their chronological order. In addition, the module 322 can provide interfaces for a user to apply a specific synchronization rule on selected events to arrange these events properly.

The event dispatch module 323 generates virtual events. Depending on implementation, the system can create images indirectly or directly. In order for a viewer to view events dynamically from various directions and from different positions, it will be more convenient for the system to create objects and their actions in computer memory for simulating 3-D space and then create images and sounds reflecting these objects and their actions according to the viewer's position. However, if a user has defined the viewing position for all moments, then it can be simpler for the system to create the images of their objects and actions directly.

The event track module 324 provides interfaces for a user to track events by specifying tracking rules, recording rules, and displaying rules. Through the tracking rules, a user can specify what the user wants to track and how to track. A user can track image, voice, and information in form of caption, dialogue, script, and original text. Through the recording rules, a user can specify how to record the tracked information. A user can save the tracked information as it is or save it differently such as enlarging the important portions of image and inserting background information. Through the display rules, a user can specify how to display the tracked information. According to a user's setting, the system can display the tracked information one time or repeatedly, immediately or after a session. The module 324 can also provide interfaces for a user to track events manually by supplying play, repeat, forward, backward, pause, stop, and edit buttons. Depending on setting, while letting a user to track events, the module 324 can further let the user to edit events and their associated object, text, voice, and action.

The object status track module 325 traces the selected objects and displays their statuses. Focusing on events related to particular objects, this module 325 is special case of module 324. The module produces interfaces for a user to track an object and display the status of the object during different stages so that the user can clearly see how the object changes. The status of object can include body language, spoken words, related description, and action generated from the object. The module 325 will snapshot the objects under tracking.

The viewing module 326 provides interfaces for a user to set up default viewing positions. There can be a predefined and fixed viewing position, several predefined and fixed viewing positions, and a dynamically generated viewing position. Depending on settings and implementation, a viewer can view events in a fixed position only, in one of the several fixed positions according to the events, or in a dynamic position according to the eye's position of the viewer. For example, a user can set up the default viewing position for watching most events to a fixed viewing position and set the default viewing position for observing a conversation between two people switched back and forth from the eyes of each person. Depending the event generation and settings, the module 326 can display regular images, stereo images, or even full view images. If the generated events are in the form of objects and their action in a three-dimension space, which are independent of the viewing positions, then the image observed from a viewing position is the direct projection of these 3D objects according to that viewing position. As the viewing position changes, the observed image will change correspondingly. When the generated events are in the form of objects and their actions in a two-dimension space and a viewing position is different from the default position that the system generates the events, the module 326 can display images in several different ways. The module 326 can generate the images observed from a viewing position by fixing distortions due to difference between a viewing position and a default viewing position, or regenerate the new image specifically for the viewing position, or simple use the images associated with these events without removing distortions. Before sending the images to related display device, the module 326 can combine the images with their related dialogue rectangles and captions.

When a viewer changes the viewing position, the module 326 can change generated voices correspondingly. The module can adjust the relative volume of a generated monophonic voice according to the distance and the obstacles between the viewer and the source of the voice. The module 326 can further adjust relative volume and relative phases of the left channel and right channel of a generated stereophonic voice according to the relative position of a viewer and the source of the voice.

The playscript generation module 327 generates the script for the conversations among people as well as background comment. This module 327 converts statements into conversations and comments according to the methodology to produce playscript from a document. The module 327 can also provide interfaces for a user to specify the rules on how to generate playscript. The module 327 can further provide interfaces for a user to write playscript manually.

The dialogue generation module 328 generates the dialogue rectangle displayed in a cartoon. The module 328 can quote a dialogue directly from an input document as well as create a dialogue indirectly by converting a sentence in the input document. Usually the dialogue consists of important information in a compressed format. The module 328 can also provide interfaces for a user to specify rules on how to create, modify, format, and display dialogue. The module 328 can further provide interfaces for a user to create a dialogue directly, specify its location, and associate the dialogue with related events.

The caption generation module 329 generates captions on the displayed image. The module 329 creates the captions directly from the original conversation and description of an input document, or indirectly by modifying some sentences in the input document. The module 329 can provide interfaces for a user to specify the rules on how to generate, modify, format, and display captions. The module 329 can further provide interfaces for a user to create, modify, and format captions manually, specify its display position, and associate captions to related events.

The image modification module 330 provides proper interfaces to display images and modify them if necessary. A user can modify image directly by changing image's settings and properties or a user can modify image indirectly by changing related rules for adjusting image. For example, when a user previews the animation generated from an input document, if there is anything improper, the user can modify the 3-D object images and the 2-D object images.

The voice modification module 331 provides proper interfaces for a user to display the voice information about a person and to modify the voice of the person on particular sentences or for under particular environments.

The text modification module 332 provides proper interface to display and modify various text related information such as playscript, dialogue, and caption. The module 332 can also provide necessary interfaces for a user to define rules for modifying text automatically.

The action modification module 333 provides interfaces for a user to modify actions. Focusing on the transitional process of events, this module is a special case of the event modification module 321. The module 333 can provide interfaces for a user to modify an action directly by changing corresponding images, linking the action to different images, and specifying detail control.

The image synthesis module 334 generates images. The synthesized images can be 2-D images of objects and their actions that the system can directly display or 3-D images of objects and their actions that the system can project into 2-D images, 3-D images, or panoramic images. Usually the system takes less time to generate 2-D images for objects and their actions. However, when there are several different viewing positions, the viewing positions keep changing, a user wants to watch from two or more viewing positions, a user wants to display 3-D images, or a user wants to display panoramic images, it can be a better choice to generate 3-D images for these objects and their actions. One can consider these 3-D images for these objects and their actions as if they were the real objects in a virtual 3-D space, which are independent from a viewer.

The voice synthesis module 335 generates voice according to the person's voice characteristics, the general requirement of the sentence patterns, and the emphasis of particular words or phrases. The module 335 can also generate voice according to voice specification on related sentences. The system may use the synthesized voice directly or indirectly. If the voices being generated are monophonic sounds, a viewer does not change viewing position, and there is no need for adjust volumes for the different distance between the viewer and the various voice sources, then the system can send the commands or audio signal to related audio device directly. If the voices to generate are stereophonic sounds, or monophonic sounds with consideration of the distance between a viewer and various voice sources, then the system will adjust the volume of different monophonic sounds and the relative phases between the left channel and the right channel of a stereophonic sound. The module 335 can also adjust the volume of a voice if an input document has indicated change on voice volume.

The image recognition module 336 extracts characteristics from images. By processing the captured characters according to related rules for extracting information from images, the module 336 can help the system to make a decision. This module 336 is very useful in an interactive presentation. For example, in the Teacher Liang's Lecture Hall, when the system detects that a boy raising his hand or having confusing facial expression, the system will restate related themes from different point of view, or give more example, or ask the boy to state the problem. The module 336 can provide interfaces for a user to specify which information that the user want to extract from images and how to extract from the images.

The voice recognition module 337 extracts characteristics from people's voice and recognizes spoken words. By identifying a person's voice features, the system can imitate the voice. By capturing what spoken, the system can transfer a verbal instruction to a proper command, and allow user to ask oral questions. The system can also use the change in voice features to identify the meaning of a word or a sentence by providing proper weight on meanings taken literally. Further, the module 337 can employ interference cancellation techniques to enhance the probability of recognizing the voice and related text correctly.

The feedback capture module 338 captures a user's feedback. The feedback can be voice, text input, mouse click, body movement, and facial expression. The module 338 can further provide interfaces for a user to specify which feedback the system is going to capture and how to capture a feedback.

The database management module 339 provides interfaces for a user to input, search for, organize, and retrieve data, forms, and rules from a database. The module 339 can use various database techniques to manipulate information, tables, queries, forms, reports, pages, macros, and modules of related databases.

The system may have some specific workshops with each one including proper modules and proper settings for a particular subject or task. The workshop construction module 340 provides interfaces for a user to select a workshop and to build a customized workshop. A user can include many frequently used modules in the workshop, set up the default setting for the workshop, specify general control flow, and generate customer's subroutines to accomplish specific tasks.

Figure 29:
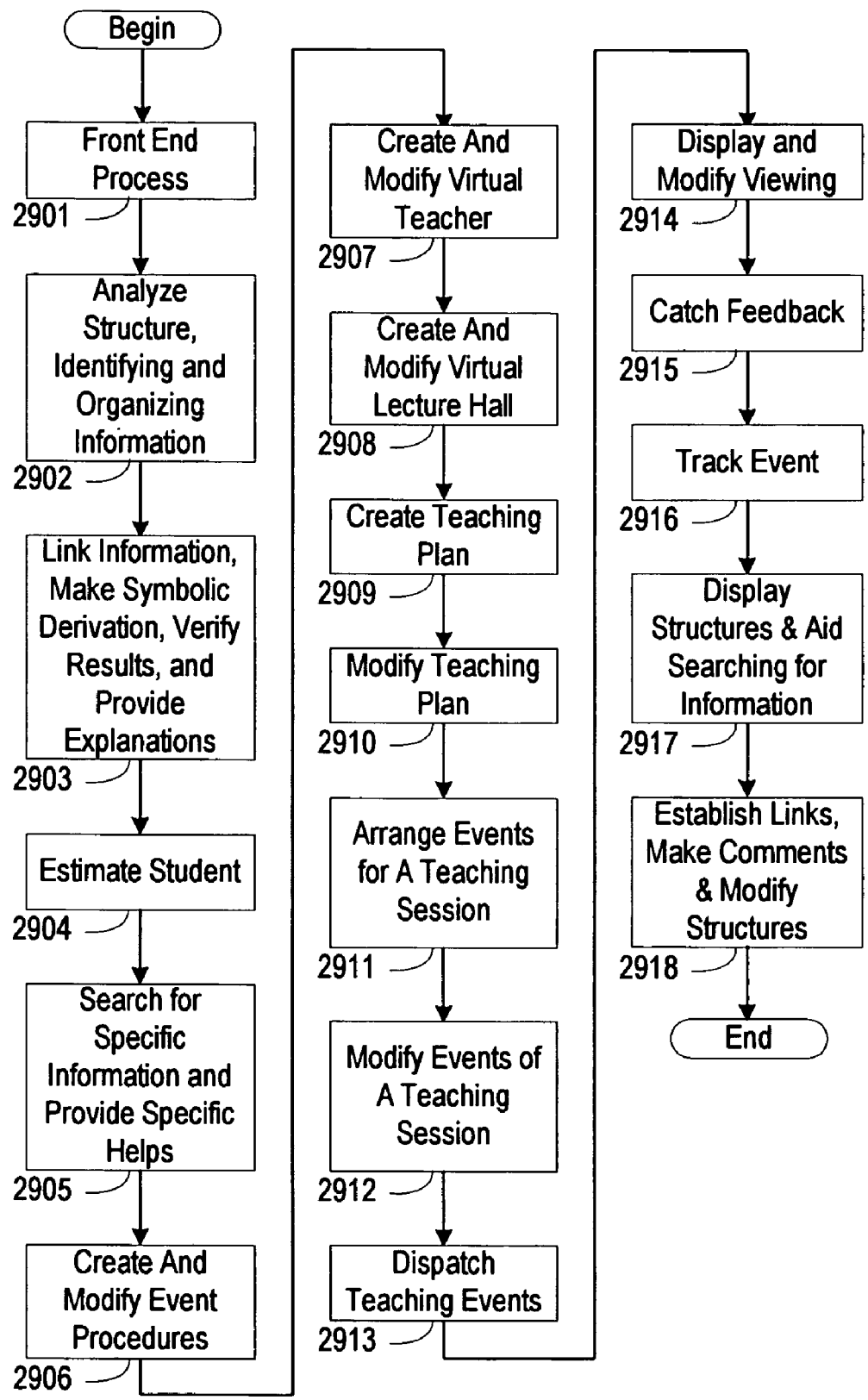
FIG. 29 illustrates an exemplary flowchart of the Teacher Liang's Lecture Hall module 341 in FIG. 3.
Figure 30:
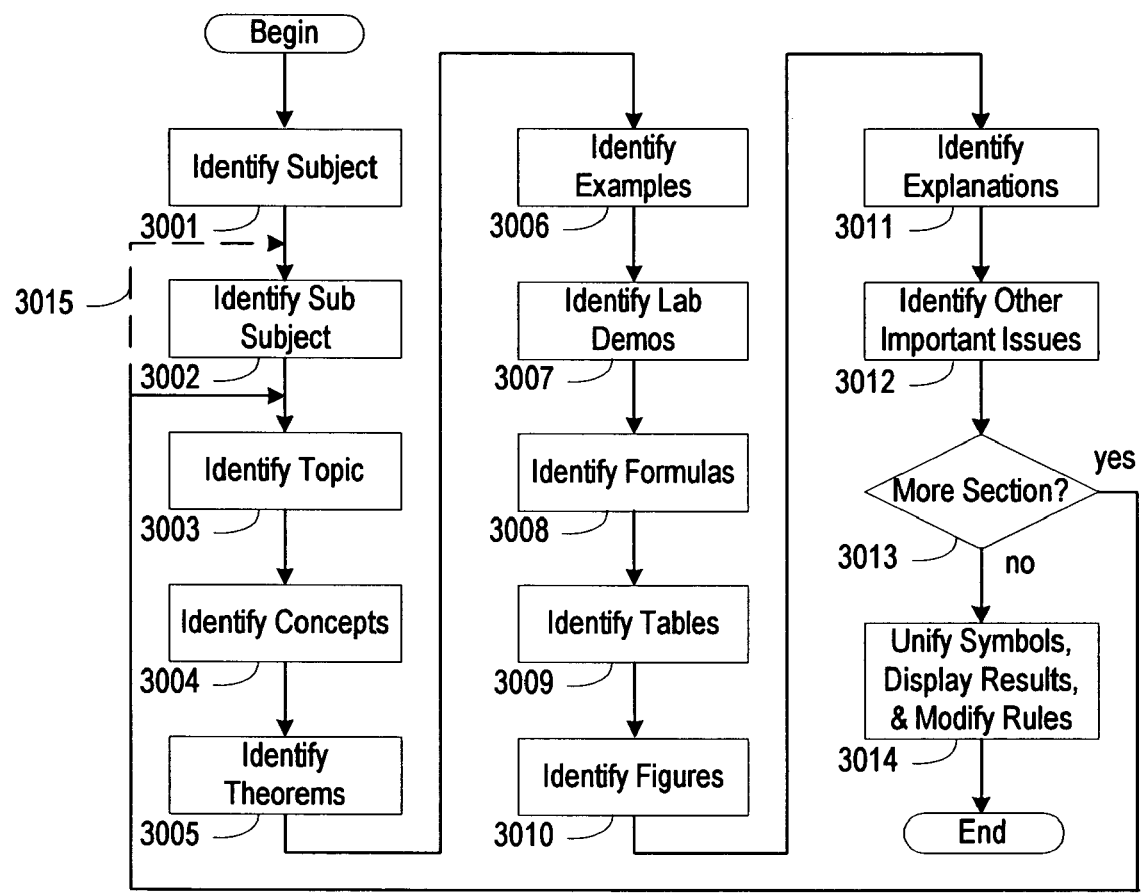
FIG. 30 illustrates an exemplary flowchart of the identify information involved in step 2902 in FIG. 29.

The Teacher Liang's lecture hall module 341 is an exemplary workshop. This workshop includes various common used modules and has its own specific virtual environment. For example, the workshop has a virtual teacher called Teacher Liang and a classroom with whiteboard as well as various rules for setting a default viewing positions, specifying what to write on the whiteboard, when to erase the whiteboard, etc. FIG. 29 and FIG. 30 will provide more details.

The other modules 342 include all other subroutines such as a statement substitution subroutine, a direct and indirect question sentence converting subroutine, an action gap subroutine, an action interpolation subroutine, and a document comparison subroutine. The statement substitution subroutine converts a statement from one form to another form. The direct and indirect question sentence converting subroutine converts a direct question into an indirect question and vice versa. The action gap subroutine inserts extra actions between two actions for making events more natural. The action interpolation subroutine inserts intermediate actions between two actions for making the transitions between actions smooth. The document comparison subroutine helps a user to compare from various aspects the original document and the rebuilt document from an animating session.

FIG. 4 shows an exemplary flowchart of an animating session created by the animation system. The major steps in the flowchart are the identification of objects, representing objects, identifying events, creating events, dispatching events, and tracking events. Depending on user's setting and preference, the system can build an animating session for the particular need of a user. The system extracts information from an input document, organizes the information in structures, creates objects, identifies, interpolates and synchronizes events, constructs events with voice, text, and image, and provides interface for a user to track events.

At step 401, the system preprocesses an input document. The input document may be an image document, a text document, a structured document, an object document, or an event document. The system converts the input document into a proper format, extracts information, and avoids unnecessary work. FIG. 11 will give more details.

At step 402, the system identifies the objects specified in the input document. An object can be anything mentioned in the input document. Some examples of the objects commonly found in a document are people, cars, and computers. Though an object may have several different identifications because of abbreviations, synonyms as well as the pronouns, the system will treat the different identifications equivalent for identifying object purpose. The system can also have commonly used objects saved in database as templates. Through interfaces provided by the system, a user can modify an object created from an object template.

At step 403, the system analyzes the input document. Since the sentence structures can help identifying the importance and the meaning of words and phrases and identifying objects and the relations among them, the grammar analysis will be a very important portion of the analysis. The properties specifically for sentence structures keep the information about sentence structures. The system can have some forms designed specially to display the sentence structures for various purposes.

Usually different document types focus on different information and require different ways of presentation. Since the documents of a same document type can have many commonly interesting issues, a user may want to format these issues in the same way, display them in same forms, and examine them through similar interfaces. The system provides interfaces for a user to define document types and the associated structure templates for each document type. Here a structure template is an exemplary illustration of how to organize information. A structure template can also have some properties associating with related rules for extracting, formatting, and displaying information and some properties further consisting of several sub-properties. For simplicity, one can call the properties that usually are together and their associated rules as tags or substructures. For example, a tag can have a property for holding document title and a rule for how to identify a title; a tag can have a property for holding the thesis statement and a rule for identifying and generating thesis statement. The system can build structures according to corresponding structure templates and fill some properties by corresponding extracted information. Similar to structure template, a tag template is a tag with its properties served and for serving as a model only. A tag can have one or more properties with some properties further associated with related rules. Since some properties can be for special purposes only, their contents do not need to display all time.

After extracting the sentence structure information, the system further extracts other information in ways specified by the corresponding rules associated with structures, their substructures, and the document types. A structure or a substructure can have rules associated with its properties directly and indirectly. A rule directly associated with a property tells the system how to handle the property such as how to extract information from an input document. A rule indirectly associated with a property is a rule associated with a category of properties. The rule itself can resident anywhere in the system and tell the system how to handle a category of properties in similar ways. The rules can use any available methods to analyze grammar and extract information.

The system uses the default structure templates associated with a document type or preferred structure templates as the reference for extracting information and building structures for the input document. Having most rules and tag templates defined and associating with one or more display forms, each structure template is for a particular document type. After extracting information, the system will fill each structure with corresponding information.

The step 402 and step 403 may repeat several times to identify object properly and extract all information correctly. Sometimes the system can identify objects with more confidence only if the system has performed the structure analysis especially the grammar analysis correctly. Sometimes system can do the structure analysis especially the grammar analysis with more sureness only if the system has identified the objects for sure. Since these conditions may contradict each other, the system will run the iteration several times to resolve the dilemma gradually. For example, the system can assign a possibility for each particular speech part or each particular sentence structure to a word or a phrase according to particular situation and general statistics, exclude the impossibilities, and select a most favorable combination that meets all grammar rules and has the highest overall likelihood ratio.

At step 404, the system generates a structured document, which contains organized information and can be in many different forms. A structured document is a document containing information from one or more structures. From a structured document, the system can recover the original structures. There are many different formats to organize structures. Among these formats, two formats are particularly interesting. The first format consists of the regular blocks of the input document with various predefined marks embedded inside. These embedded marks help the system to separate information. The second format contains default delimiters to separate different information with space reserved for corresponding information.

At step 405, the system provides interfaces for a user to display and modify a structured document. The system can provide three ways for a user to modify the structured document. The first way provides interfaces for a user to modify the associated rules, apply the modified rules, and generate new information. The second way provides interfaces for a user to modify the contents of related properties only. The third way provides interfaces for a user to create new properties, link the new properties to related blocks, define new tags, add new tags to structures, and build new structures. There can be many different ways for building the interfaces. For examples, according to the embedded marks or default delimiters, the system provides interfaces for a user to specify which properties to display, emphasize the current properties, and do modifications. The system can also provide interfaces for a user to display the components of a structured document vertically and horizontally and modify the structured document by various approaches.

The steps 404 to 405 can repeat zero to many times.

At step 406, the system defines auxiliary objects according to user's requirements and related rules. Here an auxiliary object is an object not mentioned directly in an input document but needed for clarification and assistance. One example is the background image of the animating presentation and another example is a virtual teacher defined in FIG. 31.

At step 407, the system extracts information from a database and Internet as well as from the structured document and the input document for these objects and auxiliary objects. How to extract information depends on the rules associated with the prototypes of these objects and auxiliary objects. The system can also provide interfaces for a user to edit the rules associated with these objects and auxiliary objects and to modify these objects and auxiliary objects directly.

At step 408, the system initializes each object according to the information extracted about each object, preference, and related background information and provides interfaces for a user to make specification. According to default settings and the information collected at previous step about objects, the system is going to create the objects virtually in proper computer languages and data structures. The system may have several different settings for a same object. For example, the system can have a regular object template and a funny template for a same person. Document type, preference, and user's setting will decide which one to use. Suppose a user wants to animate a story about the ancient people's life in Indian. First, the system initiates related aspects of each person according to the corresponding description about the person in the original document and initiates the other aspects with the default settings about ancient Indian's people. The default settings can have some limited variations on the typical appearance and behavior of ancient Indian people from face, clothing, and accent to gesture. Then, the system provides interfaces for a user to make modifications and create special effects for each particular person. For a cartoon, a user may want to make the features of the characters more prominent by using funny settings instead of formal settings. A user can further specify and modify the procedures and their parameters associated with an object through proper interfaces provided by the system.

At step 409, the system generates an object document, which is a special structured document with object information included directly or indirectly. An object document can have a flat organization with the aspects and the associated rules of each object linked to respective files and database records. An object document can also have multiple layers of organization with the all aspects and associated rules of each object specified in the object document.

At step 410, the system provides interfaces for a user to display, examine, and modify the object document. The interfaces can be in either text-based format or graph-based format. Through these interfaces, a user can change the object document and its related files directly or indirectly. For example, when a user wants to change the face shape of a human object, the user can open a graph-based interface and modify the face shape directly or the user can open a text-based viewer and specify one of the predefined face shapes. Through proper interfaces, a user can build outlook appearance for an object and a user can save the object as an object template in database with instance information removed.

At step 411, the system identities all the events. Here an event means any thing that generates physical movement or mental activity. The system provides interfaces for a user to define rules for identifying events from an input document. Usually an event associates with the verbs and their variations. An event can be in a general sense. For example, one can consider the generation of background's sound as an event, create rules for extracting the features of background voice, and create rules for modifying the features and recreating the background voice.

At step 412, the system inserts necessary assistant events, which an input document does not mention directly. The system provides interfaces for a user to create and modify rules on how, where, and when to insert assistant events. The input document may describe the pictures of an event but there is no natural connection between two pictures. In this case, a user may insert some extra pictures between them to make action more nature or smoother. There can be rules for identifying if the transition between two events looks smooth or natural, for generating extra events, and for inserting the extra events. The system can provide several ways for a user to insert assistant events. For example, a user can select related events, specify the requirements for the extra events, and then asks the system interpolate them by various event interpolation technologies. Here the event interpolation technologies include various image interpolation and smooth technologies. The system can also provide interfaces for a user to create assistant events and insert the events or their links in the object document directly for either smoother transition or clarification.

At step 413, the system synchronizes all the events. The system provides interfaces for a user to specify the rule for identifying the relations among different events and for dispatching events in proper order. The events can relate to each other. One of the most important relations among events are the sequence of events, that is, which events occur earlier, which events occur later, and which events occur simultaneously. Some events happen simultaneously and some events occur by a specific order. The system can determine the sequence of events according to an input document or the default behavior of particular object type. When people walk, for example, the leg's movement and hand's movement usually has some relation between them. Sometimes one can further separate an event into several smaller sub-events and therefore it is important to keep proper relations among the sub-events. When the system displays an event by generating image, voice, dialogue, and caption, the system should align up these sub-events.

At step 414, the system generates an event document, which is a special structured document with event information included directly or indirectly. The event document can have many different formats. For example, the system may have many events predefined in its database with each predefined event associated with a unique event ID. When the system generates an event document, the system just specifies the related event IDs in a sequence. The system can also generate an event document with some non-predefined events specified explicitly by using a sequence of instructions or linking to related document and records. The system can further provide interfaces for a user to define macro event, which consists of a sequence of sub events.

At step 415, the system provides necessary interfaces for a user to display, examine, test, and modify the event document generated at step 414. The system provides interfaces so that a user can modify the event document directly by changing the related sequence of commands, linking to different files, and altering event parameters. The system also provides graphic interfaces so that a user can modify the event document indirectly by resorting to various graphic edit techniques. Through proper interfaces, a user can split event, merge event, reorder event, insert event, copy event, delete event, and scale time resolution.

At step 416, the system dispatches events by generating events in proper forms and creates images, voices, and texts by generating a sequence of instructions for related devices. The system can generate images for these events indirectly or directly. To provide a viewer to observe an event from a different position, the system can create virtual objects and their actions in a virtual 3-dimension first and then generate images for these virtual objects and their actions dynamically according to the relative position between the viewer and these objects. The system can also generate images directly according to the relative position between the viewer and these objects. Further, depending on implementation, the system can generate the sequence of instructions in operation system functions with corresponding parameters and then calling corresponding operation system functions to generate image, voice, and text. The system can also generate the sequence of instructions in form of a sequence of commands and parameters understood by related applications and then call these applications to generate image, voice mad text indirectly.

At step 417, the system provides proper interfaces for a user to track the displayed picture, produced voice, and presented text. Through proper interfaces, a user can record, move forward, move backward, play, repeat, pause, stop, change viewing direction, alter display format, open a side window, zoom in, zoom out, and search for information. For example, after a user selects a person, the user can replay the portion of animation that contains the selected person and record this portion of animation. The system also provides interfaces for a user to specify the searched criterion in form of text, voice, and image features and displays the related portions in original document, in the structured document, in the object document, and in the event document.

Figure 5:
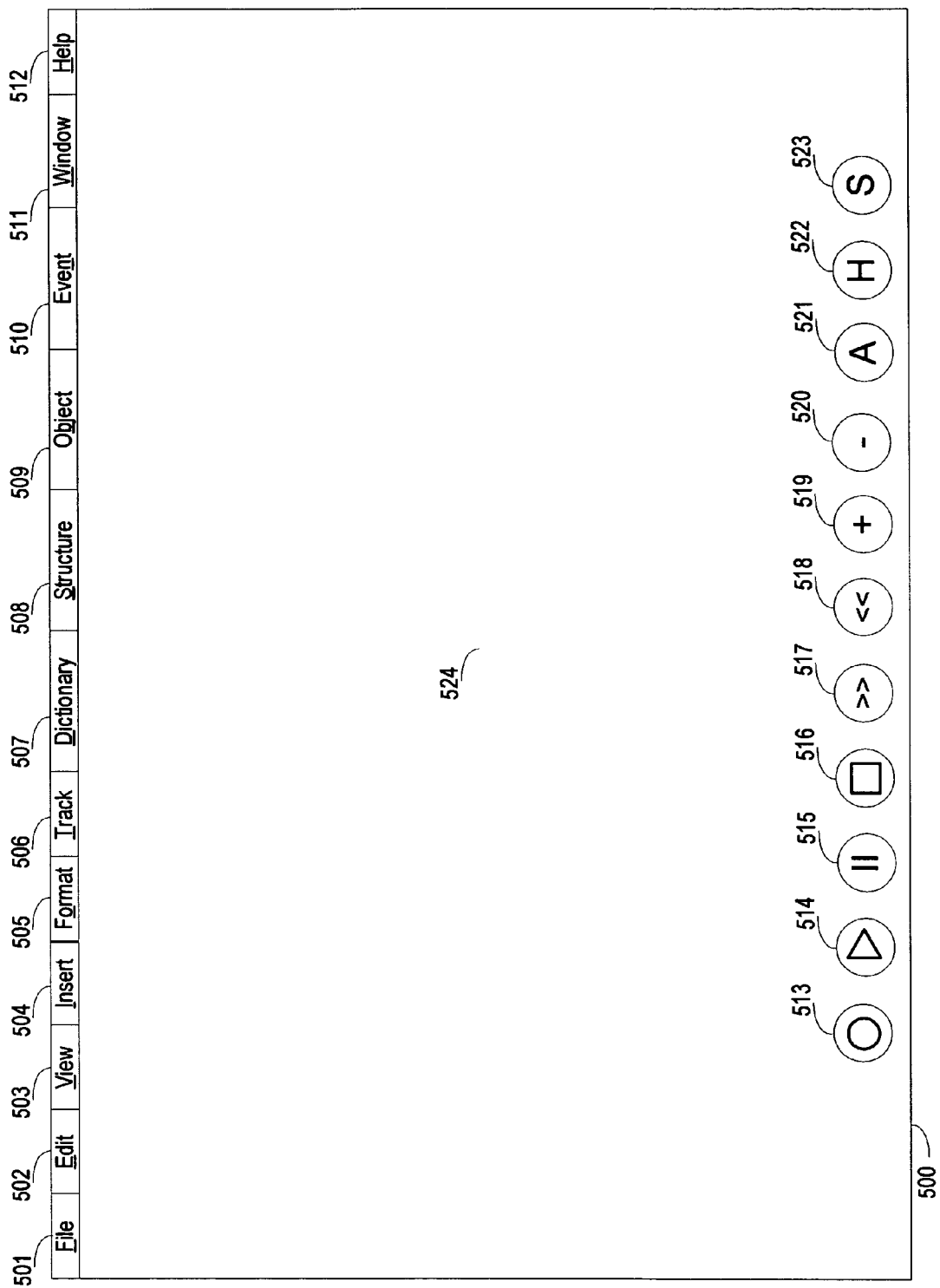
FIG. 5 illustrates an exemplary graphical interface of the system.

FIG. 5 shows an exemplary interface of the animating system. The interface 500 consists of a menu bar and a tool bar. The menu bar has menus such as file 501, edit 502, view 503, insert 504, format 505, track 506, dictionary 507, structure 508, object 509, event 510, window 511, and help 512. The tool bar has command buttons such as record 513, play 514, pause 515, stop 516, fast forward 517, fast backward 518, zoom in 519, zoom out 520, analysis 521, help 522, and search 523. The blank area 524 is for displaying image, dialogues, and captions.

FIG. 6 shows an exemplary action dictionary. From implementation point of view, on one hand, the action dictionary should provide as high-level action description as possible if the data structures for corresponding objects have corresponding functions. For example, if the system has defined what walk means for two-legged creatures and for four-legged animals, then there is no need for further distinguish the meanings of "walk" into four-legged animals and two-legged creatures. On other hand, the action dictionary should provide detail general action description so that the system or a user can have enough information to build action description for a new object type according to the general action description in the action dictionary.

The action dictionary 601 has many words and idioms in its organization. A person can sort these words and idioms in one or more particular methods. A common sorting method is by alphabetical order. In this example, there are the word "walk" 602 and the related idioms "walk away out" 603 and "walk through" 604. Each of these words and idioms can have several meanings. For example, the word "walk" has meaning 1 with the associated patterns $605_1$ ... and meaning L with the associated pattern $605_L$. Since there can be different actions even for a same meaning, it is desirable to separate each meaning into several categories. Usually a person can describe a category by the type of related subject and the type of related object as well as other features. Each category corresponds to a specific action. A person can further define sub categories for a category for further distinction. In this example, the first meaning of "walk" has M associated categories $606_1$ to $606_M$, and the Lth meaning of "walk" has N associated categories $607_1$ to $607_N$. The corresponding action descriptions for categories $606_1$ to $606_M$ and categories $607_1$ to $607_N$ are $608_1$ to $608_M$ and categories $609_1$ to $609_N$ respectively. An action description can be in form of script, macro, subroutine, formal language, and regular expression and can have one or more different forms. How much detail an action description will present depends on how the system defines related objects. For example, one of the meanings of "walk" is to move about one foot firmly before lifting the other, as two-legged creatures do, or by placing two feet firmly before lifting either of the others, as four-legged creatures. If both two-legged object and four-legged object have the "walk" definition in their data structures, then there is no need to define what "walk" means for each of them and the system can simply issue "walk" instruction to each of these objects. However, if two-legged object or four-legged object has no the "walk" definition in its data structure, then the action description should give more detail description on what "walk" means for two-legged creatures and for four-legged creatures.

There can be many variations of the exemplary action dictionary. For example, instead of further defining categories for a particular meaning, one can have a related object associated with proper action for the particular meaning. A category can have subcategories with the category associating with a general action description and with each subcategory associating with a specific action description.

FIG. 7 shows an exemplary model dictionary. A user can build a new object from an object model in a model dictionary. A model dictionary establishes the general links among various possible responses, action conditions, and corresponding object models. According to the identified object type and the specified conditions, the system can predict some possible responses. This feature is good for generating actions not specified by the original input document and for creating assistant event. For example, one can express "He is happy" by showing that a person is smiling or showing that a person speaks with a happy tone.

The system builds objects according to the corresponding object models and modifies the specific details according to the information extracted from an input document as well as saved in a database. The model dictionary 701 has many predefined models included. The system can sort these models by various methods. In this exemplary, there are models such as the animal model 702, the human model 703, the laboratory model 704, the lecture hall model 705, and the Teacher Liang model 706.

Each of these models can have sub-models with each sub-model having some of its parent's properties and associated rules inherited, some properties and associated rules overrode, and with some new properties and their associated rules added. For example, under the laboratory model 704, there can be specific sub-models such as a physical laboratory, a chemical laboratory, and an electrical engineering laboratory. Under the electrical laboratory, there can be a wireless communication laboratory, a microcomputer laboratory, and a circuit design laboratory. Each laboratory can have its default lookout, various instruments, etc. Also associated with each laboratory, there are procedures for conducting various experiments. These procedures describes how to carry out corresponding experiments, what equipment a virtual demo will use, how long a demo will take, what results to expect, and how to display the results. Some procedures are general for giving guidance on many similar experiments and some procedures are more specific and for particular experiment only. A procedure can have other procedures embedded in it.

Each model can have many different aspects and each aspect can have many possible different values. An action usually depends on the combination of actual values associated with different aspects and the condition for triggering that action. Therefore, it is useful to list the possible aspects of an object in many different ways with each different way called as a partition for sorting objects. One can separate an object according to many partitions with each partition emphasizing on a particular aspect of the related objects. In this example, the model dictionary sorts the human model 703 into P different partitions, the first partition $708_1$ to the Pth partition $708_P$. The first partition separates human object into Q different types $709_1$ to $709_Q$ and the Pth partition separates human object into R different types $710_1$ to $710_R$. The action conditions 711 specify the general conditions for a particular action to happen. The action conditions may have some types as their parameters. The corresponding action descriptions 712 describe the default behaviors. Even for same action conditions, there can be several different action descriptions. The system depends on default setting and object specific setting to decide which description to use. The system can provide interfaces for a user to override an action description of an object build from an object model in a model dictionary.

The system can provide interfaces for a user to describe a human object and find co-ordinations of the human object in each of these partitions. The co-ordinates as well as other related factors such as status will determine the possible responses for that human object.

Both action dictionary and model dictionary provide information on action description. An action dictionary links a word or a phrase to a corresponding action according to matched pattern. An object model links a word or a phrase to a corresponding action according to the object type. Usually an action dictionary provides high-level and general action descriptions for particular meanings and a model dictionary provides action descriptions for related objects. Sometimes even for a same object type and a same word description, a model dictionary can have several different action descriptions. According to the action conditions associated with an object model, the system can actively search from related indications from an input document or organized information.

One can define various proper data structures for document type, structure, and tag. The data structures consist of variables for holding corresponding information and functions for processing information. FIG. 8A to FIG. 8C shows some examples of the major components of a document type, a structure, and a tag respectively.

FIG. 8A shows exemplary components associated with a document type. The components are the name for the document type 801, the default structure templates 802, the default associated rules 803, and the default document level properties 804. Having identified the document type, the system can build corresponding structures according to the default structure templates 802, extract information and perform various tasks concerned at document level according to the default associated-rules 803, and create the default document-level properties 804. These default structure templates are the base for creating structures, for extracting information, and displaying in a way that satisfies the need of many users.

FIG. 8B shows exemplary components associated with a structure. These components include the name for the structure 811, the default associated tags 812, the default display forms 813, the default associated rules 814, the default structure level properties 815, the special tags 816, the special display forms 817, the special structure level rules 818, and the special structure level properties 819. A structure template is a structure with only the essential information left and with instance specific information removed. The system creates a structure from a structure template and provides interfaces for a user to create special display form, special rules, and special properties for a particular structure instance. The default associated tags 812 hold information for default substructures. Each default tag can have some predefined rules to tell the system how to handle information. The default display forms 813 can display the information associated in default tags of the structure. The default associates rules 814 specify how to process information by default. The default structure level properties 815 holds information on structure level. Besides the default tags, display forms, and properties, there can be specific tags, display forms, and properties. The system can provide interfaces for a user to build these specific ones from either scratch or modifying existing ones. The special tags 816 hold information of corresponding specific substructures. The special display forms 817 display information specifically for the structure and its tags. The special rules 818 specify how to handle the information specific for this structure such as how to identify, create, and extract information. The special structure level properties 819 will hold information specifically for the structure. In case of conflict, the specific forms, rules, and properties will override their general correspondences.

FIG. 8C shows the basic components of am exemplary tag. The components are the name for the tag 821, the contents 822, the default associated rules 823, the default display formats 824, the default tag level properties 825, the special tag level rules 826, the special display formats 827, and the special tag level properties 828. A tag holds its contents as well as the related rules and the ways to format. A tag template is a tag with instance-depending information removed. The rules associated with a tag will guide a user to provide information for a tag and extract information from an input document. The system saves or links the information related to a tag instance to the contents 822 of the tag. The default associated rules 823 and the default display formats 824 define the default ways to process and display the information related to the tag respectively. The tag has default tag level properties specified by the default tag level properties 825. The tag can also have some special rules, display formats, and properties defined by the special associated rules 826, the special display formats 827, and the special tag level properties 828 to process, display, and hold information related specifically to the tag respectively.

FIG. 9 shows an exemplary flowchart of the rule management module 306 in FIG. 3. The flowchart describes the general procedure of verifying results and modifying rules. Many other modules in FIG. 3 may call this module. The system provides interfaces for a user to display rules, verify results, test rules, and modify rules heuristically.

The system can make a task done with or without the control of some rules. Some tasks are well-defined tasks such as some functions pre-embedded in the system or some functions predefined by a user. An example of well-defined tasks is the operation to select a document from a file menu. Some tasks are more flexible. For these tasks, it is difficult to provide a complete description especially at the beginning before a user conducts a detail study on all possible cases. Under many situations, a user will understand a task gradually and will be able to provide description more complete progressively. Therefore, for these flexible tasks, a user can specify corresponding rules, if want to debug the rules, and under which conditions to debug the rules. The system can provide interfaces for a user to specify the rules associated with a task. At step 901, the system checks that if any task will be under the control of some rules. If no, end and otherwise, go to step 902.

At step 902, the system looks for related rules. The rule can associate with a document type, a structure prototype, a structure instance, a tag prototype, a tag instance, and a display form. A rule can have several sub-rules with each one for a different situation or with sub-rules running in specific order. Being in form of subroutines, scripts, regular expression, macro, or formal language, a rule can further associate with some properties. One property of a rule can be the purpose of the rule or the comment made on the rule.

At step 903, the system executes the related rules. Because rules can have different forms, the system will execute them differently. The system can execute some rules directly and some rules indirectly. The system executes some subroutines, scripts, and regular expressions directly by calling compiled functions, related library functions, and related application. The system can also translate a rule in a formal language into proper sequence of commands. If the system embeds the required environment for running a rule, then the system will run the sequence of commands directly. Otherwise, the system will call a corresponding application to execute the sequence of commands.

At step 904, the system checks that if a user wants to verify the result, train rules, and modify rules. If no, go to step 915 and otherwise, go to step 905.

At step 905, the system displays task description, input data, and the results from running a rule and lets a user to check the results. There can be some errors or no error at all.

At step 906, the system checks that if a user has found any error. If there is no error, then go to step 915. Otherwise, go to step 907.

At step 907, the system determines the categories of the task. A task can have several categories according to different points of view. For example, one can sort a task according to its related rule, its related prototype, its related instance, and its related display form.

At step 908, the system displays the rules related to the task. For example, the related rules can be the rules under a same category or the rules related to a previous task. A user can define related rules by specifying rules for identify related rules of a task.

At step 909, the system reconstructs the environment, which generates error when executing a rule to accomplish a corresponding task. One can call the portion of the current environment that makes a rule to generate an error as the current sample. The system sets everything back to the status just before the execution of the rule. For debug purpose, the system can provide interfaces for a user to interfere with the execution.

At step 910, the system updates testing samples by loading related testing samples with the current sample added. The system will use the updated testing samples to test and modify the rule and its related rules.

Depending on the actual implementation of a rule, at step 911, the system will provide corresponding environment for debugging the rule. For example, if a rule is in form of DLL (dynamic link library) function created by GCC (GNU Compiler Collection), then the system can provide a debugging environment similar to GNU debugger or launch a DLL function debugger application with proper parameters. If a rule is in form of a formal language, then the system will translate the rule into a proper script or a proper subroutine and will provide proper interface for a user to debug the script or subroutine to find the problem in the rule.

Figure 10:
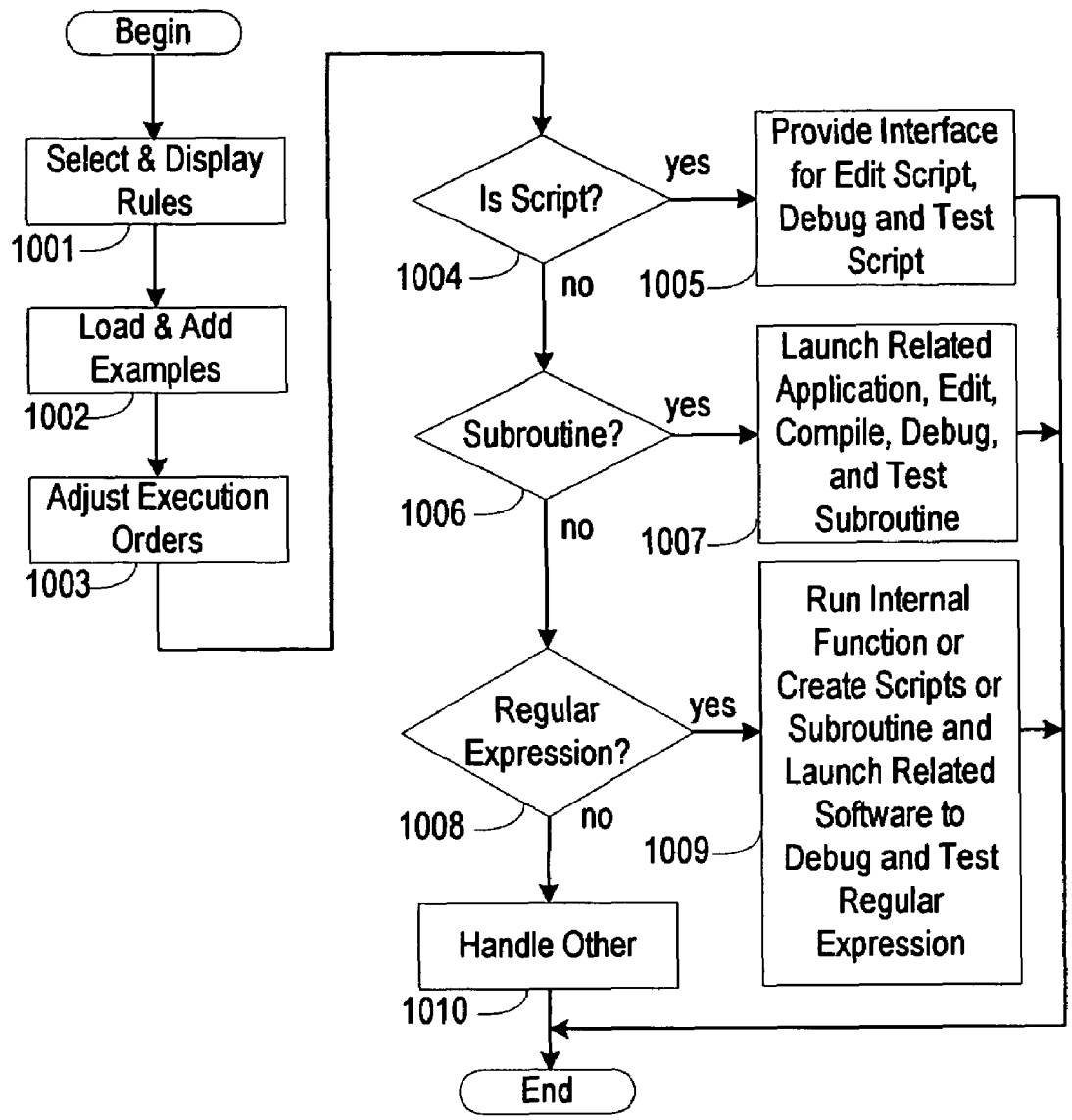
FIG. 10 illustrates an exemplary flowchart for debugging and testing rules for step 911 in FIG. 9.

At step 912, the system will provide interfaces for a user to modify, combine, split, add, and remove the rule and its related rules. These rules can be in form of scripts, DLL subroutines, regular expressions, and other methods such as formal languages and patterns. FIG. 10 will give a flowchart about this step.

At step 913, the system applies the rule and its related rules on the updated samples and displays the results. It frequently happens that when a user modifies a rule to remove an error, the user may accidentally introduce other errors. A user can generate these unintended errors when the user modifies a rule by ignoring some aspects required from the rule for processing other existing samples correctly. The system can provide interfaces for a user to test the modified rule against the current sample, to test the modified rule on other samples, and to test other modified rules on the updated samples. The system can also provide interfaces for a user to apply various techniques to handle rules such as splitting a rule into two or more rules, combining two or more rules into one rule, and moving portion of a rule into another rule.

At step 914, the system checks that if there is any error. If there is no any error, then go to step 915. Otherwise, repeat the steps 907 to 914 until no error.

At step 915, the system will update the results. The system can send the results to related procedures, properties, display forms, or databases. Then go to step 901 and repeat until the system has finished all tasks.

FIG. 10 shows an exemplary flowchart of editing rules. Depending on the implementation of a rule, the system will provide corresponding interfaces for a user to debug.

At step 1001, the system produces interfaces for a user to select and display interesting rules in proper forms. A rule may include many aspects such as purpose, text description, applicable condition, source code, an associated object code, or a DLL function. Through the interfaces, a user can find related rules from various aspects.

At step 1002, the system loads existing test examples. The system can also provide interfaces for a user to create new test examples.

A task may use several rules. One can consider these rules as a huge rule consisting of several rules as its sub-rules and the conditions on when to apply each of these sub-rules. A user can also specify the order of these rules. For example, a user can arrange these rules in a specific order and let the system runs the first rule first. If the first rule does not work or does not apply, then the system tries the second rule. At step 1003, the system provides interfaces for a user to specify the execution order of related rules. In case there are different ways for implementing a same rule, the user can set a default method for that particular rule.

At step 1004, the system checks that if a rule is a script. The system can obtain this kind of information by checking the identification of the script language used in the rule or by the value assigned to related property for marking the script type when the rule is created. If it is a script, at step 1005, the system provides necessary interfaces for a user to edit the script, debug the script, and test the script or launch related application to examine the script. If not, go to step 1006.

At step 1006, the system checks that if a rule is a subroutine that needs compiled before execution. The system can obtain the information by checking the identification of the language used for writing the source code of the subroutine and the property registered when the rule is created. According to the information saved in related properties or in a database, the system can decide that if a subroutine has its associated object code or its related DLL function created already. If not, the system will call related applications to compile and execute the rule. If it is a subroutine, at step 1007, the system can either create a similar application environment or launch a related application for a user to edit, compile, debug, and test the subroutine. For example, if it is a DLL subroutine generated from a GCC source file, then the system can launch a GDB debug window with some predefined main program prototype filled with proper parameters. If not, go to step 1008.

At step 1008, the system checks that if a rule is a regular expression. The system can obtain the information by checking the language grammar syntax of specific regular language used or from the registered property when the rule is created. If the rule has a regular expression associated with it, then the system will go to step 1009. Go to step 1010 otherwise.

At step 1009, the system executes the regular expression if the system contains a proper engine to execute the regular expression and otherwise the system will launch a proper application to run and debug the regular expression. The system can use a corresponding application to handle a different kind of regular expressions.

There can be other methods to implement rules directly or indirectly. At step 1010, the system handles all other methods. For example, one can use patterns to describe a rule to include or exclude something for extracting and identifying the features from an image.

FIG. 11 shows a general flowchart of the preprocessing module 307 in FIG. 3. This flowchart extracts as much information from an input document as possible, avoids unnecessary work, and transfers information into proper form.

At step 1101, the system will check that if the input document is already in electrical form. If yes, go to step 1107 and otherwise, go to step 1102.

At step 1102, the system will convert the input document into electrical form by using a scanner. The scanner can be in various forms such as pen scanner and xerography-type scanner.

At step 1103, the system will separate image. One can separate a portion of image into a portion of text image, a portion of figure image, a portion of table image, or a portion of formula image. The system can have a set of rules to identify the type for each portion of image. After separating image, the system will call related subroutines to process different portions of image. For example, there can be a subroutine to convert a portion of text image into a block of text, a subroutine to reconstruct a figure from a portion of figure image, and a subroutine to build an equation from a portion of formula image.

At step 1104, the system will recognize the text in a text portion of image. The system can use various available techniques to recover text from image. A general technology is pattern recognition. The system can further separate a text image into paragraph images, separate a paragraph image into sentence images, and further separate a sentence image into a set of word images. Then the system can identify a word from a word image by either adjusting a word pattern to fit its corresponding word image or adjusting a word image to fit its corresponding word pattern. The adjustment can include scaling, tilting, enhancing image, sharpening edge, removing blur, and reducing noise. The system can further reduce the possible candidate words by checking if these words are legal words in a dictionary and by making use of the relations among words, sentences, and paragraphs.

At step 1105, the system will recognize the figure in a portion of figure image. Depending on the setting, the system can display the portion of figure image as it is or apply a related image-processing algorithm to extract the features from the portion of figure image and then generate a figure according to the extracted features with ignoring trivial details. Through this step, the system can create the animating objects and figures similar to the ones on the original input document with extra features added or some features emphasized. The system can also include various image identification and extraction algorithms.

A user may want to have some portions of image as they are. The equations and the figures on original document can be such examples. At step 1106, the system will mark each of these portions as an embedded item and record its relations with other portions of image. Now, the system is ready to do structure analysis.

At step 1107, the system will check the input document for any unlabeled items such as figure, list, and table. If the input system is in electrical form, but there are some unlabeled items, then the system needs to extract information from the input document and therefore go to step 1103.

If all items labeled, then the system will go to step 1108 to check that if the input document is in a structured document already. If no, go to structure analysis and otherwise, go to step 1109.

At step 1109, the system will check that if the input document contains the object initialization information. If no, go to identify object, extract object-related information, and modify related structures. Otherwise, go to step 1110.

At step 1110, the system will check that if the input document has specified events. If no, go to identify event and otherwise, go to modify event.

Figure 12:
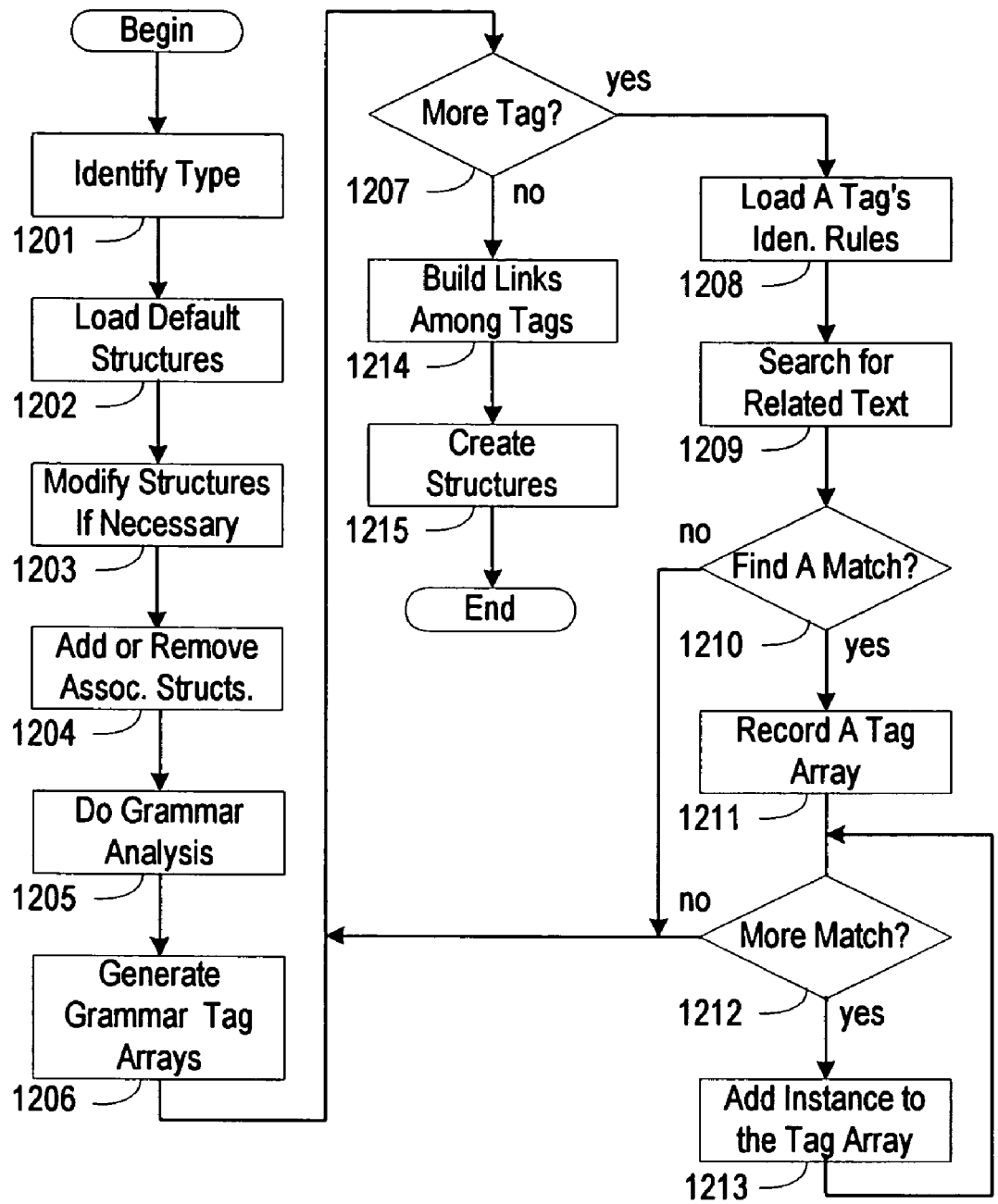
FIG. 12 illustrates an exemplary flowchart of the structure analysis module 308 in FIG. 3.

FIG. 12 shows an exemplary flowchart of the structure analysis module 308 in FIG. 3. The system first finds out the grammar information, then finds other specific information, and further fills tags and structures with corresponding information.

At step 1201, the system identifies the document type of an input document. The system can obtain the document type of input document according to title, author's name, author's profession, and special vocabulary used in the input document.

At step 1202, depending on the document type identified, the system loads default structure prototypes associated with that document type into computer memory. These prototypes serve as the base for constructing structures for the input document.

At step 1203, the system provides interfaces for a user to modify the structures to meet specific needs.

At step 1204, the system provides interfaces for a user to add new structures or remove unwanted structures. One can build a new structure from a structure prototype or from scratch.

At step 1205, the system analyzes the grammar of the text portion of the input document. The grammar analysis is helpful to identify the relations among various objects specified in the input document. The system can employ various grammar analysis techniques.

At step 1206, the system creates a structure containing grammar tags holding information of sentence structures and speech parts. From the structure, the system can obtain grammar information when it needs. The system can further generate a structured document to contain both the original text information and the extracted grammar information.

The structures may need more information. At step 1207, the system checks that if any tag needs information at this stage. If yes, go to step 1208 and otherwise, go to step 1214.

At step 1208, the system loads the identification rules of a tag into the system. This rule tells the system how to search for the information needed by the tag. The tag can be a tag built from a tag template associated with a structure template or a tag specified by a user.

At step 1209, the system searches for related text. Depending on the implementation, the system can search for related text directly or indirectly.

At step 1210, the system checks that if there is any match. If no, go to step 1207 and otherwise, go to step 1211.

At step 1211, since the system has found something, the system will create a tag array to save the information. A tag array can have one tag only or several tags.

At step 1212, the system checks that if there is any new match. If no, go to step 1207 and otherwise, go to step 1213.

At step 1213, since the system finds a new match, the system increases the tag array and adds the new match to the tag array. Repeat steps 1212 and 1213 until no more matches.

At step 1214, the system builds links among the tags. The system can build the links among tags according to the relations predefined in a structure prototype. The system can further provide interfaces for a user to build links among tags. With the links, a user can jump from one spot to another so that the user can check related information easily.

At step 1215, the system creates the structures. Each structure has tags associated with it and has several possible display forms associated with it.

Figure 13:
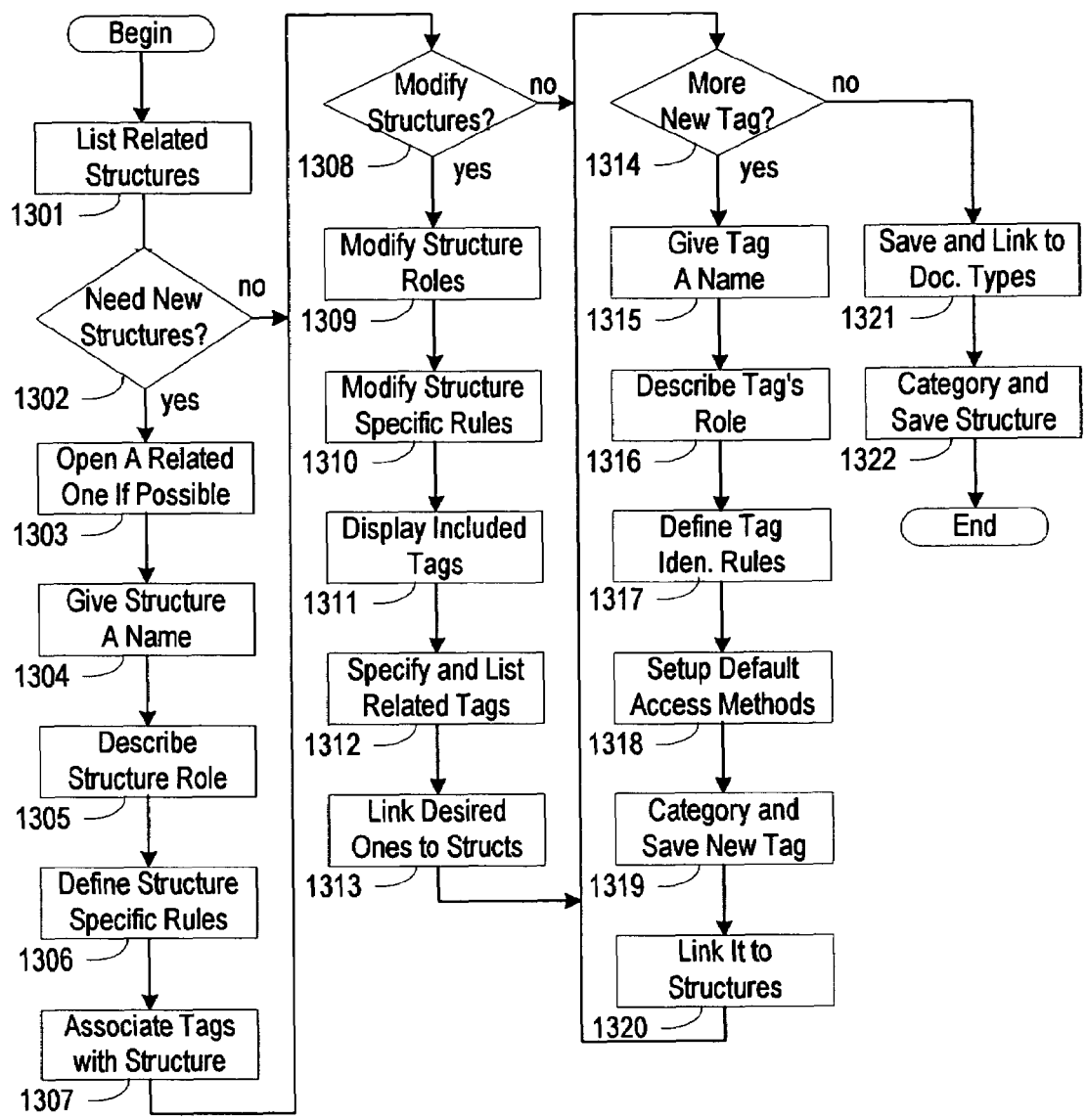
FIG. 13 illustrates an exemplary flowchart of the structure modification module 310 in FIG. 3.

FIG. 13 shows an exemplary flowchart of the structure modification module 310 in FIG. 3. The system provides interfaces for a user to generate a new structure from scratch or from an existing structure, modify an existing structure, add new tags, various rules, and display forms, and establish links among tags, rules, and structures.

At step 1301, the system lists related structures. The related structures can be the structures under a same category.

At step 1302, the system checks that if a user wants to add more structures. If no, go to step 1308 and otherwise, go to step 1303.

At step 1303, the system opens a related structure if there is one. This one will serve as the base to create a new structure.

At step 1304, the system provides interfaces for a user to assign a name to the structure.

At step 1305, the system provides interfaces for a user to describe the role of the structure.

At step 1306, the system provides interfaces for a user to define structure specific rules.

At step 1307, the system provides interfaces for a user to associate tags with the structure.

At step 1308, the system checks that if a user wants to modify the structure. If yes, go to step 1309 and otherwise, go to step 1314.

At step 1309, the system provides interfaces for a user to modify the role of the structure.

At step 1310, the system provides interfaces for a user to modify the specific rules of the structure.

At step 1311, the system displays all included tags.

At step 1312, the system provides interfaces for a user to specify and list related tags.

At step 1313, the system provides interfaces for a user to link desired tags to the structure.

At step 1314, the system checks if a user wants to add a new tag. If yes, go to step 1315 and otherwise, go to step 1321.

At step 1315, the system provides interfaces for a user to give a name to the new tag.

At step 1316, the system provides interfaces for a user to describe the role of the tag.

At step 1317, the system provides interface for a user to define the identification rules for this tag.

At step 1318, the system provides interfaces for a user to set up default access methods for the new tag. The system may use a different form to display a different type of tags.

At step 1319, the system provides interfaces for a user to category the new tag and saves the new tag into database. The system can also category the new tag automatically according to rules for categorizing tag.

At step 1320, the system provides interfaces for a user to link the new tag to a structure. The system can save a tag in several different forms. For example, the system can save a tag as tag prototype with instance related information removed. Then, go to step 1314.

At step 1321, the system provides interfaces for a user to save a structure as a structure prototype and link the structure prototype to related document types.

At step 1322, the system provides interfaces for a user to category a structure and save it into database. The system can save a structure in several different forms. For example, one can save a structure as a structure prototype with instance related information removed. The system can also sort a structure according to some rules for categorizing structure.

Figure 14:
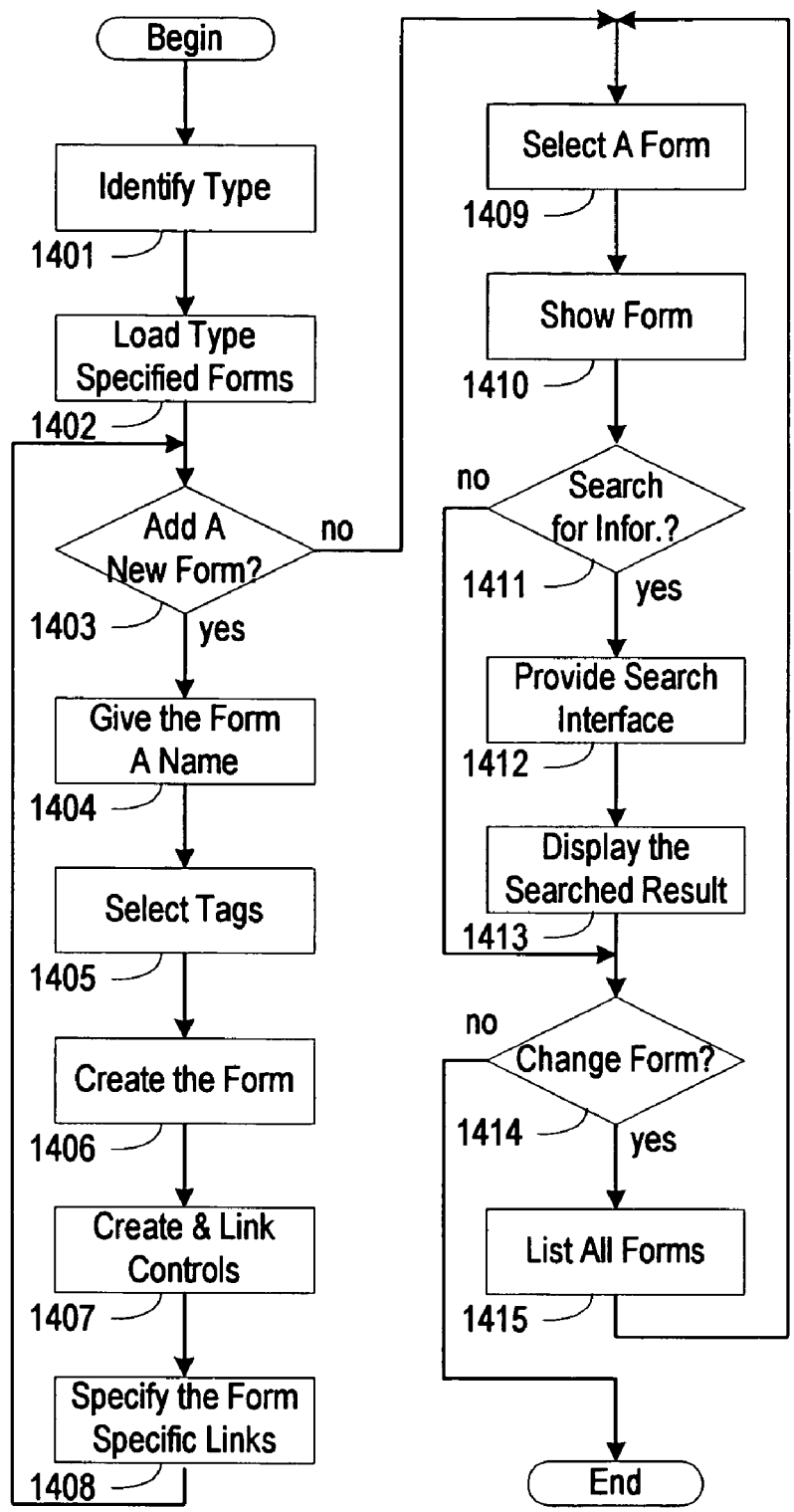
FIG. 14 illustrates an exemplary flowchart of the structure display module 309 in FIG. 3.

FIG. 14 shows an exemplary flowchart of the structure display module 309 in FIG. 3. First, after the system has identified the document type of an input document, the system loads various display forms specifically for the document type. Then the system provides various interfaces for a user to design a new display form. Finally, the system provides interfaces for a user to examine from different aspects in various display forms.

At step 1401, the system identifies the document type of an input document.

At step 1402, the system loads the display forms specific to the document type into the memory. Different document types may have different display forms for the best results.

At step 1403, the system checks that if a user wants to add a new display form. If yes, go to step 1404 and otherwise, go to step 1409.

At step 1404, the system provides interfaces for a user to provide a name to the new display form.

At step 1405, the system provides interfaces for a user to select tags from a structure or from several structures.

At step 1406, the system provides interfaces for a user to create the display form by placing selected tags in proper positions of the form and specifying how to format the contents from selected tags. The system can further provide interfaces for a user to establish relations among tags and disable some existing relations among tags.

At step 1407, the system provides interfaces for a user to create various controls and establish links among controls. These controls provide convenience for a user to perform various commonly used tasks during display. A control can link to a related tag, a macro, or a function.

At step 1408, the system provides interfaces for a user to link the display form to other related forms and related tags. Then, go to step 1403.

At step 1409, the system provides an interface for a user to select a display form.

After a user has selected a display form, at step 1410, the system displays the form with the information from the selected tags.

At step 1411, the system checks that if a user wants to search for other information. If yes, go to step 1412 and otherwise, go to step 1414.

At step 1412, the system provides interfaces for a user to search for information from a display form, a database, and Internet.

At step 1413, the system displays the searched results according to user's search criterion. A user can further modify the results and send the results to proper properties, functions, and database.

At step 1414, the system checks that if a user wants to change a form. If yes, go to step 1415 and otherwise, end.

At step 1415, the system displays all the forms available for a user to select. Then, go to step 1409 and repeat steps 1409 to 1414 until the user satisfies.

Figure 15:
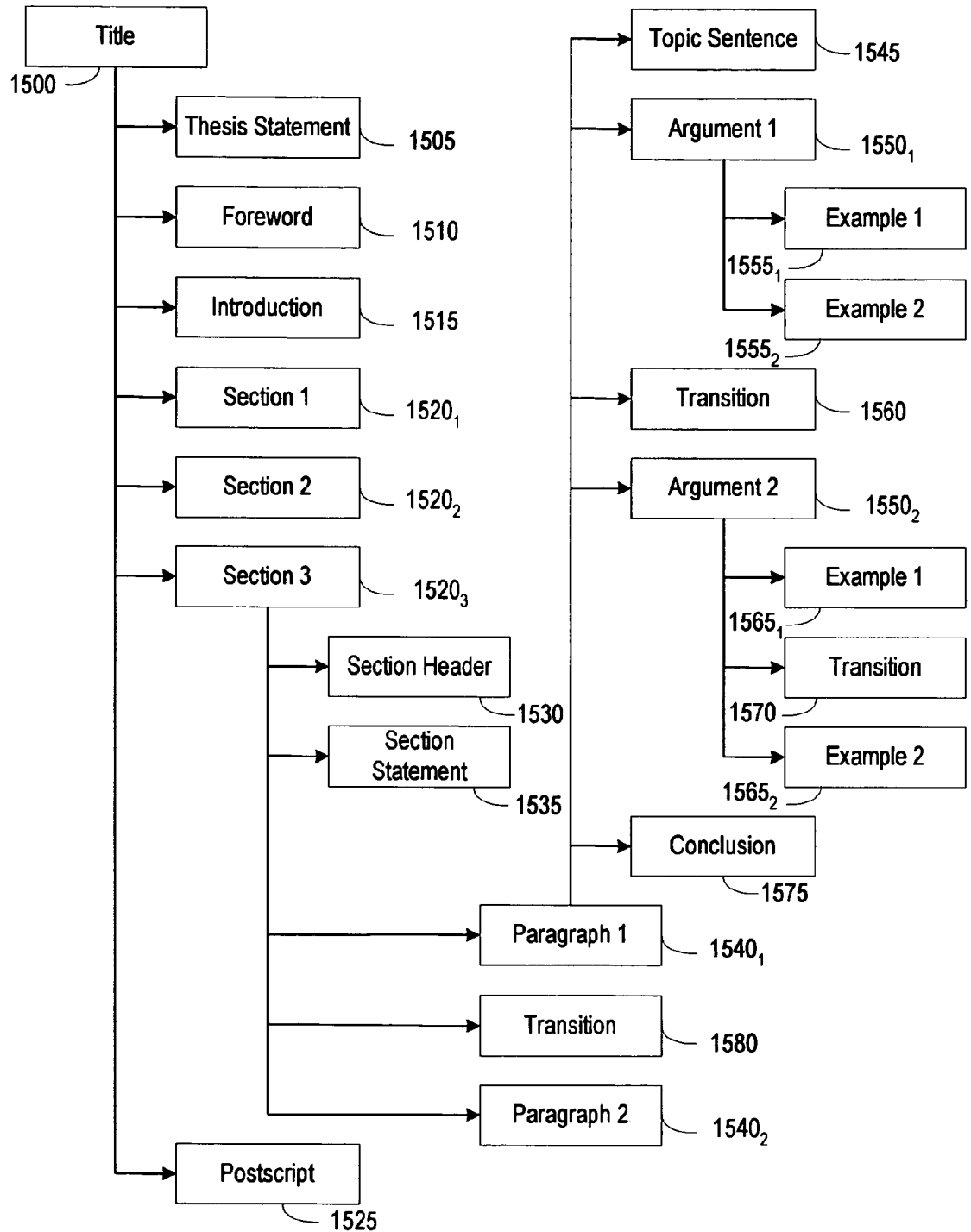
FIG. 15 illustrates an example of a displaying structure.

FIG. 15 is an example of a structure. There can be many different structures with each one for a different purpose. Since the one shown in FIG. 15 contains most components of a regular document, it is one of the most commonly used structures. This structure has the most frequently encountered components such as title 1500, thesis statement 1505, foreword 1510, introduction 1515, sections $1520_1$ to $1520_3$, and postscript 1525. Under each section, there are section header 1530, section statement 1535, and paragraphs $1540_1$ to $1540_2$. Each paragraph further comprises of topic sentence 1545, arguments $1550_1$ to $1550_2$, and conclusion 1575. Each argument may comprise of one or more examples. For instance, the first argument $1550_1$ has examples $1555_1$ to $1555_2$ and the second argument $1550_2$ has examples $1565_1$ to $1565_2$. There can be a transitional word or phrase 1580 between paragraphs, a transitional word or phrase 1560 between arguments, and a transitional word or phrase 1570 between examples. Each of these components is a tag or corresponds to a combination of several tags. A user can expand some of these components to further explore more detail information or collapse some components to have an overall understanding. The system provides interfaces for a user to add, copy, delete, hide, expand, or compress a component. A user can create a new structure by adding more tags, removing some tags, moving tags into different positions, combining tags, and splitting tags. The system can also provide interfaces for a user to assign some properties to a tag for further specification. For example, a user can specify the example $1555_1$ as the default example for illustrating the first argument $1550_1$.

There can be several ways to display a same structure with each way to emphasize different aspect of the document. Depending on setting, the system can display all information about a tag or display only the default information of a tag and then display other information in the tag when required by a user.

Figure 16:
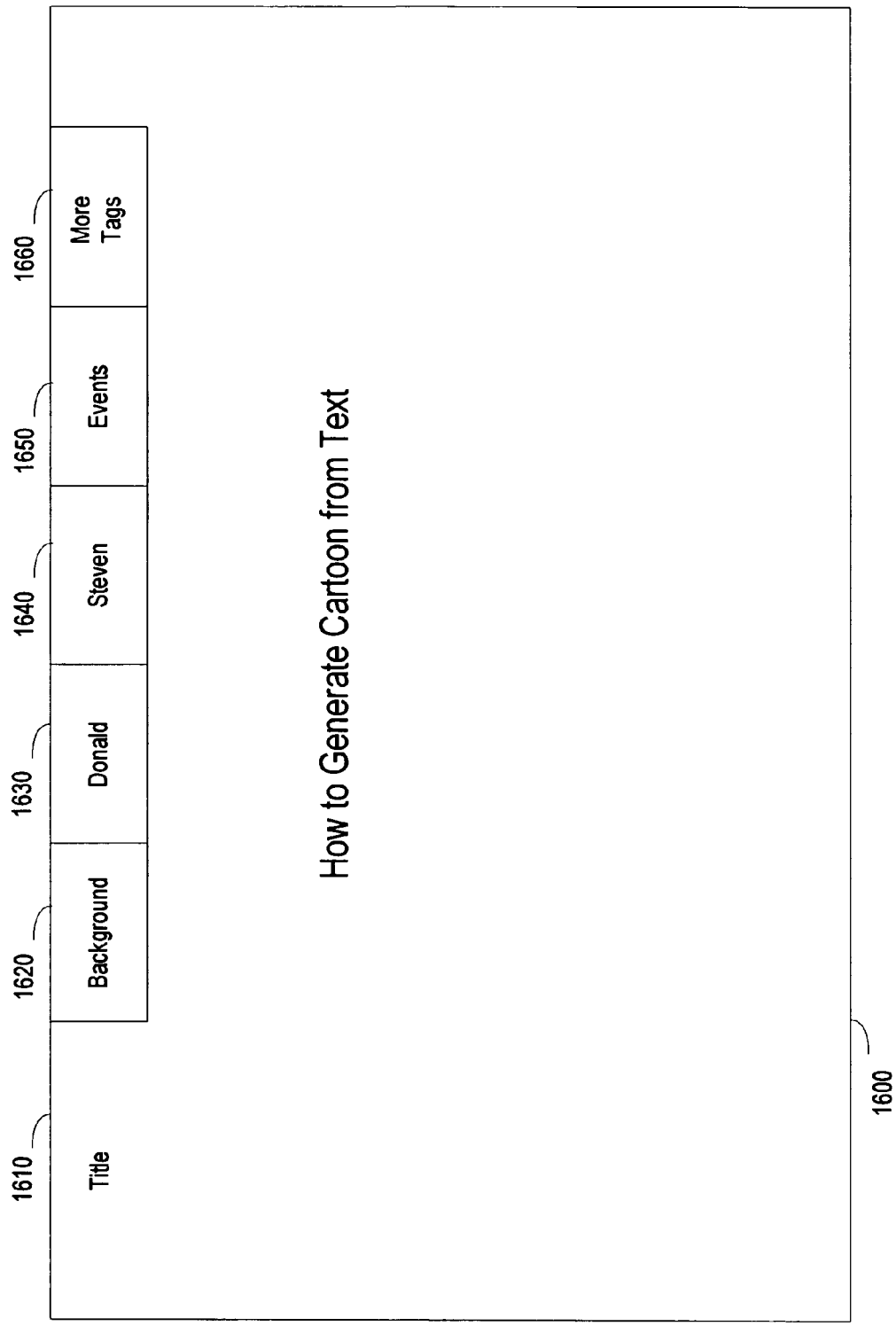
FIG. 16 illustrates another example of a displaying structure.

FIG. 16 shows an example of a displayed structure. Different from FIG. 15, which almost keeps the same organization of original document, this figure shows the interesting issues only with each interesting issue defined by a corresponding tab. In this example, the figure displays the title, background, people, and events. The figure can also display author, company, document thesis, and any interesting issues. This kind of display form is good for presenting information.

In the displayed form 1600, there are title 1610, background 1620, the information about persons Donald 1630 and Steven 1640, the events 1650, and more tags 1660. The display formats can be different for different tabs. There can also be links among tabs and links among different display forms. A tab can simply present a portion of text, a figure, a table, or a formula. A tab can also be a sub-form. Each tab can have all or partial information contained in a tag and information combined from several tags.

Depending on setting, the information about an object can include only the information explicitly specified in original document or include also the information found from a database as well as from Internet. Similarly, depending on setting, the events 1650 can include the events mentioned only in original document, the events inserted by the system for smooth transition, or both. A user can switch among original events, inserted events, and all events. The system can provide interfaces for a user to examine the original text associated with a particular event and check the rules for identifying an event and for generating an extra event.

Figure 17:
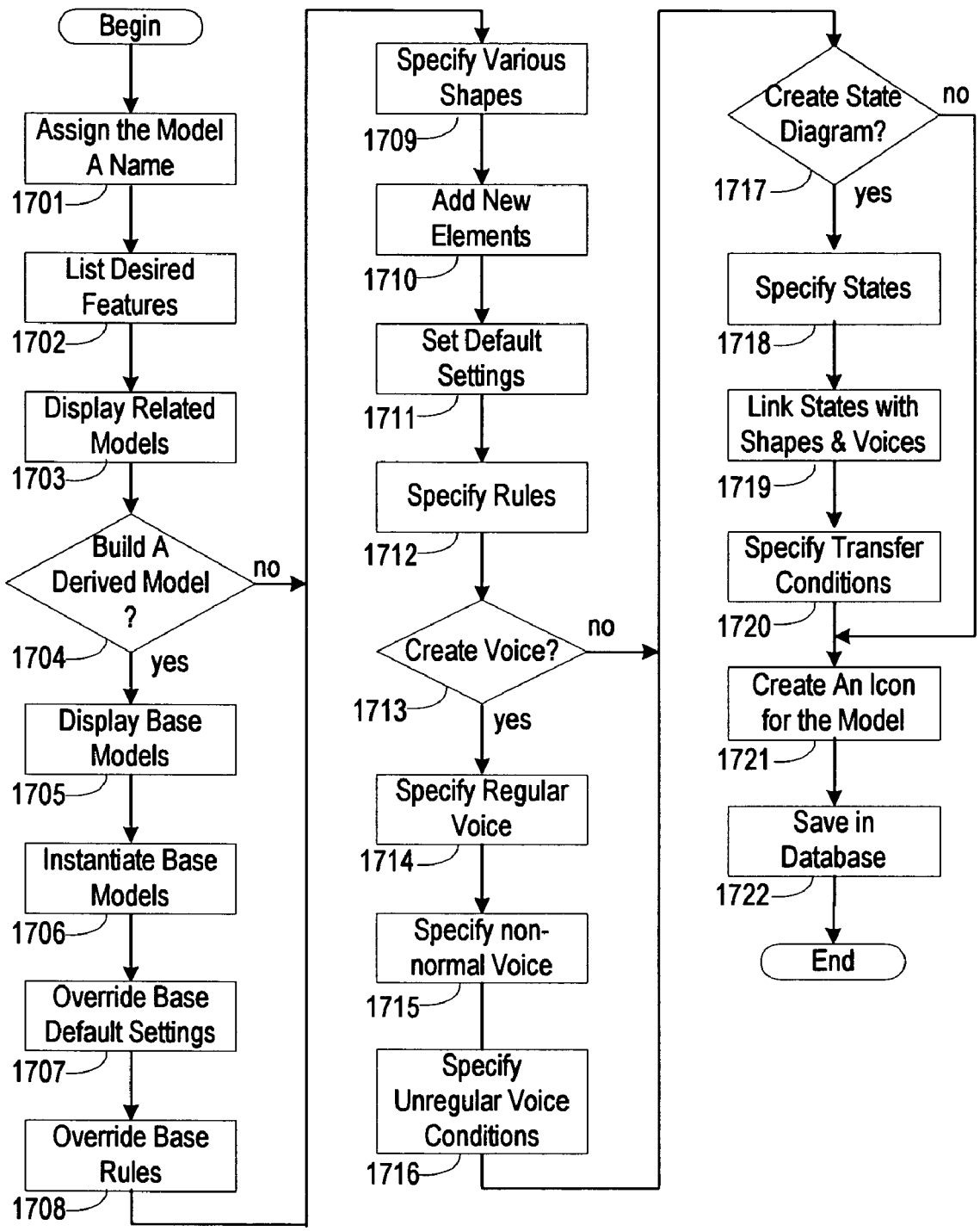
FIG. 17 illustrates an exemplary flowchart of the object model module 312 in FIG. 3.

FIG. 17 shows an exemplary flowchart of the object model module 312 in FIG. 3. A user can build an object modal from scratch or build an object model by modifying an existing object model. An object model should have a name, properties, default setting, and associated rules. If an object model is a human object, then it can have voice models associated. To simulate an object's behavior, one can use state transfer diagrams to reflect the different responses at different states for a same input. By presenting an object model by an icon or a symbol, a user can select and instantiate the object model.

At step 1701, the system provides interfaces for a user to give a name to the object model.

At step 1702, the system provides interfaces for a user to list all desired features for the object model. The desired features can include features defined before and some very basic terms.

At step 1703, the system displays all related object models by category. Since usually one can view an object from many different points of view, an object can be in several different categories. The system can display related objects under one or more categories.

At step 1704, the system checks that if a user wants to build an object model based on an object model defined previously. If no, go to step 1709 and otherwise, go to step 1705.

At step 1705, the system provides interfaces for a user to display the object models and select some of them as base object models.

At step 1706, the system lets a user make one or more instances for each selected base model. That is, a derived object can have one or more instances of each base object model.

At step 1707, the system provides interfaces for a user to override default settings inherited from base object models.

At step 1708, the system provides interfaces for a user to override default rules inherited from base object models.

At step 1709, the system provides interfaces for a user to specify various shapes of the object model. A user can use 2-D dimension figure or 3-D dimension figure to represent the object model. Further, instead of providing figure for the object model directly, a user can describe the object model indirectly by providing an algorithm. The system can execute the algorithm to generate a proper figure. A user can use an algorithm to describe a group of objects under a same category with each one having different parameters associated.

At 1710, the system provides interfaces for a user to add new elements. These elements further specify the object model. The new elements can include some instances of object models previously defined and other basic components or variables.

At step 1711, the system provides interfaces for a user to set the default settings for the object instances based on object models previously defined and included basic components.

At step 1712, the system provides interfaces for a user to specify the rules associated with the object model. These rules specify that how the object model will behavior under various environments.

At step 1713, the system checks that if a user wants to associate a voice model with the object model. If no, go to step 1717 and otherwise, go to step 1714.

At step 1714, the system provides interfaces for a user to specify the regular voice. A person has a different pronunciation from another person in tone, volume, pace, and other features. A user can specify a voice by these parameters. The voice specification mechanics can be more complex. For example, a user can specify the muscle used for each sound and the transition process between particular sounds.

At step 1715, the system provides interfaces for a user to specify the non-normal sound. There can be one or more sets of different non-normal sounds. For example, there can be a set of non-normal sound for laugh and there can be a set of non-normal sound for cry.

At step 1716, the system provides interfaces for a user to specify when non-normal sounds will happens.

At step 1717, the system checks that if a user wants to create a state diagram. If no, go to step 1721 and otherwise, go to step 1718. The state diagram provides a method for a user to examine the change of an object along with the time and stimuli.

At step 1718, the system provides interfaces for a user to specify major states. Theoretically, there can be infinite states. For easy implementation and examination, a user may only need several major states. Also different from regular state diagrams, it is possible for an object specially a human object to transfer from one state to another state gradually. That is, there is no clear boundary between states. A person can say at a particular moment, the object model is close to one state than to other states and at another moment, it may reverse. The system can use a set of parameters to evaluate how close an object to the references states.

At step 1719, the system provides interfaces for a user to links states with related shapes and voices.

At step 1721, the system provides interfaces for a user to specify the transfer conditions from one state to another state. The transfer function can accord to fuzzy mathematics.

At step 1721, the system provides interfaces for a user to specify an icon for the object model. By representing an object model by an icon in the tool bar, a user can select an object model from an object model bar.

At step 1722, the system provides interfaces for a user to save the object model into a database.

Figure 18:
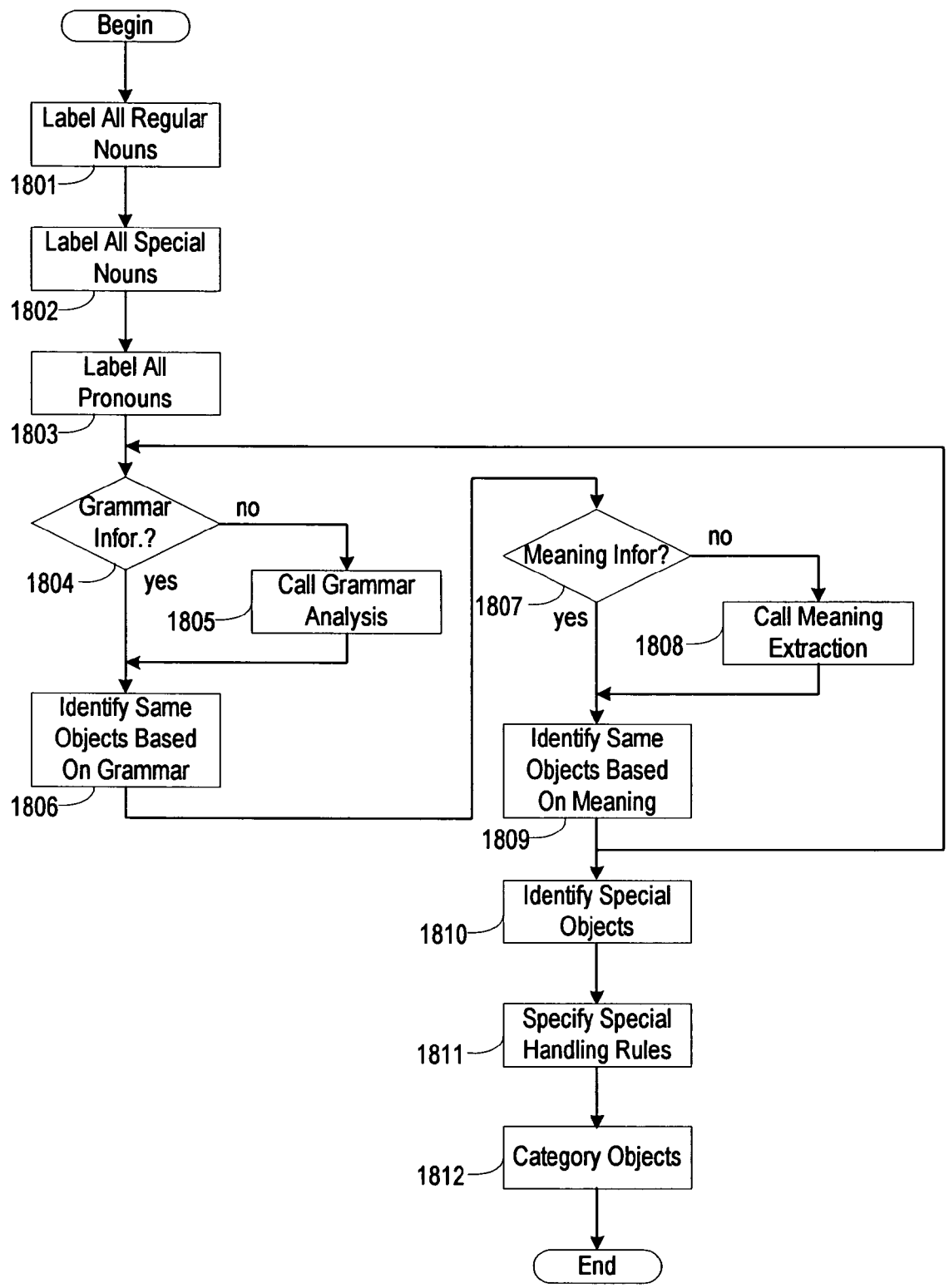
FIG. 18 illustrates an exemplary flowchart of the object identification module 313 in FIG. 3.

FIG. 18 is an exemplary flowchart of the object identification module 313 in FIG. 3. An object can be in a form of regular noun, special noun, or pronoun. Sometimes, an object can have several different names. Usually, a person can tell one object from another object by the related grammar information and their meanings.

At step 1801, the system labels all regular nouns. The system can obtain the information from a dictionary saved in a database and syntactical relations among words.

At step 1802, the system labels all special nouns. Usually special nouns have different fonts and associate with some words with higher frequency than with other words.

At step 1803, the system labels all pronouns.

At step 1804, the system checks that if grammar information is available. If no, go to step 1805 and otherwise, go to step 1806.

At step 1805, the system performs grammar analysis. The grammar analysis provides references for further segregation and helps the system to identify other information.

At step 1806, the system identifies same objects with different names according to grammar information. For example, a subject and its appositive are a same object.

At step 1807, the system checks that if the information about meaning is available. If no, go to step 1808 and otherwise, go to step 1809.

At step 1808, the system identifies the meaning for related words. The system can do this by checking related patterns specified in a dictionary.

At step 1809, the system identifies same objects with different names according to meanings of words and phrases.

At step 1810, the system further identifies special objects. The system can identify many objects according to the grammar relation, the description in original document, and the meanings of related words or phrases. The system can also identify special objects according to the rules for identifying these special objects. The system can further provide interfaces for a user to specify and modify these rules for identifying special objects as well as to identify these special objects manually.

At step 1811, the system provides interfaces for a user to specify the special handling rules for some objects. Many objects have default handling rules for various actions. For example, a human object has default action on walking. The system can also provide interfaces for a user to specify the handling rules, remove some default handling rules, and add some handling rules for some objects. The system will use the specified handling rules to replace the default handling rules when there is any confliction between them.

At step 1812, the system sorts each object into proper categories according to one or more partitions.

Figure 19:
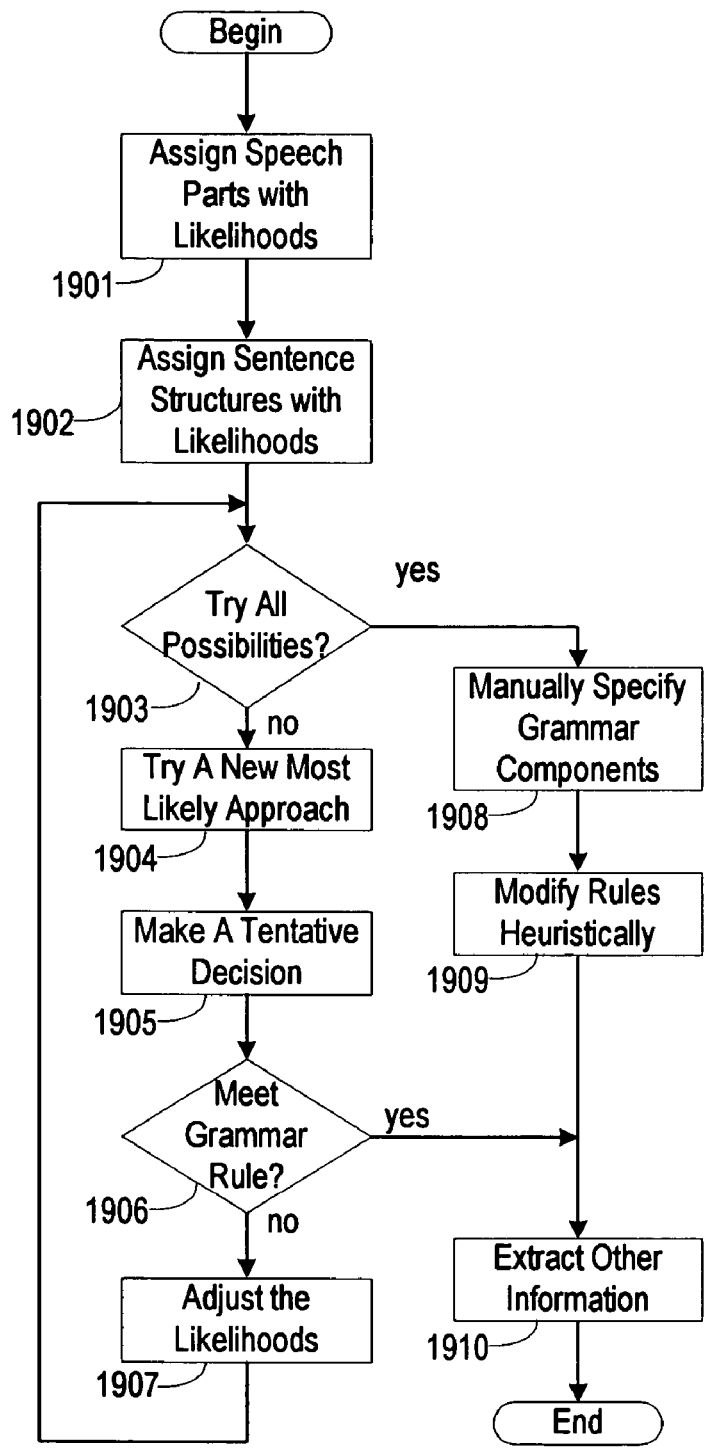
FIG. 19 illustrates an exemplary flowchart of the grammar analysis step 1205 in FIG. 12.

FIG. 19 shows a general flowchart of the do grammar analysis step 1205 in FIG. 12. In this example, the system first assigns each word or phrase a corresponding likelihood for each possible speech part. Then, the system assigns sentence structures to each word and each phrase with likelihoods according to possible speech parts and their relations. Further, the system checks that if a particular assignment of sentence structures meets all the grammar requirements. Finally, the system provides interfaces for a user to manually specify speech parts and sentence structures and modify the rules for identifying grammar.

At step 1901, the system associates each word to different possible speech parts with corresponding likelihoods. The system can accomplish this task according to the available speech parts for a word as well as the relations between the word and other words. For example, the word or phrase after the definite article "the" or the indefinite article "a" and "an" is a noun or a noun phrase. The system can also provide interfaces for a user to specify a speech part for a word.

At step 1902, the system assigns sentence structures to words or phrases with likelihoods. The system can accomplish this task according to the possibility for a speech part to be a particular sentence structure under a specific grammatical environment. The likelihoods of speech parts obtained in the previous step help identify the major sentence structures, narrow possible combination of different assignments, and separate a sentence into several closely related blocks. For example, a word with high possibility to be a verb has a high possibility to become a predicate or part of a predicate. The system can also provide interfaces for a user to specify the sentence structure for a word or a phrase. A user can define a more complex rule for assigning sentence structures to words or phrases by further considering conditional possibilities. In addition, the system can suspend assigning any sentence structures to some words or phrases and make assignment later after collecting enough information.

At step 1903, the system judges that if the system has checked all possibilities. If yes, go to step 1908 and otherwise, go to step 1904.

At step 1904, the system is going to find the most likelihood of the assignment of sentence structures. One can simply define the likelihood of a sentence structure assignment as the summation of all the likelihoods with each of them for a word or a phrase of a sentence being a specific sentence structure indicated by the assignment. One can specify a more complex definition of likelihood of a sentence structure assignment by considering the conditional probabilities of the sentence structures in an assignment. The system has a mechanics to remember the combinations examined before.

At step 1905, the system makes a tentative decision. The system makes a temporary judgment on the sentence structures of words and phrases.

At step 1906, the system checks if the decision meets the grammar rules. There is an assumption that the original document has a good writing or at least has passed general grammar checks. Otherwise, the system will disable grammar information at least for the places where a user has verified that some grammar errors occur. If yes, go to step 1910 and otherwise, go to step 1907.

At step 1907, the system adjusts the likelihood of the assignments and eliminates the impossible assignments. One can assign a zero value to the likelihood of the sentence structure assignment just examined.

The step 1903 to 1907 will repeat until the system has considered all possibilities or has found a combination that meets all grammar requirements.

At step 1908, the system displays the sentences in question and provides interfaces for a user to specify grammar manually.

At step 1909, the system provides interfaces for a user to modify related rules heuristically. The system can also provide mechanics to learn how to do grammar analysis by following an example provided by a user.

At step 1910, the system extracts other desired information. Since some information may relate to grammar analysis, the system will identify this kind of information only after grammar analysis.

Figure 20:
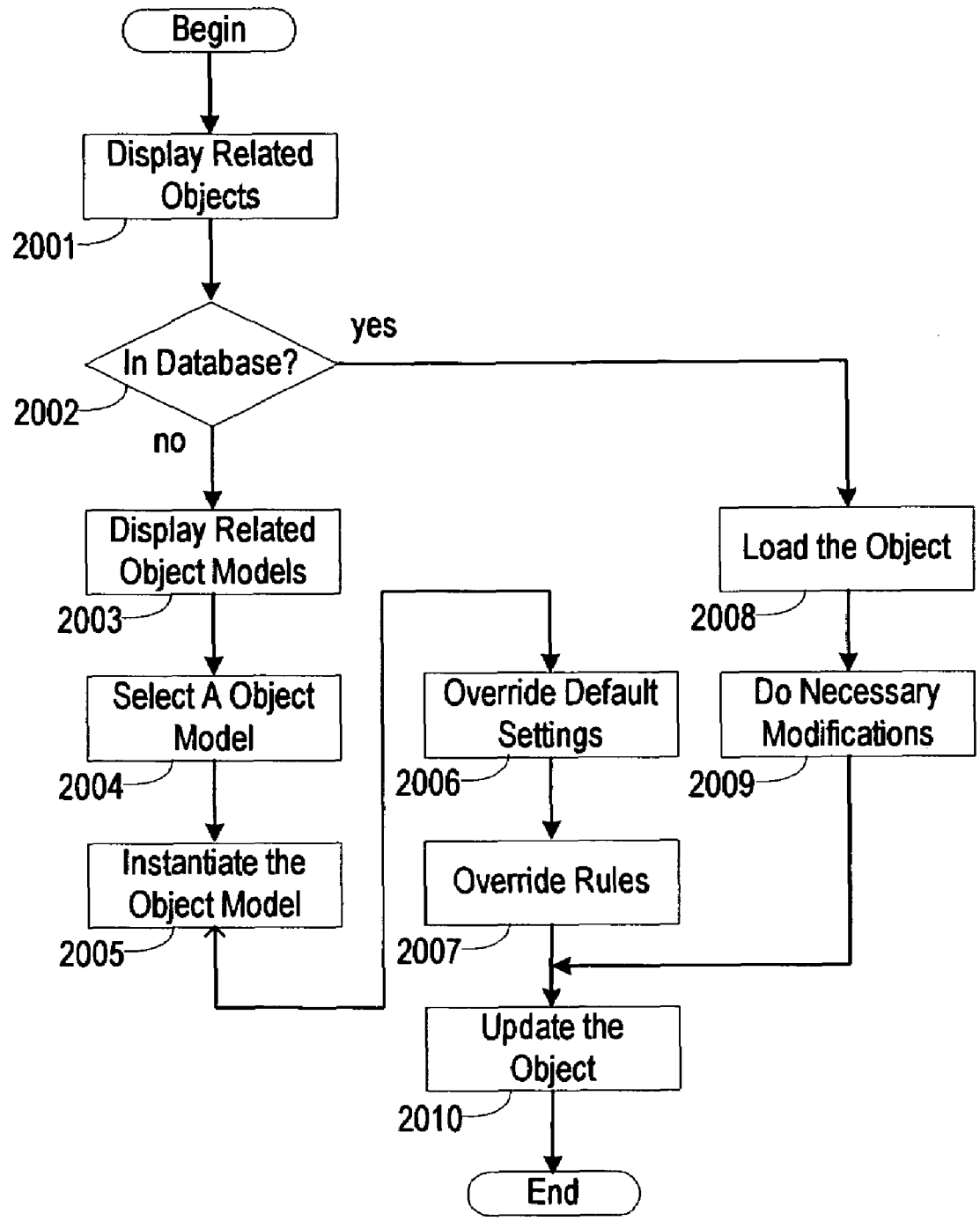
FIG. 20 illustrates an exemplary flowchart of the object instantiation module 314 in FIG. 3.

FIG. 20 is an exemplary flowchart of the object instantiation module 314 in FIG. 3. The system provides interfaces for a user to build an object from related object models, modify an object existing in database, and use an object existing in database directly. These objects will have the features specified in an input document as well as the features inherited from corresponding object models.

At step 2001, the system displays related objects identified from an input document. An object may have been fully defined or may just have a name only. For example, if a database has an object for a particular person, then the system has that object already. However, if the system does not have an object for a particular person in its database, then the system has to create the object from related object models or modify from a similar object.

At step 2002, the system checks that if the object is in database already. If yes, go to step 2008 and otherwise, go to step 2003.

At step 2003, the system displays models according to various categories.

At step 2004, the system provides interfaces for a user to select an object model.

At step 2005, the system provides interfaces for a user to create an object from an object model. The object will inherit properties and rules form the object model.

At step 2006, the system lets a user override default settings inherited from the object model.

At step 2007, the system provides interfaces for a user to override the rules inherited from the object model.

The object may be in database already. At step 2008, the system loads the object from its database.

At step 2009, the system provides interfaces for a user to do necessary modification on the object.

At step 2010, the system updates the object. The system fills the object with the corresponding information extracted from an input document. Depending on settings, the system can also save the object into its database and create a new object model for future use.

Figure 21:
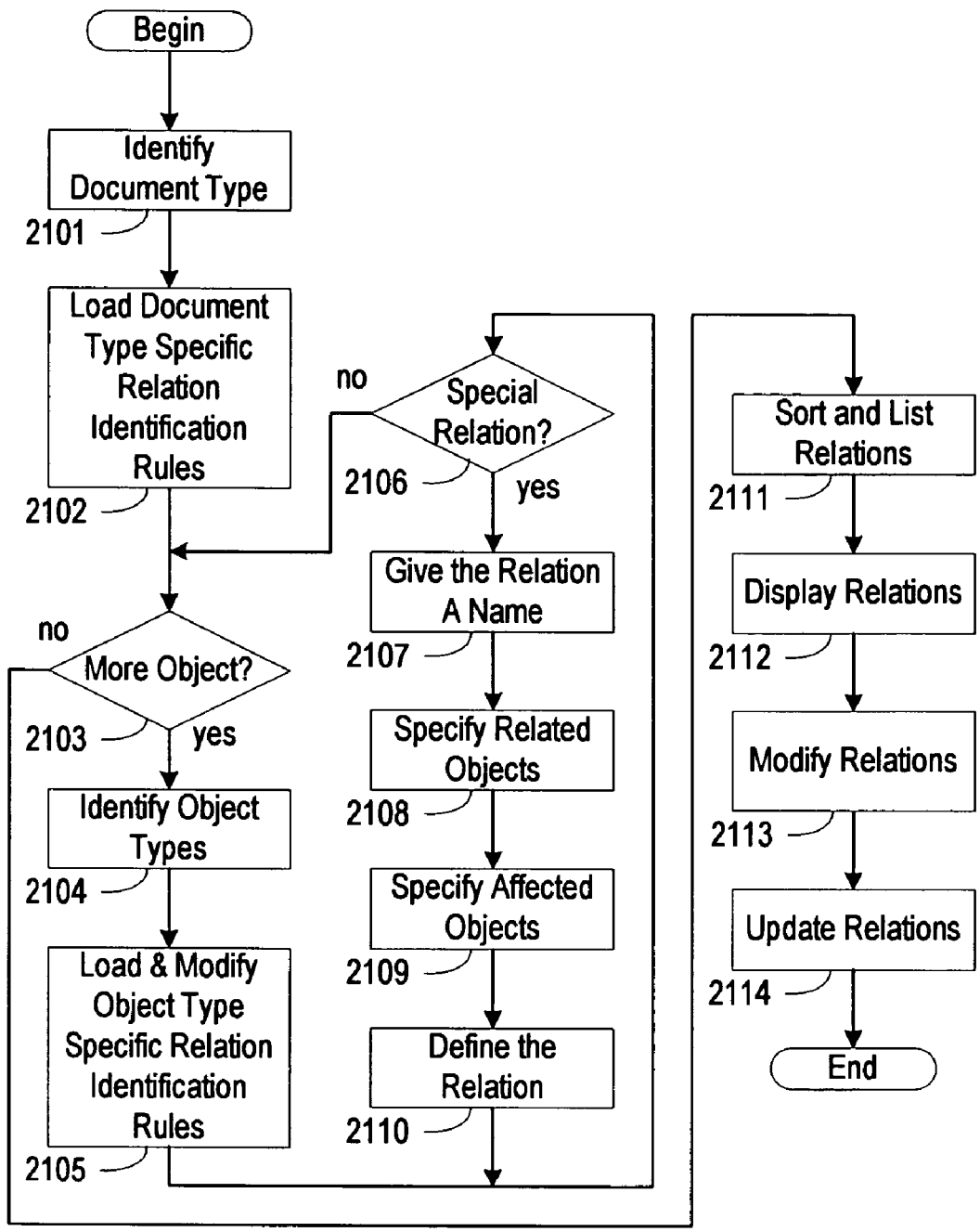
FIG. 21 illustrates an exemplary flowchart of the relation identification module 317 in FIG. 3.

FIG. 21 shows one example of the flowchart of the relation identification module 317 in FIG. 3. There are relations among objects. Depending on implementation, the system can identify relations systematically by various methods. In this example, the system identifies relations by finding the relations associated with each identified object. The system recognizes relations according to default settings, description in original document, relation identification rules, as well as the default relations among objects. Some relations are static, which will not change for a time interval under consideration. One example is the father and son relation. Other relations are dynamic, which can change with the time. One example is the distance relation between a walking person and a reference building. The system can provide interfaces for a user to define various relation identification rules as well as to define various relations. Focusing on physical and mental action, events are usually dynamic relations among objects. By identifying dynamic relations correctly, the system can recreate the events according to the relations among objects, action dictionary, and model dictionary.

At step 2101, the system identifies the document type according to title, journal, author, and vocabulary.

Different document type may have different relations needed to identify. Instead of searching for all possible relations defined in the system, the system can run much faster by searching only the interesting relations specific to a document type. At step 2102, the system loads the relation identification rules for the particular document type into the system.

At step 2103, the system checks that if any object has not been checked for all the interesting relations. Since a relation always associates with one or more objects, by checking all the objects and the relations with each of the objects, the system can identify all the relations specified in an input document and default interesting relations associated with these objects. If no, go to step 2111 and otherwise, go to step 2104.

At step 2104, the system identifies the object types for an object. One usually can sort an object in several object types according to different partitions and different object types may associate with different relation identification rules. Having identified all the object types of the object, the system can locate the relation identification rules related with the object.

At step 2105, the system loads related relation identification rules into memory and provides interfaces for a user to modify these rules. Each rule is for identifying the relations associated with an object of a particular object type.

At step 2106, the system checks that if a user wants to define a special relation for the object. If no, go to 2103 and repeat steps 2103 to 2106 until the system has examined all concerned objects for interesting relations. Otherwise, go to 2107.

At step 2107, the system provides interfaces for a user to create a name for defining the special relation.

At step 2108, the system provides interfaces for a user to specify related objects that are the actors involving in the relation.

At step 2109, the system provides interfaces for a user to specify the objects that are the acceptors involved in the relation.

At step 2110, the system provides interfaces for a user to define the relation among the related objects.

The object itself can be either actor or acceptor of the relation.

At step 2111, the system sorts the relations by various categories and lists all the relations according to their categories.

At step 2112, the system displays selected relations according to their categories.

At step 2113, the system provides interfaces for a user to modify relations.

At step 2114, the system updates the relations just defined and just modified.

Figure 22:
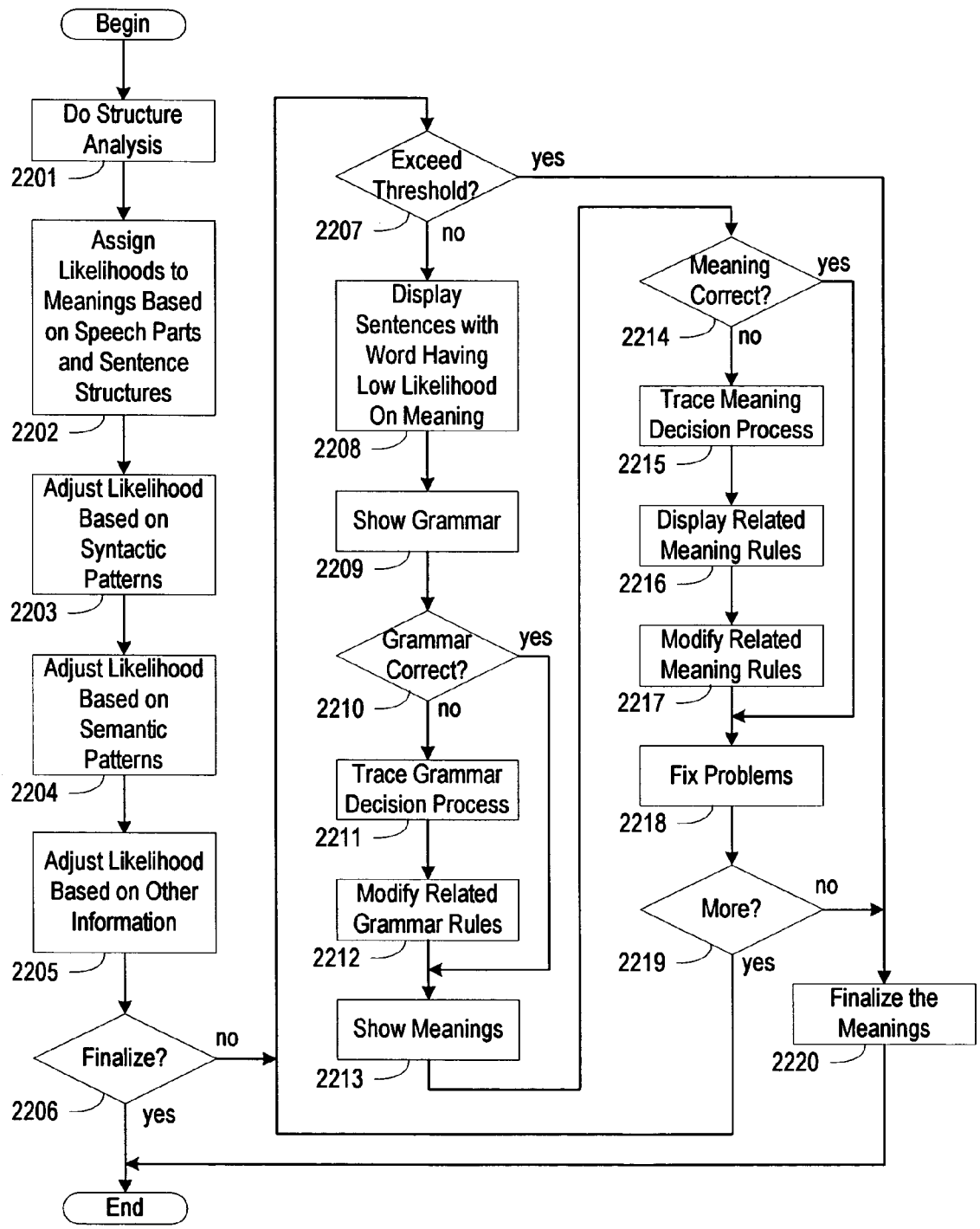
FIG. 22 illustrates an exemplary flowchart of the meaning identification module 319 in FIG. 3.

FIG. 22 illustrates an example of the flowchart of the meaning identification module 319 in FIG. 3. In this example, the system first finds out the grammar information and then identifies the meanings of words and phrases. Through the interfaces provided by the system, a user can trace grammar decision process and meaning decision process.

At step 2201, the system does structure analysis. By extracting grammar information from an input document and organizing information into a proper structure, the system obtains the information about speech parts and sentence structures.

At step 2202, the system assigns likelihoods to possible meanings. A word or a phrase can have many different meanings. Usually a word or a phrase can have several possible speech parts and can serve as different sentence structures. One can further separate the meanings of a word or a phrase into subgroups of meanings, with each subgroup of meanings corresponding to a particular speech part or a particular sentence structure. By identifying speech parts and sentence structures, the system can narrow the possible meanings of a word or a phrase.

At step 2203, the system adjusts the likelihood of possible meanings according to the syntactic information. A particular meaning of a word may have a very low possibility or a very high possibility to associate with a particular syntactic pattern. The system can adjust the likelihood according to syntactic patterns.

At step 2204, the system adjusts the likelihood of different meanings according to the semantic information. A particular meaning of a word may have a very low possibility or a very high possibility to associate with a particular semantic pattern. The system can adjust the likelihood according to the semantic patterns.

At step 2205, the system adjusts the likelihood of different meanings according to other information such as background information, the topic of the input document, and the special vocabulary of a particular subject.

At step 2206, the system checks that if a user wants to finalize meanings identified. If yes, end and otherwise, go to step 2207.

At step 2207, the system checks that if the sureness for the particular meaning of each word or each phrase exceeds a predefined threshold. If yes, go to step 2220 and otherwise, go to step 2208.

At step 2208, the system shows sentences with a word having low likelihood on each of the possible meanings of the word.

At step 2209, the system shows the grammar information.

At step 2210, the system provides interfaces for a user to verify if the grammar analysis is correct. If yes, go to step 2213 and otherwise, go to step 2211.

At step 2211, the system provides interfaces for a user to trace and debug grammar decision process.

At step 2212, the system provides interfaces for a user to modify related grammar rules.

At step 2213, the system shows the meanings of related words or phrases. One way is to link each of them to a corresponding meaning in a dictionary.

At step 2214, the system provides interfaces for a user to verify if an identified meaning is correct. If yes, go to step 2218 and otherwise, go to step 2215.

At step 2215, the system provides interfaces for a user to trace the decision process to identify the meaning of a particular word or a particular phrase.

At step 2216, the system provides interfaces for a user to display related rules for identifying meanings.

At step 2217, the system provides interfaces for a user to modify related rules for identifying meanings.

At step 2218, the system fixes the problems related to grammar identification and meaning identification. The system can further provide interfaces for a user to specify meanings manually by linking words or phrases to corresponding items in a dictionary.

At step 2219, the system checks if there are more sentences to check. If yes, go to 2207 and otherwise, go to step 2220.

At step 2220, the system finalizes the meanings.

Figure 23:
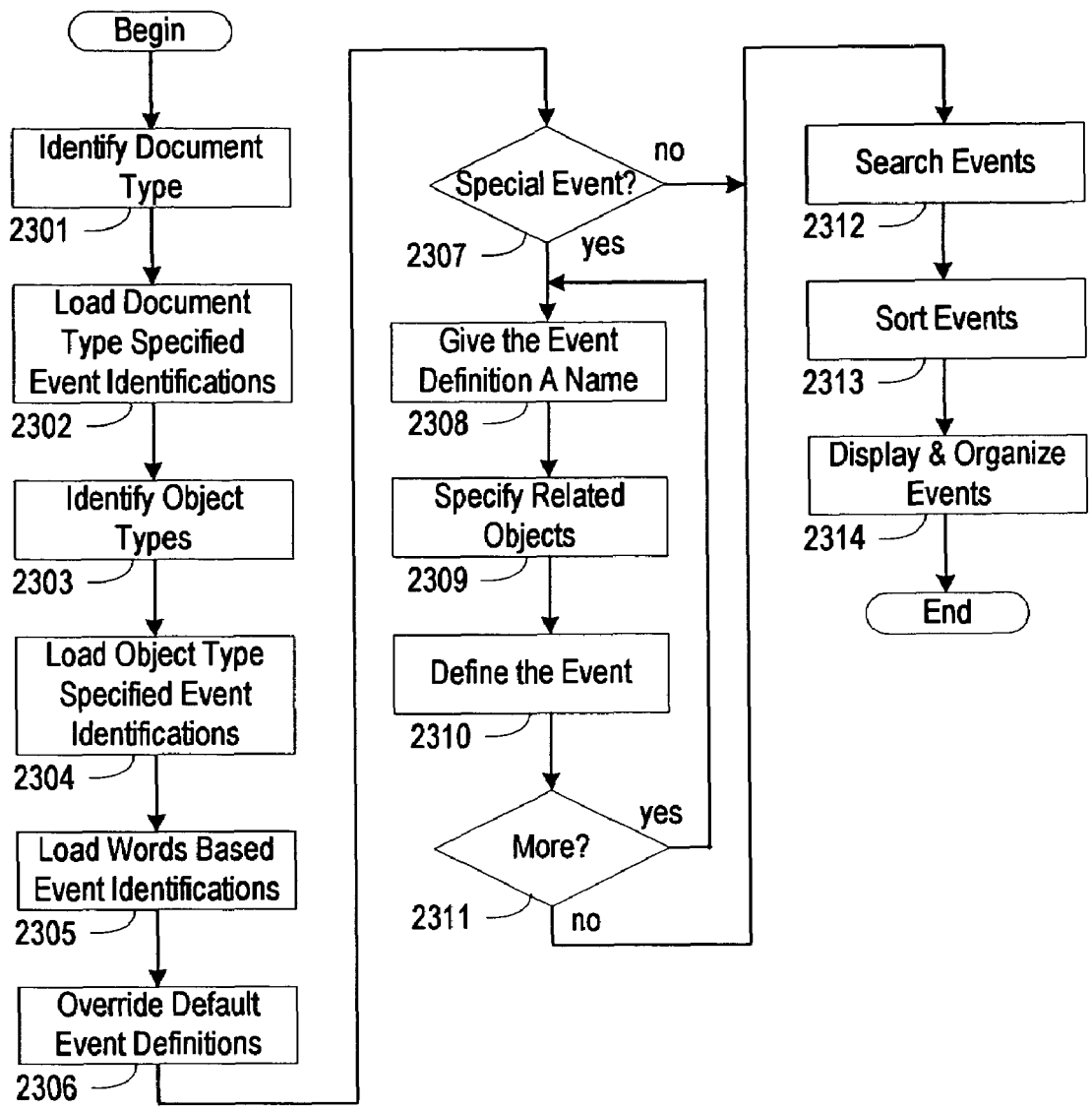
FIG. 23 illustrates an exemplary flowchart of the event identification module 320 in FIG. 3.

FIG. 23 shows an example of the flowchart of the event identification module 320 in FIG. 3. Since an event usually associates with a verb, a gerund, a participle, or a verb-like phrase, the system can identify event according to these features. There can be various event identification rules for helping identifying special events. Because a different document type can involve different types of events, the system can sort the rules for identifying events according to document types. By loading the identification rules related to a particular document type, the system can reduce time for identification. The system can also sort the identifying rules according to the object types. By identifying the object type of an object and considering the event identification rules related to that particular type, the system can further reduce time for event identification. The module fist identifies events according to the related event identifying rules and then provides interfaces for a user to identify special events. The module can also provide interfaces for a user to search events, organize events, and display events in various forms.

At step 2301, the system identifies the document type.

Different document type may have different types of events involved. At step 2302, the system will load the event identification rules specific to the document type into the memory.

At step 2303, the system identifies object types for the involved objects.

At step 2304, the system loads event identification rules specific to involved object types into memory. This is because different object types may need different event identification rules for efficient processing.

At step 2305, the system loads words-based event identification rules. Many words, especially verbs, can generate events.

At step 2306, the system provides interfaces for a user to override the default event definitions and default ways to identify, process, and display events.

At step 2307, the system checks that if a user wants to build a special event identification rule. If no, go to step 2312 and otherwise, go to step 2308.

At step 2308, the system provides interfaces for a user to give the event a name. The system can also generate the event name from a predefined base name and a sequence number created automatically by the system.

At step 2309, the system provides interfaces for a user to specify the related objects of the event and the rules to find these related objects.

At step 2310, the system provides interfaces for a user to define the event and the rules to identify the event.

At step 2311, the system checks that if a user wants to define another special event. If yes, go to step 2308 and repeat steps 2308 to 2311. Otherwise, go to step 2312.

At step 2312, the system provides interfaces for a user to search for related events.

At step 2313, the system sorts events.

At step 2314, the system provides interfaces for a user to display and organize events. One can display the relations among events in various ways and organize events according to their sequence in an input document or an event schedule template. The system can reorganize events according to the rules for rearranging events. For example, the system can change the sequence from anti-chronological description to chronological description.

Figure 24:
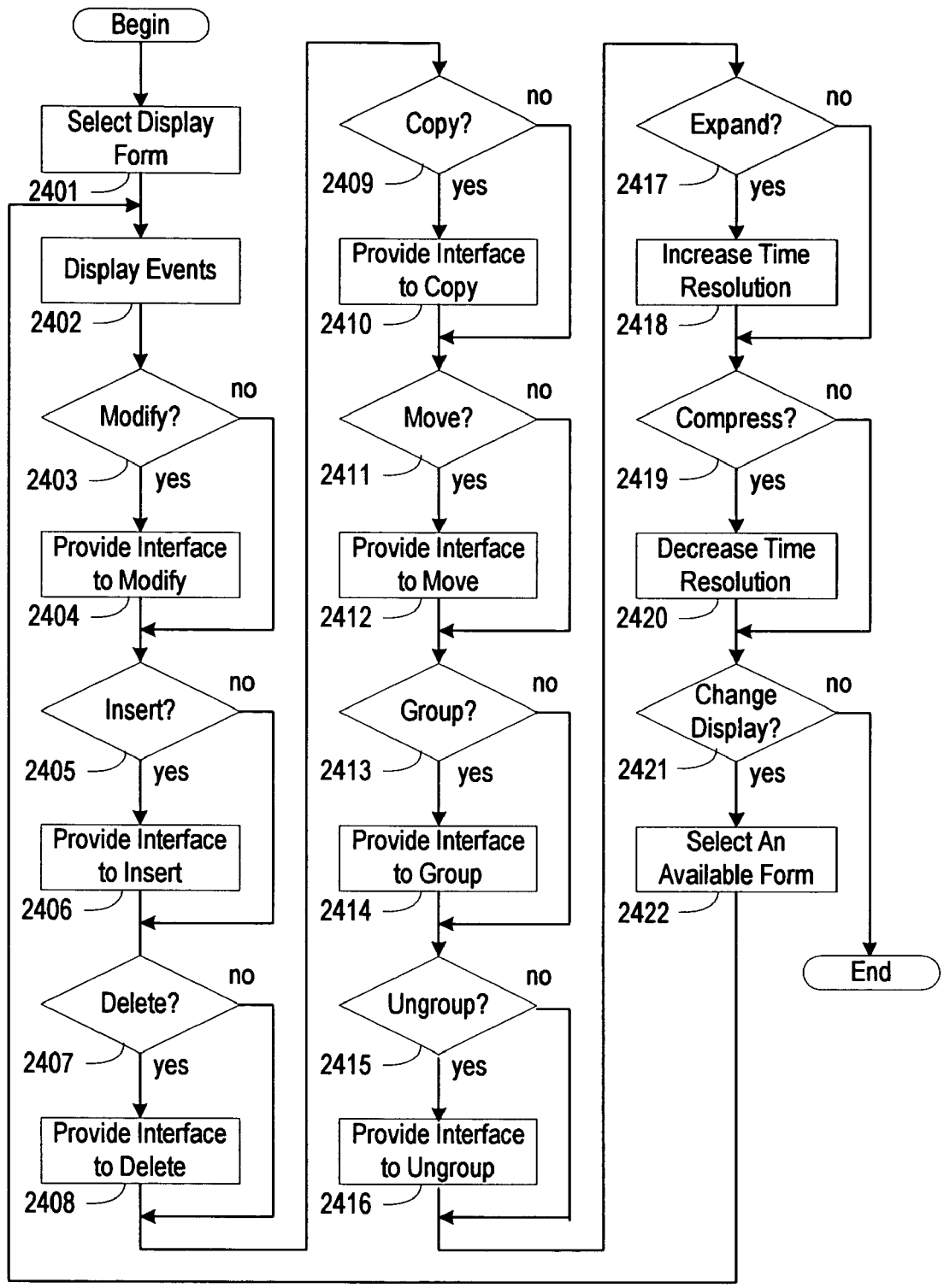
FIG. 24 illustrates an exemplary flowchart of the event modification module 321 in FIG. 3.

FIG. 24 illustrates a general flowchart of the event modification module 321 in FIG. 3. The system provides interfaces for a user to edit events by various techniques such as modifying, inserting, deleting, copying, moving, grouping, ungrouping, expanding, and compressing events.

At step 2401, the system provides interfaces for a user to select a display form from several display forms.

At step 2402, the system displays the events for a user to examine from various aspects.

At step 2403, the system checks if a user wants to modify any events. If no, go to step 2405 and otherwise, go to step 2404.

At step 2404, the system provides interfaces for a user to select events and modify these events.

At step 2405, the system checks that if a user wants to insert events. If no, go to step 2407 and otherwise, go to step 2406.

At step 2406, the system provides interfaces for a user to create and insert events.

At step 2407, the system checks that if a user wants to delete events. If no, go to step 2409 and otherwise, go to step 2408.

At step 2408, the system provides interfaces for a user to select events and delete events.

At step 2409, the system checks that if a user wants to copy events. If no, go to step 2411 and otherwise, go to step 2410.

At step 2410, the system provides interfaces for a user to copy events.

At step 2411, the system checks that if a user wants to move events. If no, go to step 2413 and otherwise, go to step 2412.

At step 2412, the system provides interfaces for a user to move events.

At step 2413, the system checks that if a user wants to group a set of events. A set of events may be together in many cases and it is convenient to treat them as a single event. If no, go to step 2415 and otherwise, go to step 2414.

At step 2414, the system provides interfaces for a user to select a set of events and group them as an event group.

At step 2415, the system checks that if a user wants to ungroup a group of events. A user may want to edit some events included in the group of events. If no, go to step 2417 and otherwise, go to step 2416.

At step 2416, the system provides interfaces for a user to select an event group and ungroup the group.

At step 2417, the system checks that if a user wants to enhance time resolution. One can increase the time resolution for a portion of time or for a whole period. By boosting time resolution, one can make an action smoother and describe the action in detail. If no, go to step 2419 and otherwise, go to step 2418.

At step 2418, the system provides interfaces for a user to specify the period and the enlarge factor to expand time resolution.

At step 2419, the system checks that if a user wants to compress time resolution. Contrast to expansion, compression is to reduce the time resolution. If no, go to step 2421 and otherwise, go to step 2420.

At step 2420, the system provides interfaces for a user to specify the time interval and the reduce factor to decrease time resolution.

At step 2421, the system checks that if a user wants to change display form. The user may want to display events in a different display form. If no, end and otherwise, go to step 2422.

At step 2422, the system provides the available display forms and lets a user to select one of them. Then go to step 2402 and repeat steps 2402 to 2421.

Figure 25:
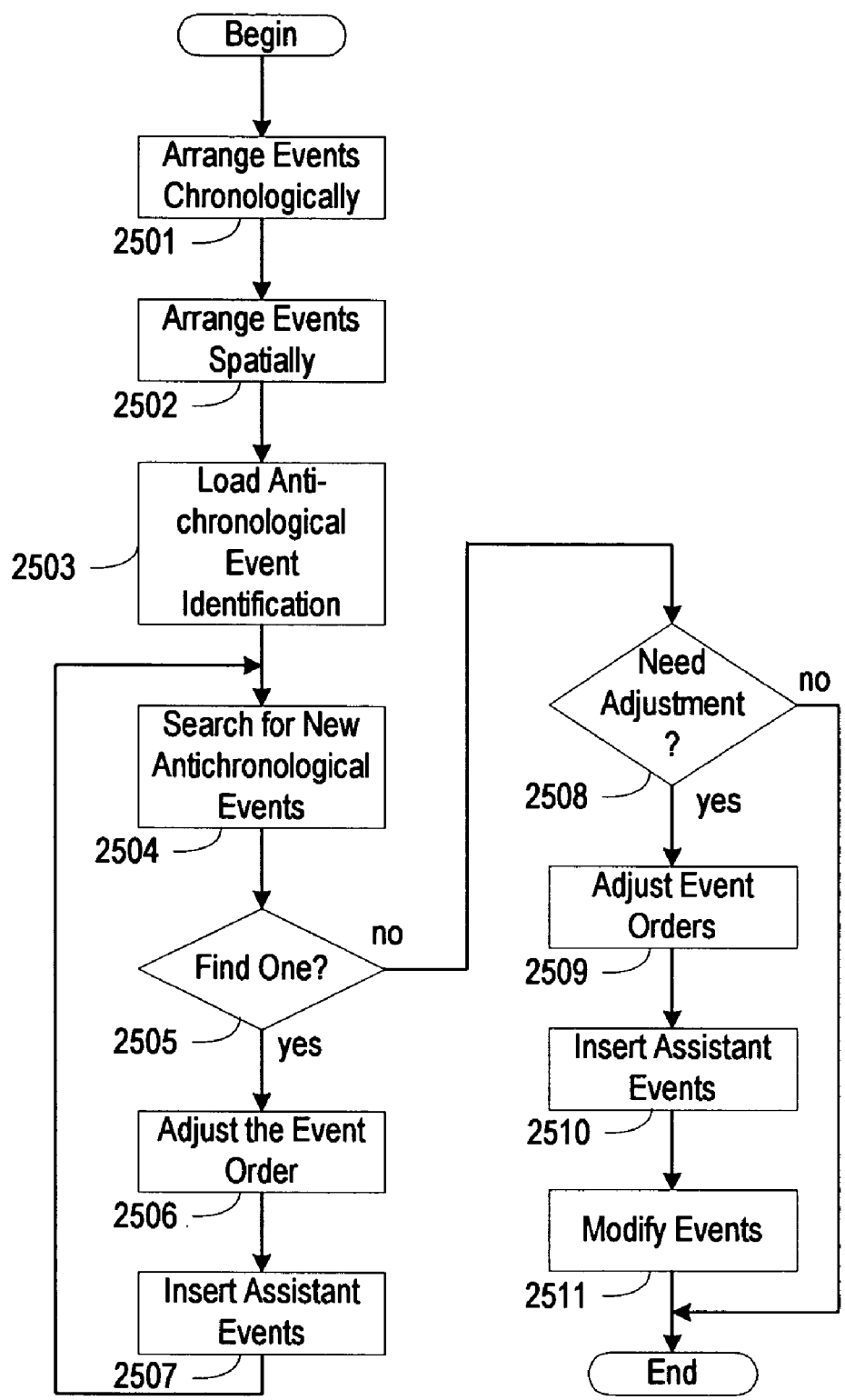
FIG. 25 illustrates an exemplary flowchart of the event synchronization module 322 in FIG. 3.

FIG. 25 illustrates the general flowchart of the event synchronization module 322 in FIG. 3. The events generated from an input document may not synchronize in time and in physical space though usually they do. When an author describes in anti-chronological order, when an author describes events that happen in several different places, or when a user has edited the events, the events can be out of synchronization. The system can find these events according to related rules for identifying events out of sequence or provide interface for a user to locate these events manually. The system can reorder these events according to the rules for synchronizing events, insert extra events into these events, and enclose specific indications to these events. For example, in order to indicate some events are the events recalled by a person, a user can display these events by using black and white image or by using a special surrounding pattern on a display device.

At step 2501, the system arranges events according to their chronological order. There can be connections among events. For example, an input document may describe an event happened in the past by using words such as "recall", "recollect", and "remember".

At step 2502, the system displays events according to their spatial order. Several things can happen simultaneously in different places. Depending on settings and related rules for organizing and displaying events, one can display events simultaneously with a different window for the events happened in a different place and display events one by one with a window by displaying the events happened in one place first and then displaying the events happened in another place.

At step 2503, the system identifies the anti-chronological events and marks these events according to related rules for identifying these anti-chronological events.

At step 2504, the system searches for new anti-chronological events.

At step 2505, if the system finds one, then go to step 2506 and otherwise, go to step 2508.

At step 2506, the system provides interfaces for a user to adjust the order of events.

At step 2507, the system provides interfaces for a user to insert assistant events. Depending on setting and related rules, the system can create or locate related assistant events and insert them into proper places in an event schedule. Then, go to step 2504 and repeat.

At step 2508, the system checks that if a user wants to adjust events sequence and modify events. If yes, go to step 2509 and otherwise, end.

At step 2509, the system provides interfaces for a user to adjust event order chronologically and spatially.

At step 2510, the system provides interfaces for a user to insert assistant events.

At step 2511, the system provides interfaces for a user to modify events. A user can modify the images associated with an object, an action description with an event, the parameters associated with an event, or the lasting period of an event.

Figure 26:
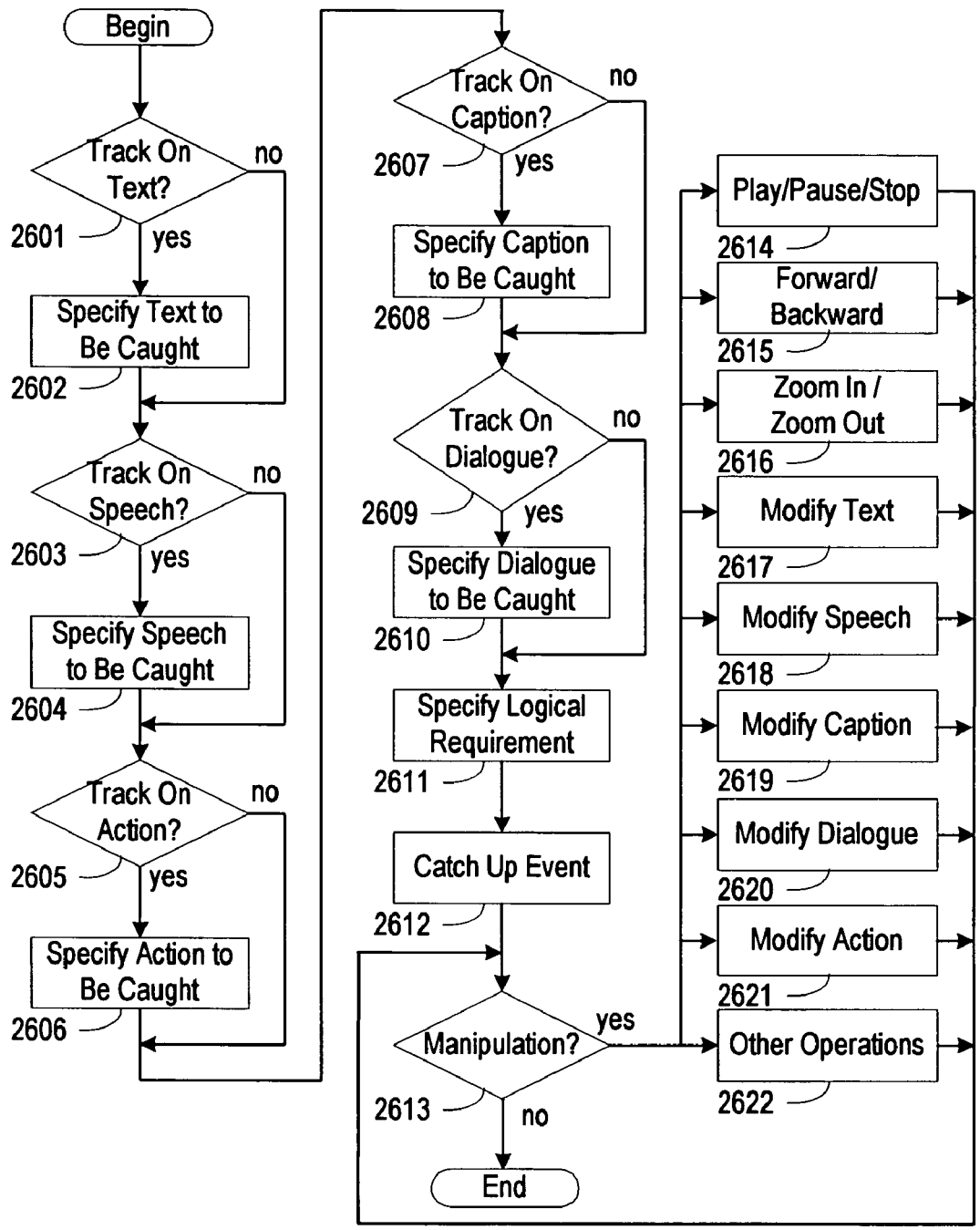
FIG. 26 illustrates an exemplary flowchart of the event track module 324 in FIG. 3.

FIG. 26 shows a general flowchart of the event track module 324 in FIG. 3. The module provides interfaces for a user to specify interesting issues so that the user can locate related information quickly and modify the information. A user can track an event according to the features of the event such as word, gesture, tone, and action.

At step 2601, the system checks that if a user wants to track a text. If no, go to step 2603 and otherwise, go to step 2602.

At step 2602, the system provides interfaces for a user to specify features of the text.

At step 2603, the system checks if a user wants to track a speech. If no, go to step 2605 and otherwise, go to step 2604.

At step 2604, the system provides interfaces for a user to specify the features of the speech.

At step 2605, the system checks that if a user wants to track an action. If no, go to step 2607 and otherwise, go to step 2606.

At step 2606, the system provides interfaces for a user to specify features of the action.

At step 2607, the system checks that if a user wants to track a caption. If no, go to step 2609 and otherwise, go to step 2608.

At step 2608, the system provides interfaces for a user to specify the features of the caption.

At step 2609, the system checks that if a user wants to track a dialogue. If no, go to step 2611 and otherwise, go to step 2610.

At step 2610, the system provides interfaces for a user to specify the feature of the dialogue.

At step 2611, the system provides interfaces for a user to specify logical requirement on an event that a user wants to track. The logical requirement is a logical combination of the conditions on every aspect of the event.

At step 2612, the system catches up an event that satisfies the logical requirement.

At step 2613, the system checks that if a user wants to modify the event. If no, end and otherwise, the system will provide interfaces for the user to manipulate and modify.

The system allows a user to play, pause, and stop by providing proper interface 2614. A user can also fast forward and fast backward through interface 2615. The system can further provide interfaces 2616 for a user to zoom in and zoom out.

The system lets a user to modify text through text editor interface 2617.

The system can provide utility 2618 for a user to modify speech, conversation, or background comment.

The system can further provide utilities 2619 and 2620 for a user to modify caption and dialogue respectively.

Furthermore, the system provides utility 2621 for a user to modify action and utility 2622 for a user to perform other operations.

Repeat steps 2613 to 2622 until no more manipulations needed.

FIG. 27 shows one of the interfaces of the event modification module 321 in FIG. 3. There are two axes, one being time axis and another being event axis. An event can have a particular name. A simple way of assigning names to events is to identify each event by a triple (m, n, l), with m standing for the starting time slot, n standing for the event index at time slot m, and 1 standing for time interval in number of slots. For example, at time slot 0, there are four events happened. The event (0, 1, 3) 2701 occurs at time slot 0, has event index set to 1, and lasts for three time slots. The event (0, 2, 1) 2702 also occurs at time slot 0, has event index set to 2, and lasts for only one time slot. The event (0, 3, 2) 2703 occurs at time slot 0, has event index set to 3, and lasts for two time slot. The event (0, 4, 1) 2704 occurs at time slot 0, has event index set to 4, and lasts for one time slot. One can give similar explanations to events (1, 4, 1) 2705, (2, 2, 2) 2706, (3, 3, 1) 2707, (4, 3, 1) 2708, and (3, 4, 2) 2709.

The system can provide interfaces for a user to modify each event when the user clicks it twice. Since a different event may need a different interface for modification, what interface will appear depends on the event involved. The system can also provide interfaces for a user to move events around, zoom into an event, set sub-time resolution inside an event, etc. When the time resolution changes, the event labels specified above will change correspondingly.

Figure 28:
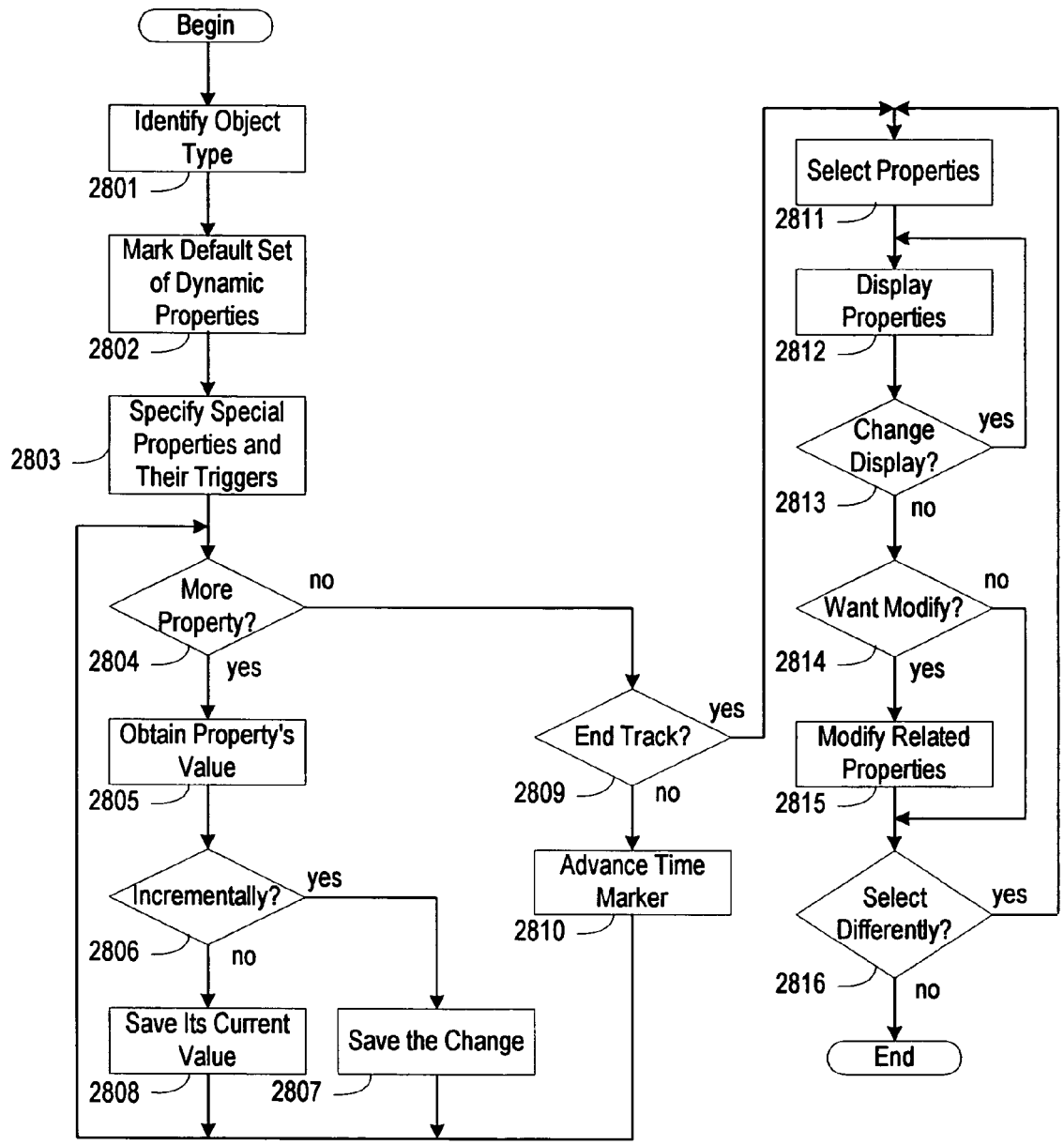
FIG. 28 illustrates an exemplary flowchart of the object status track module 325 in FIG. 3.

FIG. 28 shows an exemplary flowchart of the object status track module 325 in FIG. 3. Sometimes a user may want to track some objects, save their changes in database, display object status, and modify related properties.

At step 2801, the system identifies object types of objects selected for tracking.

At step 2802, the system lets a user to select interesting objects and then identifies the default dynamic properties for the selected objects. The dynamic properties are those properties that can change during a concerned time interval. Usually it is those properties that a user is interested in and wants to track. An object may have a property to specify explicitly which properties are default dynamic properties. The system can also find properties about an object according to rules for identifying interesting properties that a user may want to track. The system can provide interfaces for a user to specify the interesting dynamic properties for each interesting object as well.

At step 2803, the system provides interfaces for a user to specify special properties that a user wants to track and conditions to trigger tracking the objects. Once tracking starts, the system will record all the selected properties of related objects.

At step 2804, the system checks that if there is any dynamic property not recorded yet for the current time slot. If no, go to step 2809 and otherwise, go to step 2805.

At step 2805, the system finds the values associated with that property.

A property can change gradually. One can save everything at each time or just save the change. At step 2806, the system checks if a user wants to save that property completely or incrementally. If a user wants to save incrementally, go to step 2807 to save the differences between the current values and previous values of that property. Otherwise, go to step 2408 and save the current values of that property.

At step 2809, the system checks if the track interval is over according to a predetermined length and a particular indication according to related rules and settings. If no, go to step 2810 to advance time indicator by one and then repeat steps 2804 to 2809. Otherwise, go to step 2811.

At step 2811, the system provides interfaces for a user to select properties.

At step 2812, the system provide an interface for a user to select a display form among the available display forms and displays the selected properties by the selected display form.

At step 2813, the system checks if a user wants to change the display form. If yes, go to step 2812 and otherwise, go to step 2814.

At step 2814, the system checks if a user wants to modify properties. If no, go to step 2816 and otherwise, go to step 2815.

At step 2815, the system provides interfaces for a user to modify values of these properties. The system can also let a user to modify associated rules on various operations related to these properties.

At step 2816, the system checks if a user wants to select other properties to examine and modify. If yes, go to step 2811 and otherwise, end.

FIG. 29 shows an exemplary flowchart of the Teacher Liang's Lecture Hall module 341 in FIG. 3. By building a virtual teacher and a virtual lecture hall, extracting information from an input document, and arranging and displaying events, the module can generate an animating movie or cartoon to teach a student about related information. First, the module makes a front-end processing on the input document. Second, the module analyzes the input document, identifies interesting information, and organizes the information in proper structures. Third, the module links extracted information to existing information in a database, makes symbolic derivation, verifies related results, and provides explanations. Forth, the module estimates student's background and searches for particular information for the student. Further, the module builds an auxiliary object called virtual teacher and another auxiliary object called virtual lecture hall. Then, the module creates a teaching session plan as a blue print for generating events. Next, the module dispatches events, captures student's feedback, analyzes the feedback, modifies the teaching session plan or events, and displays events. Further, the module can provide interfaces for a student to track events and watch events from different positions. In addition, the system provides various interfaces for a student to display related information, to search for related information, to establish links among related issues, to make comments, and to take notes.

At step 2901, the system makes front-end processing on an input document. The input document may be an event document containing the information such as virtual teacher and virtual lecture hall already, a structured document without any information about virtual teacher and virtual lecture hall, or just a regular document. Through this process, the system can detect the form of information in the input document and avoid unnecessary work. An operation in the front-end processing is to identify the document type of the input document. Each document type can have one or more default structure templates, which provide the framework to hold related information and default rules to extract, modify, and format related information. One can separate documents into various document types according to their subjects. There can be a document type linked to physics and another document type linked to mathematics. The default structures associated with physics can be different from the default structures associated with mathematics. In addition, one can further divide a document type into several sub document types with each sub document type associating with some structure templates for handling the information encountered frequently in the documents of a corresponding sub document type.

At step 2902, the module analyzes the input document or the document obtained through the front-end processing at previous step, identifies and extracts the information commonly seen in a science book, and organizes information in proper structures. The module can create structures from corresponding structure templates or provides interfaces for a user to create structures from scratch. FIG. 30 will show an exemplary flowchart of identifying the information commonly found in a science book.

At step 2903, the module links the organized information to related information, utilities, and displaying forms saved in a database according to category, subject, topic, keyword, etc. Then the module will make symbolic derivation to fill the gap between two steps in an example or in a proof by using the information existing in database, following related mathematical derivation rules, and employing various symbolic calculation techniques. Depending on settings, the module can perform the symbolic derivation operation only when a student requires detail information. The module can further verify calculation results by generating a procedure according to related formula specified in the system, finding related parameters, and running the procedure. In addition, the module can provide some explanation by locating the corresponding explanation saved in a database or locating the explanation extracted from the input document.

At step 2904, the module estimates the background of a student. The module can load a student's status from a database. The module can also inquire if the student is familiar with a topic and make a decision according to the answer from the student. The module can further generate yes or no questions, create multiple-choice problems, and ask the student to state related concepts and theorems. Furthermore, the module can find how well a student is familiar with a topic according to the time the student spends and the errors that the student makes. In addition, the module can judge if a user has made any errors by comparing student's answers to the standard answers saved in the system or by following rules for finding the correct answers. The module can save a student's background about a particular subject and a particular topic into a database for future use.

At step 2905, according to the specific situation of a student, the module can search for related information from a database, Internet, and the input document to meet the special need of the student according to some predefined rules. Then, the module can organize the searched information according to various features, create extra events to generate animating representation by following some predefined event templates, specify display forms for showing the information, and provide the student specific helps. The module can also combine the information specific to the student into a teaching session plan to provide teaching session targeting specifically at the student.

At step 2906, the module provides interfaces for a user to create and modify event procedures. Instead of building all events each time from scratch, a user can build a set of event procedures for performing the most commonly encountered operations for a particular subject, for a particular topic, and for a particular experiment. The module provides interfaces for a user to create a new event procedure from a scratch or to copy a procedure from an existing event procedure and then to modify the procedure. The module can further provide interfaces for a user to modify an event procedure and assign a particular event procedure to an event indicator directly or indirectly. Here an event indicator is a symbol for an event in a teaching session plan. For example, there can be an event indicator for performing the chemical experiment of combining sulfuric acid ($H_2SO_3$) with sodium hydroxide (NaOH). Whenever the module sees this particular event indicator in a teaching session plan, it will call a corresponding event procedure to generate corresponding events. An event procedure may associate with some parameters. In this example, the procedure can have default parameters for describing vessels to hold sulfuric acid and sodium hydroxide, default parameters for the concentration of sulfuric acid and sodium hydroxide, and the default volumes in the vessels. The module will use the default parameters if there is no specification in the input document.

Figure 31:
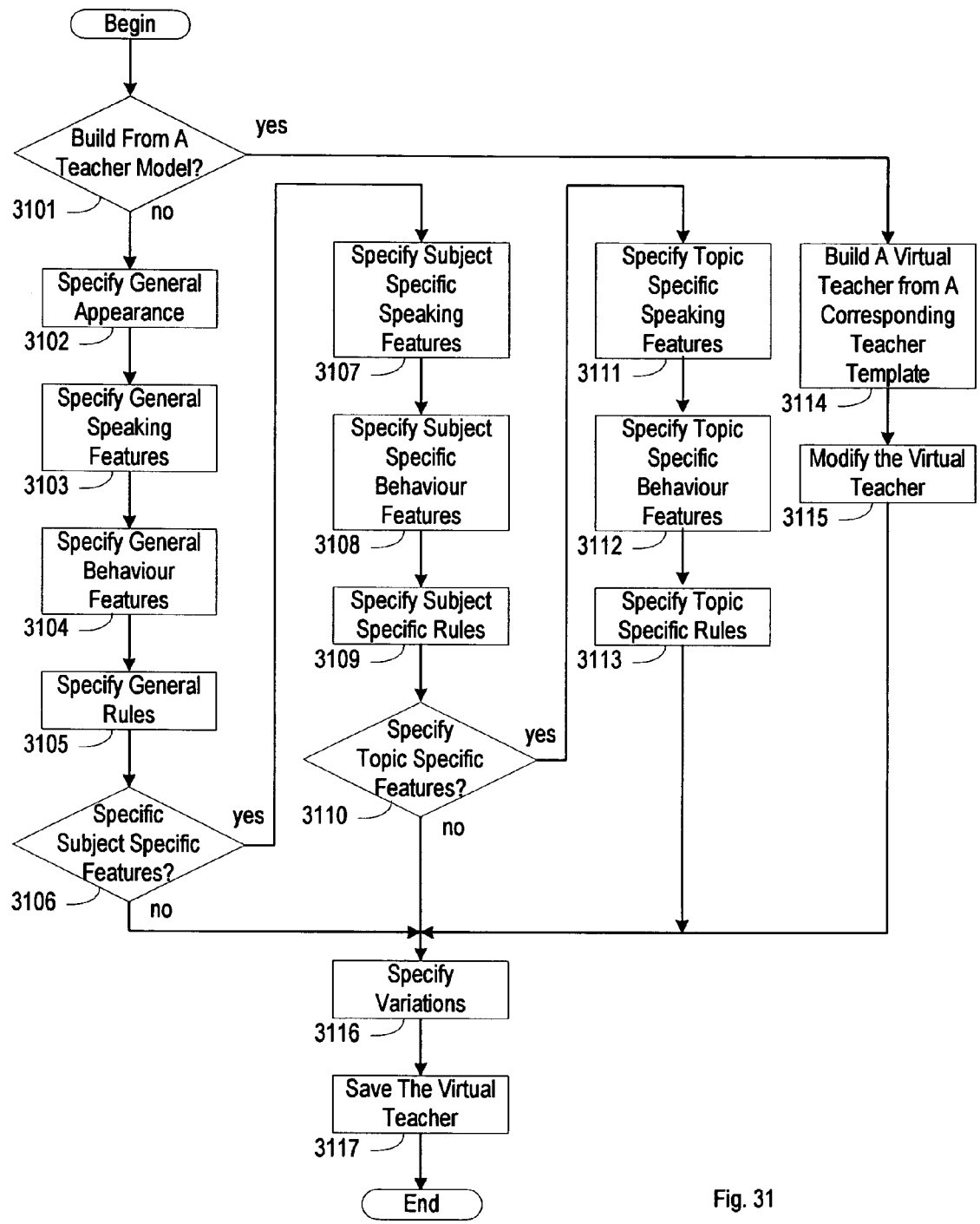
FIG. 31 illustrates an exemplary flowchart of the step of creating and modifying virtual teacher in step 2907 in FIG. 29.

At step 2907, the module provides interfaces for a user to create and modify a virtual teacher. The user can build a virtual teacher from an existing virtual teacher model or from scratch. The module provides interfaces for a user to specify the appearance of a virtual teacher such as figure, dress, hairstyle, and age. There can have several different dresses as well as hairstyles for a same virtual teacher. The module will use a different dress and a different hairstyle for the virtual teacher to create some variations or to meet the need of a particular subject. The module can also let a user to specify the regular volume, pace, tone, and pet phrase. The module can further capture the features of a teacher from a video tape according to related settings and the rules for identifying features, build a virtual teacher with these features, and then provide utilities and interfaces for a user to add new features and modify features. The features can include appearance, pet phrases, accent, gestures, emphasis methods, and teaching strategies. Furthermore, the module can provide interfaces for a user to specify the general features of a virtual teacher on handling various classroom activities in form of rules. In addition, the module can provide interfaces for a user to specify specific rules to handle a particular subject, a particular topic, a particular example, a particular theorem, and a particular proof. Through proper interfaces provided by the module, a user can modify a virtual teacher from appearance to the rules on handling various classroom activities. FIG. 31 will give an exemplary flowchart for this step.

At step 2908, the module provides interfaces for a user to create and modify a virtual lecture hall. A virtual lecture hall is a virtual object created for simulating a classroom environment. The virtual lecture hall can be indoor or outdoor. An interface for a user to build a virtual lecture hall is to provide commonly used object bars for the user to select an object, shape the object, move the object, resize the object, and specify properties on the object. A user can specify the general appearance of a lecture hall such as the floor plan, the platform, and whiteboards. A user can further specify the special requirement for a particular subject and a particular topic. A virtual lecture hall can equip with general virtual equipments for different subjects and different topics for simulating a lecture session with demo in a classroom. A virtual lecture hall can also equip with special virtual equipments for a specific subject and a specific topic for simulating a lecture session conducted in a lab.

Figure 32:
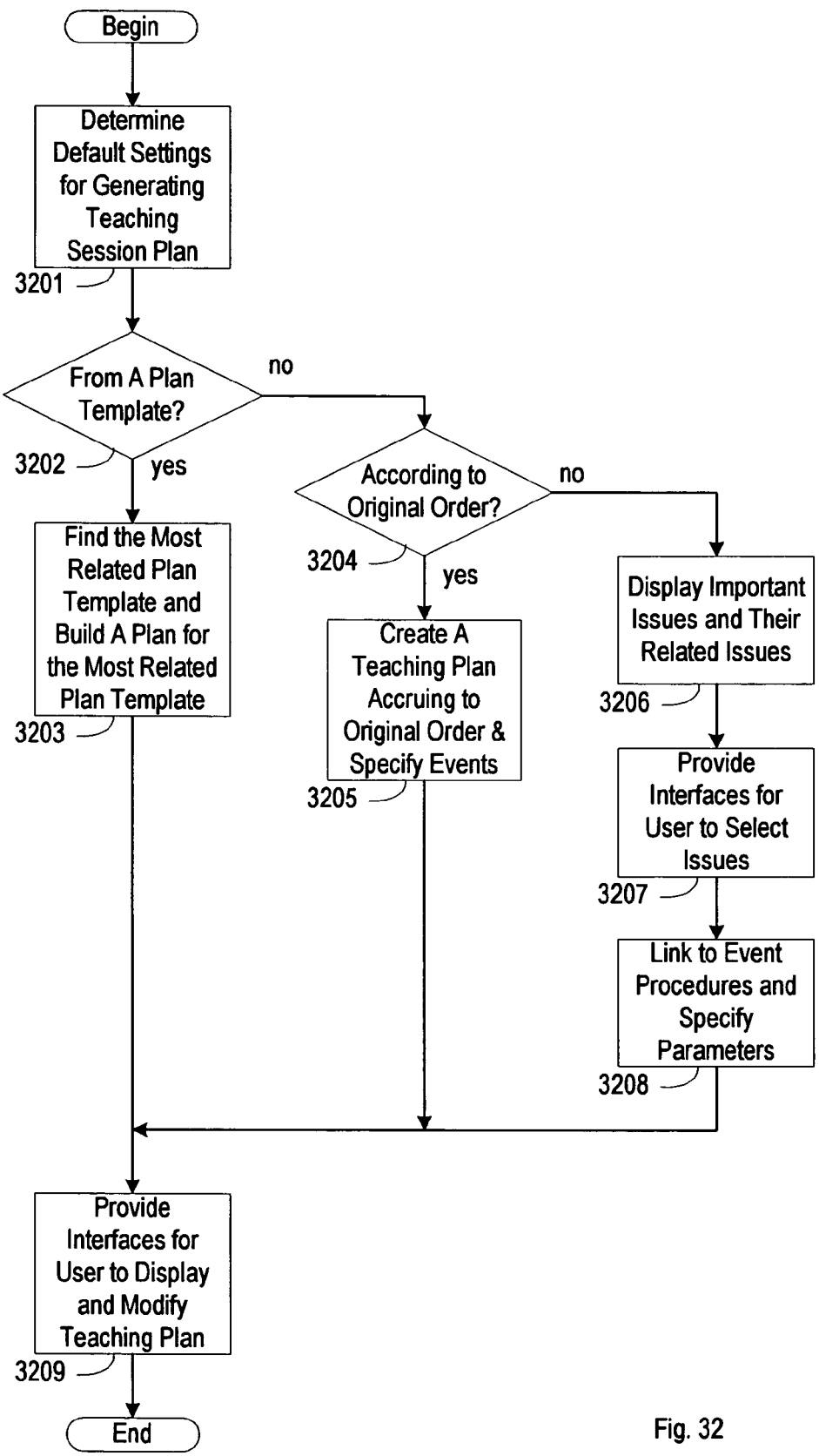
FIG. 32 illustrates an exemplary flowchart of the step of creating teaching session plan in step 2909 in FIG. 29.

At step 2909, the module creates a teaching session plan for a student. A teaching session plan is the framework of major events in a teaching session with each major event marked by a corresponding predefined event procedure. By examining a teaching session, a user can examine the order of the major events without involving the detail of each major event. A user can build a teaching session plan according to a teaching session plan template or the arrangement of an original document. FIG. 32 will provide an exemplary flowchart of building a teaching session plan. There can be different teaching session plans for different students or for different stages of a same student.

At step 2910, the module provides interfaces for a user to modify a teaching session plan. The module can let a user to examine a major event from various aspects. For example, a user can display the properties associated with an event, the parameters associated with an event procedure, and the event procedures associated with the sub events of an event. The module can further provide interfaces for a user to modify a teaching session plan and insert specific auxiliary event procedures.

At step 2911, the module arranges the events according to a teaching session plan. Here the module replaces a general event procedure by a specific event procedure for including the features of the virtual teacher, the virtual lecture hall, and the information in the input document. For example, the system will incorporate the features of a virtual teacher such as gestures and speaking characters into the events. For a particular issue, the system may have a default handling method, the input document may also specify a default handling method, and the virtual teacher may have a default handling method. Depending on preference, the system will use one of them to process the issue.

At step 2912, the module provides interfaces for a user to modify the arrangement of events. A user can insert auxiliary events, modify events, and change the order of events. These events can be in form of a sequence of commands understood by the event dispatch module 323. Here a command can be in many different forms such as some computer language, script, and macro. One can define a macro to represent a group of commands for generating a group of commonly seen and closely related events.

At step 2913, the system creates events. Depending on implementation, the module can generate these events to produce images and voices directly and indirectly. For creating images directly, the system creates events according to a viewing direction for a 2-D display or two viewing directions with one for left eye and one for right eye for a 3-D display. For a full view, the system keeps adjusting the generated events according to the position of a student's eyes. Depending on setting, the system can just create the portion of the image of events that a student will observe at a particular moment. Then the system can regenerate the events if a student changes viewing position, zoom in, and zoom out. Further, the system can generate images indirectly from the events. The module can allocate memory for simulating a 3-dimentison space and create objects and their actions in the memory as if the module had created real objects in a real 3-dimension space. Next, the system will create images according to a project direction for 2-D image and two project directions for 3-D images and recreate images if a student moves head and changes viewing positions. Also depending on setting, the system can use the voices associating with events to produce sounds directly or through a utility to generate stereo sounds and adjust volume and phase constantly according to relative positions of a student and voice sources.

At step 2914, the system displays events with images and voice and provides interfaces for a student to change viewing mode. A user can zoom out, zoom in, focus on a particular object, and search for related objects. The system can also adjust the images and voice automatically according to the viewing positions.

At step 2915, the system captures the feedback from a student, analyzes the feedback, adjusts a teaching session plan, and updates events. The system can capture feedback from a student by a monitor, a microphone, a keyboard, and a mouse. According to predefine rules or utilities for identifying particular situations, the system can identify various gestures, facial expressions, verbal questions, and inquiries. From the feedback of a student, the system can adjust the lecturing methods, insert some examples, describe a problem from different points of view, and remove some events. According to some predefined interpolation or smooth rule, the system can also insert some auxiliary events to create smooth transitions between events.

At step 2916, the system provides interfaces for a user to track event. The system can record a teaching session for helping a student to review. A student can replay a portion of a record teaching session, fast forward, fast backward, pause, search for related information, focus on a particular object, zoom in, and zoom out.

At step 2917, the module displays related structures in proper forms and lets a student to search for information. After a student has watched a teaching session, the student may want to access information from related structures for deep study. A user can sort information according to particular categories, search for related information from a structure, a database, and Internet, and display the results.

At step 2918, the system provides interfaces for a student to establish links among various objects and events, to make comments on related issues, to take notes, to highlight keywords, and to modify a structure. For example, if a student thinks that there is a strong connection between two concepts, then the student can associate these two concepts together. A student can also add comments and associate them to a related concept, theorem, problem, etc. The system can further let a student to link a note or put a mark to a tag or a property.

FIG. 30 shows an exemplary flowchart of identifying important information in step 2902 of FIG. 29. The system identifies important information for a particular subject or for a particular topic according to some predefined rules. To a mathematic paper, the important information can include concepts, theorems, examples, formulas, table, figures, and explanation.

A particular subject, a particular sub-subject, or a particular topic can use some terminologies more frequently than another subject, another sub-subject, or another topic can. For identification purpose, the system can save the possibilities for keywords associating with different subjects, sub-subjects, and topics in a database. To identify subject, sub-subject, or topic, the system can count terminologies used in an input document according to the statistic information about these terminologies for each subject, each sub-subject, and each topic together with other information.

At step 3001, the system identifies the subject of a current section according to title, keywords, author, and other information.

At step 3002, the system further identifies the sub subject of the current section. After the system has identified the subject, the system will find what sub-subject the current section is about among many possible sub-subjects under the subject. For example, after the system has identified the subject is physics, the system will further check if it is mechanics, electricity and magnetism, quantum physics, statistics physics, or wave. The system can identify sub-subject according to the features in each sub-subject.

At step 3003, the system identifies the topic of the current section. According to related patterns and keywords used, the system can further separate a current section into a particular topic. For example, after the system has identified a paper is about mechanics, the system then further identify if paper is about Newton's Second Law or about Einstein's General Relativity.

The purpose to find the subject, the sub-subject, and the topic is to load various default settings and default processing procedures. The system can also provide interfaces for a user to specify subject, sub-subject, and topic.

At step 3004, the system identifies the concepts evolved in a section. Usually the ways for introducing concepts are similar. In mathematics, there can be some indications such as "Definition" just before introducing a concept. Sometimes a book or a paper may use a different font on a concept name. The system can identify these concepts according to these features.

At step 3005, the system identified the theorems involved in a section. First, the definition of a theorem usually occupies a paragraph. Second, many papers and books also use special fonts to introduce a theorem. Further, many theorems associate with people's names and keywords such as "Theorem", "Law", "Lemma", and "Corollary". The system will use these features to identify theorems. The system can further identify the configuration of a theorem by following patterns or some rules. The most important components in a theorem can include assumptions, conditions, and consequences. A same theorem may have several different presentation forms and several different proofs. One can obtain a different form of a theorem by replacing a compound concept by its basic components, merging two or more concepts into another concept, combining some basic components in a compound concept with another concept or some basic components in another compound concept. One can also obtain a different form of a theorem by changing the description of the theorem literally. According to these features as well as various concepts and their variations saved in a database, the system can identify equivalent forms of a theorem.

At step 3006, the system identifies the examples used in a section. Usually an example will associate with keywords such as "for example", "example", and "for instance". In many situations, an example can occupy one or several paragraphs and have a title such as "Example 3-2-3".

At step 3007, the system identifies the lab demonstration in a section. A lab has an associated title such as "Lab 8", "Lab for Newton Second Law", "Lab Preparation", and "Experiment Purpose". The system will use these feature to identify a lab.

At step 3008, the system identifies the formulas or equations in a section. A formula or an equation usually occupies the central portion of one line or several lines, contains some mathematic operation symbols and special symbols such as Greek letters, and has equation identification mark by its right side. The system will use these features to identify formulas and equations.

At step 3009, the system identifies the tables in a section. A table may have four borders around it with a title on its top or its bottom and sometimes a table may have grids to separate different table items. The system can use these features to identify tables.

At step 3010, the system identifies the figures in a section. Usually having a title either at its top or at its bottom, a figure can display curves, bar graph, pie slice, divided bar, line graph, etc. The system can use these features to identify a figure.

At step 3011, the system identifies the explanation provided in a section. The system can extract explanation according to patterns for a particular topic or following specific rules for extracting explanation for a particular topic. Usually an explanation is just before or immediately after its corresponding issue.

At step 3012, the system identifies other important information defined by a student or by related rules for meeting the need of special purpose. For example, the system may further identify if a theorem is a necessary theorem, a sufficient theorem, a necessary and sufficient theorem.

At step 3013, the system checks that if there is any more section to handle. If yes, go back to step 3003 to identify important information in the next section under the same sub-subject or go to step 3002 to identifying important information in the next section under the same subject as indicated by the dashed line 3015. Otherwise, go to step 3014.

At step 3014, the system unifies symbols, displays the identified information, and provides interfaces for a user to modify related rules and settings. The symbols used by the input document may be different from those in database. The system will unite the different symbols for a same object by converting the symbols in the input document into the symbols saved in a database or vice versa, or converting both of them into a set of symbols defined by the user.

FIG. 31 shows an exemplary flowchart of creating a virtual teacher. A user can create a virtual teacher from an existing teacher model or build from scratch. The built virtual teacher can be for either a general purpose or a particular purpose.

At step 3101, the system checks if a user wants to build a virtual teacher from an existing teacher model. If yes, go to step 3114 and otherwise, go to step 3102.

At step 3102, the system provides interfaces for a user to specify the general appearance of the virtual teacher. For example, a user can specify face, age, race, dresses, and hairstyle.

At step 3103, the system provides interfaces for a user to specify the general speaking habits of the virtual teacher, which can include regular volume, pace, tone, accent, and pet phrases.

At step 3104, the system provides interfaces for a user to specify the general action habits of the virtual teacher, which can include the way of walking and gestures.

At step 3105, the system provides interfaces for a user to define the general rules associating with the virtual teacher. The general rules can include the rules for handling student's response.

At step 3106, the system checks if a user wants to create a virtual teacher for a particular subject. If no, go to step 3116 and otherwise, go to step 3107.

At step 3107, the system provides interfaces for a user to specify the subject related speaking features of the virtual teacher.

At step 3108, the system provides interfaces for a user to specify the subject related behavior features of the virtual teacher.

At step 3109, the system provides interfaces for a user to specify the subject related rules of the virtual teacher.

At step 3110, the system checks if a user wants to create a virtual teacher for a particular topic. If no, go to step 3116 and otherwise, go to step 3111.

At step 3111, the system provides interfaces for a user to specify the topic related speaking features of the virtual teacher.

At step 3112, the system provides interfaces for a user to specify the topic related behavior features of the virtual teacher.

At step 3113, the system provides interfaces for a user to specify the topic related rules of the virtual teacher.

The system can also provide interfaces for a user to build a virtual teacher from an existing virtual teacher template. At step 3114, the system provides interfaces for a user to select a teacher template and create a virtual teacher from the teacher template.

At step 3115, the system provides interfaces for a user to modify the virtual teacher. The system can display the virtual teacher in various forms and the user can modify the appearance, speaking habits, behavior habits, and related rules of the virtual teacher, At step 3116, the system provides interfaces for a user to create some variations on the virtual teacher. For example, the virtual teacher may wear different clothes for different subjects. The system can also produce some variations according to related rules for generating variation on a virtual teacher.

At step 3117, the system provides interfaces for a user to save the virtual teacher.

FIG. 32 shows an exemplary flowchart for building a teaching session plan. The system provides interfaces for a user to create a teaching session plan from a plan template, or according to an original document, or build from scratch.

At step 3201, the system checks the default settings for generating teaching plan. The default setting can be to one of the three options listed above.

At step 3202, the system verifies if a user wants to create a teaching session plan from a teaching plan template. If no, go to step 3204 and otherwise, go to step 3203.

At step 3203, the system finds the most related teaching plan template according to a predefined rule and then builds a teaching plan according to the most related teaching plan template. A teaching plan template may have the format needed by a teaching session plan with some spaces reserved to fill information.

At step 3204, the system checks if a user wants to build a teaching plan according to an input document. If no, go to step 3206 and otherwise, go to step 3205.

At step 3205, the system finds the order of the major events specified in the input document and creates a teaching plan according to the sequence of these major events. The system can also provide interfaces for a user to specify the event procedures and their parameters.

At step 3206, the system displays important issues extracted from the input document and their related issues under various categories.

At step 3207, the system provides interfaces for a user to define major events by selecting related issues.

At step 3208, the system links each major event to a corresponding event procedure and associates a procedure with corresponding parameters, which can be default or specified by the system.

At step 3209, the system displays the teaching plan just generated and provides interfaces for a user to modify the teaching plan.

Figure 33:
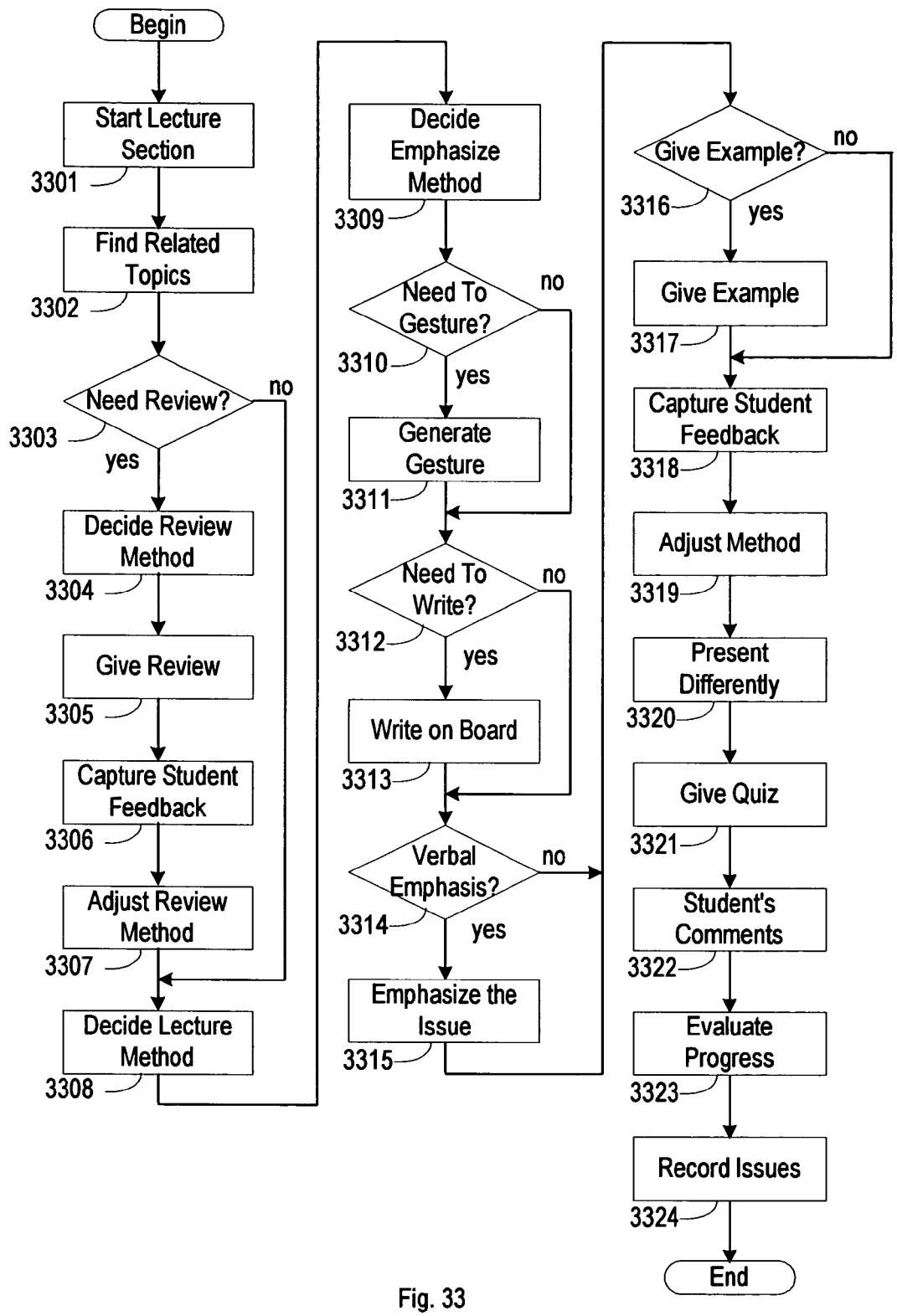
FIG. 33 illustrates a typical teaching session.

FIG. 33 shows an exemplary flowchart of a teaching session. According to a teaching plan, the system creates a virtual teacher to lecture a student by generating image and voice with various understanding-assistant means for conveying information effectively. These understanding-assistant means can include generating gesture, writing on a virtual board, repeating important issues, giving example, producing quiz, evaluating progress, capturing student's feedback, and adjusting presenting method.

At step 3301, the system starts a lecture section. There can be many variations to start a lecture session. For example, one can design to start a lecture section by letting a teacher say "Good morning, everyone!" or "Good afternoon, Jimmy!" when the teacher enters a lecture hall.

At step 3302, according to the information collected, the teaching plan, and the student's background, the system finds proper topics to cover this lecture session. For instance, after the system has located these topics according to a syllabus, the system can adjust the information for these topics according to the response from a student.

At step 3303, the system decides if there is a need for review. The system can make a decision according to default setting, instruction from a teaching material, and student's response. If no, go to step 3308 and otherwise, go to step 3304.

At step 3304, the system decides a review method according to setting, preference, and student's feedback. The system can simply mention the key concepts, its meanings, and the related theorems. The system can also provide a more complex review. For example, the system can explain a theorem from a different aspect, compare the theorem with other related theorems, and provide some examples.

At step 3305, the system guides a student to review by displaying images, generating sounds, and providing instructions.

At step 3306, the system captures feedback from a student through keyboard, mouse, camera, microphone, and joystick input. A feedback can be a facial expression, a verbal inquiry, a gesture, and a command issued by a student.

At step 3307, according to student's response, the system can adjust the review method. The rules for evaluating response and adjusting review will determine how to evaluate the response and how to adjust the review. The system can also provide interfaces for a user to specify and modify these rules heuristically.

At step 3308, the system decides a lecturing method. The system will choose one from several different approaches according to the default teaching methods, specific teaching methods, and student's response on the review section. A lecturing method determines the principle on how to present information, how to emphasize, which example to give, and whether to show detail. The system can adjust a teaching plan in a certain range according to student's feedback and the rules for generating variations on lecturing. For example, the system will provide more examples or conduct detail analysis when the system detects that a student may have difficulty to understand a concept.

At step 3309, the system decides if and how to emphasize.

At step 3310, the system decides if the system will generate gestures for emphasize. If no, go to step 3312 and otherwise, go to step 3311.

At step 3311, the system inserts proper gestures into an event queue. This gesture is for emphasizing an important concept, fact, and theorem. Depending on setting, current topic, and the features of the virtual teacher, the system will generate different gestures for emphasis.

At step 3312, the system decides if there is a need to write on a black board or a white board. If no, go to step 3314 and otherwise, go to step 3313.

At step 3313, the system inserts a proper event into an event queue so that the virtual teacher will write the important concepts, equations, and theorem on a virtual board.

At step 3314, the system decides if the virtual teacher will emphasize verbally. If no, go to step 3316 and otherwise, go to step 3315.

At step 3315, the system creates or replaces a proper event so that the virtual teacher can emphasize the important issues. For example, the teacher can say aloud, change tone, repeat, and prolong some sounds or important words.

At step 3316, the system decides if to show examples to a student. If no, go to step 3318 and otherwise, go to step 3317.

At step 3317, the system inserts events into an event queue so that the virtual teacher will present a student some examples. The system can create an example according to the original document and from a database or Internet. The system will determine which example to use according to setting, preference, related rules, user's response, and syllabus.

At step 3318, the system captures student's response. The response can be keyboard input, mouse movement and click, joystick, facial expression, verbal asking, and other body language.

At step 3319, the system adjusts the teaching method according to student's response. The system will evaluate student's response and adjust the teaching method according to related rules. The system can also provide interfaces for a user to define and modify these rules.

At step 3320, the system presents material differently with an updated teaching method. For example, the system will present more examples for a session that is difficult for a student.

At step 3321, the system generates quiz to test student's understanding. Depending on setting, the system can generate quiz according to the current section or previous section. The quiz can be in form of multiple choice, yes or no answers, and filling blank.

At step 3322, the system provides interfaces for a student to create comments on a theorem, an example, and a concept.

At step 3323, the system evaluates a student's progress. The system can evaluate a student's progress according to the difference of score on quiz, the number of asking question, and the difficulty of questions asked.

At step 3324, the system will records related issues such as the evaluated results of student's understanding, response, and classroom behavior.

What is claimed is:

1. A system for converting a text-based document into an animating cartoon to provide a user information in images and sounds, wherein said document describes objects and events generated by said objects, said system comprising:

means for generating organized information by extracting information from said document, organizing information, and saving information in a structure;

means for identifying said objects from said organized information;

means for creating virtual objects corresponding to said objects;

means for identifying said events from said organized information;

means for creating virtual events according to said virtual objects and said events; and means for dispatching said virtual events.

2. The system in claim 1, wherein means for generating organized information from said document comprises means for identifying speech parts and sentence structures in said document, means for identify document type of said document, means for extracting information according to said document type, means for extracting background information, means for extracting user information, and means for saving information in said structure, said structure comprising a plurality of said properties for each structure, said properties associating with a plurality of rules for performing operations related to said properties and further comprising sub-structures that comprise sub-properties and their associated rules.

3. The system in claim 1, having a reference dictionary, said reference dictionary comprising a plurality of words with each word associating with a plurality of meanings and with each meanings classified into a plurality of categories and containing reference rules for recognizing each category, said system further comprising means for identifying meaning of a word and means for synchronizing said virtual events, wherein said means for identifying meaning of a word comprises means for displaying, searching, and modifying said reference dictionary, means for applying said reference rules on said word to identify its category; and wherein said means for synchronizing said virtual events comprises means for organizing and adjusting said virtual events according to chronological order, means for organizing and adjusting said virtual events according to spatial order, means for defining event synchronization rules, means for applying said event synchronization rules, and means for displaying and adjusting event sequences.

4. The system in claim 1, said system connecting to a database and Internet, wherein said means for identifying said objects comprises means for finding different names for each object, means for linking different names for a same object to said same object, means for sorting said objects, means for specifying an object identification rule, means for extracting information specifically for said object from said document, said database, and Internet according to said object identification rules; and wherein said means for creating virtual objects comprises means for building an object model, means for creating an virtual object from said object model, means for associating said virtual object with default values and default rules inherited from said object model, means for adding new values and new rules, and means for specifying said virtual object with information extracted from said document, said database, and Internet.

5. The system in claim 1, wherein said means for identifying said events comprises means for recognizing verbs and verb structures, means for distinguishing action and non-action descriptions, means for defining an event identification rule, means for applying said event identification rule, and means for associating said event to corresponding action description.

6. The system in claim 1, further comprising:

means for displaying and modifying said organized information;

means for defining and modifying an auxiliary virtual object;

means for defining and modifying an auxiliary virtual event;

means for interpolating said virtual events by creating an intermediate virtual event to smooth a transition between two adjacent virtual events;

means for tracking a virtual event by providing first interface for said user to track text, voice, and image; and means for tracking a virtual object by providing second interface for said user to select said virtual object, track status of said virtual object, and display said status.

7. The system in claim 1 further comprising means for selecting, modifying, debugging, and testing rules, wherein each rule is in a format selected from a group consisting of independent program, subroutine, function, macro, script, regular expression, matched pattern, and example for controlling how to extract information, identify objects, organize information, associate information with corresponding procedures, initialize objects, identify meaning, identify events, interpolate events, display information, and tack events, said means comprising means for displaying said rules and specifying priorities on said rules, means for passing arguments and parameters among different rules and utility procedures, and means for providing editing and debugging environment.

8. The system in claim 1, wherein said means for dispatching said virtual events comprises creating images and generating sounds according to the relative positions of said virtual objects and said user.

9. A system for generating animation presentation from a text document for a user, said document containing information about an object and an event related to said object, said system comprising:

a dictionary module for separating each word and each phrase included in a dictionary into different meanings, for categorizing each meaning into a plurality of categories, and linking each category with a corresponding action description;

a structure analysis module for generating organized information by performing structure analysis, collecting information, and organizing information in a structure;

an object identification module for identifying said object according to said organized information and said dictionary;

an object instantiation module for creating a virtual object by identifying an object type of said object and filling said virtual object with default information and default behavior related to said object type and with information specified in said document about said object;

an event generation module for identifying said event by recognizing actions associated with said event according to said organized information and said dictionary, describing said event in image, sound, and text according to corresponding action description in said dictionary and said organized information, and arranging an event schedule according to sequence of said event and; and a viewing module for said user to watch said animation presentation from different aspects.

10. The system in claim 9, said system providing interfaces to define rules to perform corresponding tasks, said dictionary having patterns for identifying different meanings associated with a word, said system further comprising:

a relation identification module for identifying relation among objects according to various predefined relation identification rules;

a meaning identification module by identifying features that said word is used and comparing said features with patterns saved in said dictionary;

an image synthesizer for synthesizing image by loading a image saved in said system, creating image according to a relative position of said object and said user; and an voice synthesizer for synthesizing sound by specifying each speaker's voice features and special voice characteristic and creating sound according to related text; and an event modifier for modifying, inserting, deleting, copying, moving, grouping, ungrouping, expanding, and compressing said event;

whereby said image synthesizer and said voice synthesizer will generate image and voice for said animation presentation.

11. The system in claim 9, further comprising:

an event synchronizer for making a plurality of virtual events synchronized by making said plurality of virtual events aligned up in spatial and time domain for image, sound, and text;

an event tracking module for tracking a virtual event by providing interface for said user to specify features to be tracked in image, text, and voice, and to manipulating how to display said event; and an object status module for said user to track the status of said virtual object by providing an interface for said user to specify said object and displaying related events associated with said objects.

12. The system in claim 9, further comprising:

a playscript module for generating a playscript from said document according to rules for generating playscript;

a dialogue module for identifying a conversation in said document, converting a written statement to a verbal sentence, and generating dialogue text for a dialogue; and a caption generation module for generating a caption by identifying important issues and extracting information from said important issues according to rules for generating caption;

whereby said user can modify said playscript to specify special pronunciation requirement on said playscript; and whereby said system will combine said dialogue text, said caption, and said image to generate a new image for presentation.

13. The system in claim 9, further comprising:

an voice edit module for modifying sound by providing an interface for said user to modify sound associated with said object and a particular sentence;

a setup module for setting up various default settings by providing an interface for said user to set up default values of each setting, default procedures of each task, default procedure sequence;

a preprocess module for preprocessing said document by scanning a paper-based document into an electrical document, converting an image document into text-base document, and separating figures, formulas, and tables from texts;

a structure modification module for said user to modify said structure, said object, said meaning, and said event by providing a proper interface and help for said user to modify said structure, said object, said meanings, and said event; and a database management module for managing said structure, collected information, and various rules saved in said system.

14. The system in claim 9, wherein said viewing module comprises means for generating images for a different viewing position, means for recording, playing, pausing, stopping, fast forward, fast backward, zooming in, zooming out, searching, analyzing and help, means for tracking event, and means for checking dictionary, structure, and object; and wherein said structure analysis module comprises means for identifying a document type, means for loading a default structure template associated with the document type, means for creating said structures from said structure template, means for modifying said structure by providing interface to display said structure, change structure specific rules, display a tag template, create a tag from said tag template, associate said tag with said structure, means for extracting information from input document, saving related information into a corresponding tag, and specifying access methods, and means for building relations among a plurality of tags in said structure and among a plurality of structures.

15. A system for creating a virtual teaching environment for a student from a text-based document comprising:

means for identifying important issues from said document;

means for building a virtual teacher, said virtual teacher being an auxiliary object associating with various properties and handling criterions;

means for building a virtual lecture hall, said virtual hall being another auxiliary object associating with various features found in a particular classroom;

means for creating events according to said important issues, said virtual teacher, and said virtual lecture hall; and means for displaying said events.

16. The system in claim 15, wherein said means for identifying important issues from said document comprising means for identifying a subject, a section, and a topic, means for identifying a concept, means for identifying a theorem, means for identifying a formula, means for identifying a table, means for identifying an example, means for identifying a figure, means for identifying a demonstrations, and means for identifying a particular feature;

wherein said means for building a virtual teacher comprises means for building appearance of said virtual teacher, means for defining a general approach for said virtual teacher, means for adding more features to said virtual teacher for a particular subject, a particular topic, and a particular session, means for specifying verbal features, gestures features, and emphasizing method of said teacher; and wherein said means for building a virtual lecture hall comprises displaying various interfaces, creating an object from an object template, shaping said object, resizing said object, relocating said object, and specifying properties to said object.

17. The system in claim 15, wherein said means for building a virtual teacher comprises means for building said virtual teacher from a teacher model, means for creating said virtual teacher by specifying appearance, speaking features, and behavior features, means for creating said virtual teacher for a specific subject and specific topic, means for displaying said virtual teacher, and means for modifying said virtual teacher.

18. The system in claim 15, further comprising means for building a teaching plan, said plan being a blueprint of major events associating with said important issues and comprising a plurality of predefined event procedures, wherein said event procedures are for generating a sequence of closely related events for various purposes, said means comprising means for finding a teaching plan model, means for creating said teaching plan from said teaching plan model, means for identifying order of said important issues, means for creating said teaching plan according to said order, means for displaying said important issues and their related issues, means for selecting an important issue, means for linking said important issue to a corresponding event procedure, and means for modify said teaching plan, whereby said means for arranging events organizes said events according to said teaching plan, said important issues, said virtual teacher, and said virtual lecture hall.

19. The system in claim 15, further comprising means for dispatching events, said means comprising means for creating images for objects in said virtual lecture hall in a format selected from a group consisting of two dimensional format and three-dimensional format, means for recreating images upon said student changing viewing position and viewing mode, and means for creating voice, whereby said means for displaying said events generates images and sounds according to related position of said student and said object.

20. The system in claim 15, said system having a database and connecting to Internet, further comprising:

means for performing structure analysis and saving information in a structure, said structure having a plurality of properties for holding corresponding information;

means for changing viewing mode;

means for inserting an auxiliary event, said auxiliary event being an extra event created for making image smooth and natural;

means for capturing and analyzing feedback from said student, adjusting a teaching plan to create an updated teaching plan, and dispatching events according to said updated teaching plan;

means for recording a teaching session, replaying said teaching session, and searching for a particular event;

means for displaying information in said structure in a proper display form, searching for related information from said structure, said database, and said Internet, and modifying said structure;

means for said students to make a comment and associate said comment with a corresponding property; and means for said student to establish links among said structure, other structures, and their sub-structures.

\* \* \* \* \*